United States Patent
Yasui et al.

(10) Patent No.: US 6,895,317 B2
(45) Date of Patent: May 17, 2005

(54) WHEEL GRIP FACTOR ESTIMATION APPARATUS

(75) Inventors: Yoshiyuki Yasui, Nagoya (JP); Wataru Tanaka, Anjo (JP); Eiichi Ono, Toyota (JP); Yuji Muragishi, Nagoya (JP); Katsuhiro Asano, Toyoake (JP); Minekazu Momiyama, Chiryu (JP); Syoji Ogawa, Chiryu (JP); Kenji Asano, Toyota (JP); Yuzo Imoto, Chita-gun (JP); Hiroaki Kato, Nukata-gun (JP)

(73) Assignees: Aisin Seiki Kabushiki Kaisha, Kariya (JP); Toyoda Koki Kabushiki Kaisha, Kariya (JP); Advics Co., Ltd., Kariya (JP)

( * ) Notice: Subject to any disclaimer, the term of this patent is extended or adjusted under 35 U.S.C. 154(b) by 27 days.

(21) Appl. No.: 10/420,826

(22) Filed: Apr. 23, 2003

(65) Prior Publication Data

US 2004/0019417 A1 Jan. 29, 2004

(30) Foreign Application Priority Data

Apr. 23, 2002 (JP) ........................ 2002-120555
Apr. 23, 2002 (JP) ........................ 2002-120566

(51) Int. Cl.$^7$ ............................ B60T 8/58; B60C 19/00
(52) U.S. Cl. .............................. 701/36; 701/73; 701/78; 180/197
(58) Field of Search ............................ 701/36, 41, 70, 701/73, 75, 78, 80; 180/197; 152/209.8

(56) References Cited

U.S. PATENT DOCUMENTS

| | | | | |
|---|---|---|---|---|
| 5,839,083 A | * | 11/1998 | Sugiyama | 701/62 |
| 5,944,082 A | * | 8/1999 | Thompson et al. | 152/209.8 |
| 6,015,020 A | * | 1/2000 | Sugiyama | 180/197 |
| 6,184,637 B1 | | 2/2001 | Yamawaki et al. | |
| 6,199,654 B1 | | 3/2001 | Kojo et al. | |
| 2002/0011093 A1 | | 1/2002 | Matsuno | |
| 2002/0087251 A1 | * | 7/2002 | Kogure et al. | 701/80 |
| 2003/0213640 A1 | | 11/2003 | Kato et al. | |

FOREIGN PATENT DOCUMENTS

| | | |
|---|---|---|
| DE | 39 22 528 C1 | 7/1990 |
| EP | 0 323 066 A2 | 7/1989 |
| EP | 0 470 700 A2 | 2/1992 |
| JP | 62-146754 A | 6/1987 |
| JP | 6-99800 A | 4/1994 |
| JP | 6-221968 A | 8/1994 |
| JP | 11-49003 A | 2/1999 |
| JP | 11-99956 A | 4/1999 |
| JP | 11-287749 A | 10/1999 |

OTHER PUBLICATIONS

*Automotive Engineering Handbook*, First Volume, *Basic & Theory*, Feb. 1, 1990, Society of Automotive Engineers of Japan, Inc., pp. 179–180.

* cited by examiner

*Primary Examiner*—Tan Q. Nguyen
(74) *Attorney, Agent, or Firm*—Burns, Doane, Swecker & Mathis, L.L.P.

(57) ABSTRACT

The present invention is directed to a wheel grip factor estimation apparatus, which includes a steering factor detection unit for detecting at least one of steering factors including a steering torque and steering effort applied to a steering system extending from a steering wheel to a suspension of a vehicle, an aligning torque estimation unit for estimating an aligning torque produced on at least a wheel of the vehicle on the basis of the steering factor detected by the steering factor detection unit, and a vehicle state variable detection unit for detecting a state variable of the vehicle. The apparatus further includes a wheel factor estimation unit for estimating at least one of wheel factors including a side force and slip angle applied to the wheel on the basis of the vehicle state variable, and a grip factor estimation unit for estimating a grip factor of at least a tire of the wheel, in accordance with a relationship between the estimated alignment torque and the estimated wheel factor.

21 Claims, 35 Drawing Sheets

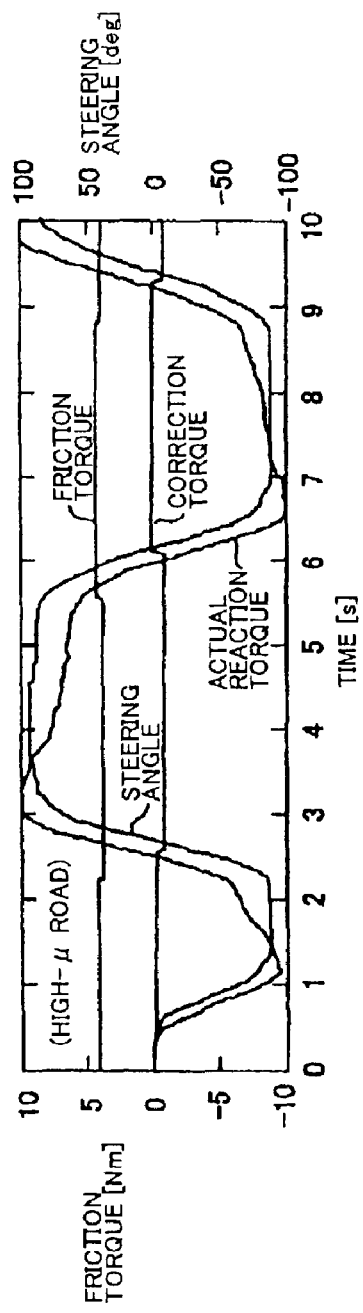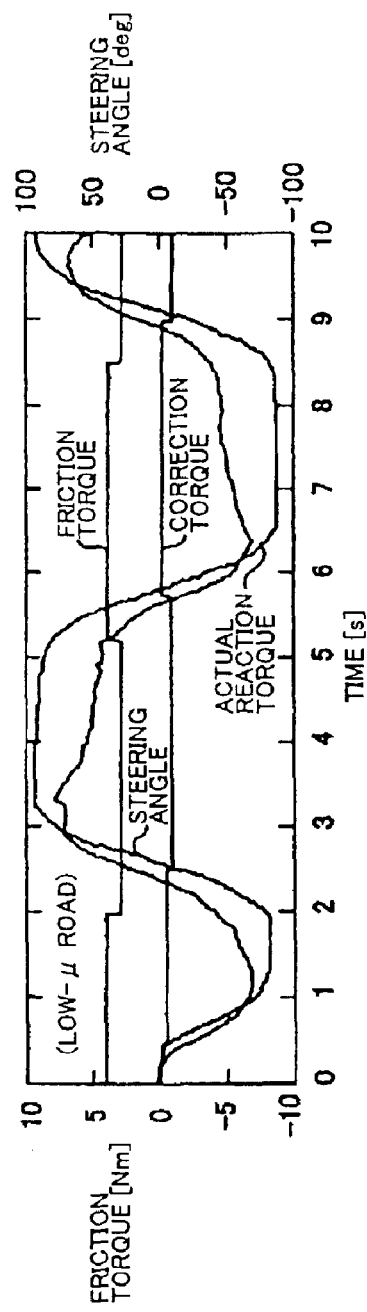

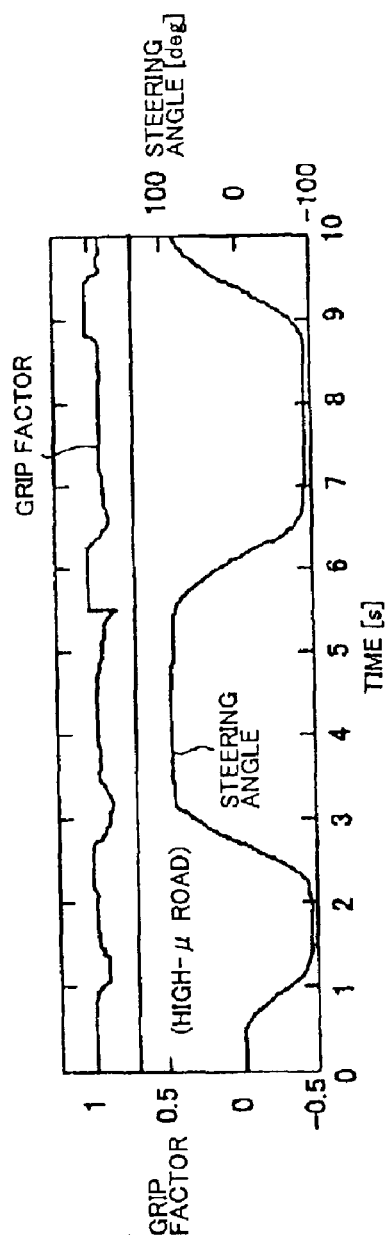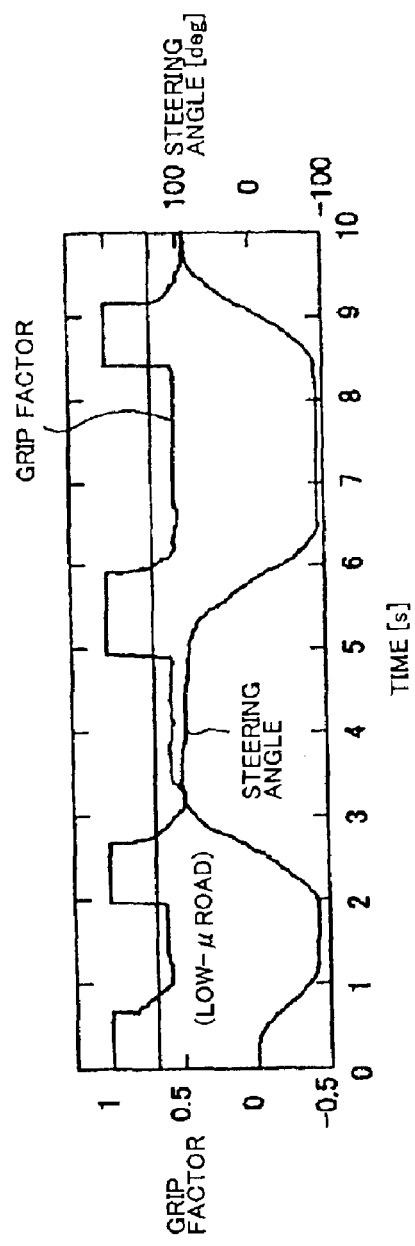

United States Patent US 6,895,317 B2

WHEEL GRIP FACTOR ESTIMATION APPARATUS

This application claims priority under 35 U.S.C. Sec. 119 to No.2002-120555 and No.2002-120566 filed in Japan on Apr. 23, 2002, respectively, the entire contents of which are herein incorporated by reference.

BACKGROUND OF THE INVENTION

1. Field of the Invention

The present invention relates to a wheel grip factor estimation apparatus, particularly relates to an apparatus for estimating a grip factor indicative of a grip level of tire on a road surface in a lateral direction of a vehicle wheel.

2. Description of the Related Arts

In order to maintain a stability of a vehicle, there is known heretofore an apparatus for controlling a braking force applied to each wheel on the basis of vehicle state variable detected and determined, as disclosed in Japanese Patent Laid-open Publication No.6-99800, for example. In this publication, a target value of yaw rate is provided on the basis of a vehicle speed and a steering angle, and an over steering or an under steering is determined by a derived function of a difference between the actual value and the target value of the yaw rate. In case of the over steering, a braking slip is increased on a front wheel located outside of a curve when cornering, i.e., a braking force is increased on the front wheel located outside of the curve. Whereas, in case of the under steering, the braking slip is increased on the front wheel located inside of the curve. And, there is disclosed in Japanese Patent Laid-open Publication No.62-146754, an apparatus for setting a front wheel speed difference and a target value of lateral acceleration or yaw rate, on the basis of a steering angle and vehicle speed, to control brake and/or engine outputs.

In Japanese Patent Laid-open Publication No.11-99956, there is disclosed a steering apparatus for a vehicle with a variable steering angle ratio, to prevent wheels from being steered excessively, wherein an index named as a side force utilization ratio or lateral G utilization ratio is used. According to the apparatus as disclosed in the publication, a road coefficient of friction $\mu$ is estimated, to provide the side force utilization ratio. It is described that reaction force of a rack axis with the same steering angle applied by a road surface will be reduced in accordance with the road coefficient of friction $\mu$, because the lower the road coefficient of friction $\mu$ is, the more a cornering power Cp of tire will be reduced. Therefore, it is concluded that the road coefficient of friction $\mu$ can be estimated by measuring the steering angle of front wheels and the reaction force of the rack axis, and comparing the reaction force of the rack axis against the steering angle of front wheels and a reference reaction force of the rack axis which is provided in advance as an inside model. Moreover, an equivalent friction circle is provided on the basis of the road coefficient of friction $\mu$, then an amount of friction force used by a longitudinal force is subtracted from it to provide a maximal side force to be produced, and a ratio of the presently produced side force and the maximal side force is set as the side force utilization ratio. Or, a lateral G sensor may be provided for setting the lateral G utilization ratio on the basis of the lateral G detected by the sensor.

In the case where a vehicle has reached a limit for friction between road surface and tire, to cause an excessive under steering condition, it is required not only to control a yawing motion of the vehicle, i.e., a position of the vehicle on the road surface, but also to reduce the vehicle speed, in order to maintain a radius of cornering curve of the vehicle as intended by the vehicle driver. According to the apparatus as disclosed in the Publication No.6-99800, however, the vehicle behavior is determined after the tire reached the friction limit. When the vehicle speed is reduced in that situation, therefore, the cornering force will be reduced, whereby the tendency of under steering might be increased. Furthermore, according to the actual control system, as there is provided a dead zone for a control, the control generally begins after a certain vehicle behavior occurred.

As the curve of a vehicle road is formed into a clothoid curve, when the vehicle driver intends to trace the curve of the road, the steering wheel will be rotated with a gradually increasing amount. In the case where the vehicle speed is high when the vehicle has entered into the curve, therefore, the side force produced on the wheel will not balance with a centrifugal force, whereby the vehicle tends to be forced outside of the curve. In those cases, the apparatuses as disclosed in the Publication No.6-99800 and 62-146754 will operate to control the motion of the vehicle. However, as the controls begin at the cornering limit, the vehicle speed may not be reduced sufficiently by those controls. Therefore, it might be caused that the vehicle can not be prevented only by those controls from being forced outside of the curve.

With respect to the apparatus for estimating the road coefficient of friction $\mu$, further publications have been known, such as Japanese Patent Laid-open Publication Nos.11-287749 and 6-221968. In the former, there is disclosed an apparatus for obtaining a characteristic of variation of steering torque to variation of steering angle, and estimating the road coefficient of friction $\mu$ on the basis of that characteristic. In the latter, there is disclosed an apparatus for detecting the road coefficient of friction $\mu$ on the basis of a relationship between a restoring moment of a wheel and a cornering force, with a hysteresis being reduced, to detect the road coefficient of friction $\mu$ before the wheel reaches a grip limit.

In the mean time, it is disclosed in AUTOMOTIVE ENGINEERING HANDBOOK, First Volume, for BASIC & THEORY, issued on Feb. 1, 1990 by Society of Automotive Engineers of Japan, Inc., Pages 179 and 180, such a state that a tire rotates on a road, skidding at a slip angle $\alpha$, as shown in a part of FIG. 2 of the present application. As indicated by broken lines in FIG. 2, a tread surface of the tire contacts a road surface at a front end of the contacting surface including Point (A) in FIG. 2, and moves with the tire advanced, being adhesive to the road surface up to Point (B). The tire begins to slip when a deformation force by a lateral shearing deformation has become equal to a friction force, and departs from the road surface at a rear end including Point (C). In this case, a side force Fy produced on the overall contacting surface equals to a product of a deformed area of the tread in its lateral direction (as indicated by a hutching area in FIG. 2) multiplied by its lateral elastic coefficient per unit area. As shown in FIG. 13, a point of application of force for the side force Fy is shifted rearward (leftward in FIG. 2) from a point (O) on the center line of the tire, by a distance ($e_n$) which is called as a pneumatic trail. Accordingly, a moment Fy·$e_n$ becomes an aligning torque (Tsa), which acts in such a direction to reduce the slip angle $\alpha$, and which may be called as a self-aligning torque.

Next will be explained the case where the tire is installed on a vehicle, with reference to FIG. 3 which simplified FIG. 2. With respect to steered wheels of a vehicle, in general, a caster angle is provided so that a steering wheel can be returned to its original position smoothly, to produce a caster trail ($e_c$). Therefore, the tire contacts the road surface at a point (O'), so that the moment for forcing the steering wheel to be positioned on its original position becomes $Fy \cdot (e_n + e_c)$. When a lateral grip force of the tire is reduced to enlarge the slip area, the lateral deformation of the tread will result in changing a shape of ABC in FIG. 3 into a shape of ADC. As a result, the point of application of force for the side force Fy will be shifted forward in the advancing direction of the vehicle, from Point (H) to Point (J). That is, the pneumatic trail ($e_n$) will be reduced. Therefore, even in the case where the same side force Fy acts on the tire, if the adhesive area is relatively large and the slip area is relatively small, i.e., the lateral grip force of the tire is relatively large, the pneumatic trail ($e_n$) will be relatively large, so that the aligning torque Tsa will be relatively large. On the contrary, if the lateral grip force of the tire is lessened, and the slip area is enlarged, then the pneumatic trail ($e_n$) will become relatively small, so that the aligning torque Tsa will be reduced.

As described above, by monitoring the variation of the pneumatic trail ($e_n$), the grip level of the tire in its lateral direction can be detected. And, the variation of the pneumatic trail ($e_n$) results in the aligning torque Tsa, on the basis of which can be estimated a grip factor indicative of a grip level of the tire in its lateral direction, with respect to a front wheel for example (hereinafter simply referred to as grip factor). With respect to the grip factor, it can be estimated on the basis of a margin of side force for road friction, as described later in detail.

In this respect, the grip factor is clearly distinguished from the side force utilization ratio, or lateral G utilization ratio as described in the Japanese Publication No.11-99956, wherein the maximal side force which can be produced on the road surface is obtained on the basis of the road coefficient of friction $\mu$. And, this road coefficient of friction $\mu$ is estimated on the basis of a reliability of the cornering power Cp (value of the side force per the slip angle of one degree) on the road coefficient of friction $\mu$. However, the cornering power Cp relies not only on the road coefficient of friction $\mu$, but also a shape of the area of the road contacting the tire (its contacting length and width to the road), and elasticity of the tread rubber. For example, in the case where water exists on the tread surface, or the case where the elasticity of the tread rubber has been changed due to wear of the tire or its temperature change, the cornering power Cp will vary, even if the road coefficient of friction $\mu$ is constant. In the Japanese Publication No.11-99956, therefore, nothing has been considered about the characteristic of the tire which constitutes the wheel.

SUMMARY OF THE INVENTION

Accordingly, it is an object of the present invention to provide a wheel grip factor estimation apparatus for estimating a grip factor indicative of a grip level of tire in a lateral direction to a wheel accurately.

It is another object of the present invention to provide a vehicle motion control apparatus having the grip factor estimation apparatus for estimating the grip factor accurately, and controlling a motion of the vehicle appropriately on the basis of the grip factor, when the grip factor is reduced less than a predetermined value.

In accomplishing the above and other objects, the wheel grip factor estimation apparatus includes steering factor detection means for detecting at least one of steering factors including a steering torque and steering effort applied to a steering system extending from a steering wheel to a suspension of a vehicle, aligning torque estimation means for estimating an aligning torque produced on at least a wheel of the vehicle on the basis of the steering factor detected by the steering factor detection means, and vehicle state variable detection means for detecting a state variable of the vehicle. The apparatus further includes wheel factor estimation means for estimating at least one of wheel factors including a side force and slip angle applied to the wheel on the basis of the state variable detected by the vehicle state variable detection means, and grip factor estimation means for estimating a grip factor of at least a tire of the wheel, in accordance with a relationship between the alignment torque estimated by the aligning torque estimation means and the wheel factor estimated by the wheel factor estimation means.

For example, on the basis of the steering torque applied to a steering wheel or steering effort applied to a suspension, the aligning torque produced on a front wheel (or front wheels) is estimated. And, on the basis of the vehicle state variable, the side force or slip angle of the front wheel is estimated. Then, the grip factor of the front wheel can be estimated, on the basis of the variation of the aligning torque against the side force or slip angle of the front wheel. The state variable includes factors relating to the vehicle in motion, such as vehicle speed, lateral acceleration, yaw rate, steering (wheel) angle, and the like.

Preferably, the apparatus further includes reference aligning torque setting means for setting a reference aligning torque on the basis of the wheel factor estimated by the wheel factor estimation means and the aligning torque estimated by the aligning torque estimation means. And, the grip factor estimation means is adapted to estimate the grip factor of the tire on the basis of a result of comparison between the aligning torque estimated by the aligning torque estimation means and the reference aligning torque set by the reference aligning torque setting means.

In the apparatus, the reference aligning torque setting means may be adapted to set the reference aligning torque by approximating a characteristic of the aligning torque estimated by the aligning torque estimation means against the wheel factor estimated by the wheel factor estimation means to a linear characteristic of the reference aligning torque including at least the origin, and adapted to set the reference aligning torque on the basis of the linear characteristic of the reference aligning torque.

Or, the reference aligning torque setting means may be adapted to set a linear characteristic of the reference aligning torque with a gradient which is provided by a brush model of the wheel for estimating the grip factor on the basis of a margin of side force for road friction, and adapted to set the reference aligning torque on the basis of the linear characteristic of the reference aligning torque.

Preferably, the steering factor detection means may include steering torque detection means for detecting the steering torque applied to the steering system, assisting torque detection means for detecting an assisting torque applied to the steering system, reaction torque estimation means for estimating a reaction torque applied to a steering axis of the steering system on the basis of the steering torque detected by the steering torque detection means and the reaction torque estimated by the reaction torque estimation means, and friction torque estimation means for estimating a friction torque caused by internal friction of the steering system. The aligning torque estimation means may be adapted to estimate the aligning torque on the basis of the reaction torque estimated by the reaction torque estimation means and the friction torque estimated by the friction torque estimation means.

In the apparatus as described above, the friction torque estimation means may be adapted to estimate the friction torque on the basis of a difference between the reaction torque with a maximal absolute value thereof estimated by the reaction torque estimation means and the reaction torque produced when the steering system is activated in a direction toward the original position of the steering system.

The apparatus may further include vehicle speed detection means for detecting a vehicle speed of the vehicle, and filter means for setting a cut-off frequency in accordance with the vehicle speed detected by the vehicle speed detection means, and applying a low pass filtering process with the cut-off frequency to the reaction torque estimated by the reaction torque estimation means. And, the friction torque estimation means may be adapted to estimate the friction torque on the basis of the reaction torque filtered by the filter means, and the aligning torque estimation means may be adapted to estimate the aligning torque on the basis of the reaction torque filtered by the filter means.

Furthermore, the apparatus may include correction torque estimation means for estimating a correction torque in accordance with a variation of a neutral point of the suspension system, and the aligning torque estimation means may be adapted to estimate the aligning torque on the basis of the estimated reaction torque, the estimated friction torque and the estimated correction torque.

The aligning torque estimation means may be adapted to adjust the correction torque in accordance with a variation of the friction torque before and after the steering system is activated in the direction toward the original position, and the aligning torque estimation means may be adapted to estimate the aligning torque on the basis of the friction torque after the steering system was activated in the direction toward the original position, and the adjusted correction torque.

The apparatus may further include warning means for comparing the grip factor estimated by the grip factor estimation means with a predetermined value, to provide a warning signal when the estimated grip factor becomes less than the predetermined value.

Preferably, a vehicle motion control apparatus includes the apparatus for estimating the grip factor as described above, and further includes control means for controlling at least one of braking force, engine output and shift position of the vehicle at least in response to the state variable detected by the vehicle state variable detection means. And, the control means is adapted to control at least one of the braking force, engine output and shift position of the vehicle when the grip factor estimated by the grip factor estimation means becomes less than a predetermined value, to reduce a speed of the vehicle.

In the vehicle motion control apparatus, the control means may be adapted to control the braking force applied to at least one wheel of the vehicle, when the grip factor estimated by the grip factor estimation means becomes less than the predetermined value during a braking operation of a vehicle driver, to exceed a predetermined braking force irrespective of the braking operation of the vehicle driver.

BRIEF DESCRIPTION OF THE DRAWINGS

The above stated object and following description will become readily apparent with reference to the accompanying drawings, wherein like referenced numerals denote like elements, and in which:

FIG. 38A is a diagram showing estimated results of actual reaction torque, friction torque, correction torque and steering angle on the high-μ road, in the experiment as shown in FIGS. 37A and 37B, according to a further embodiment of the present invention;

FIG. 38B is a diagram showing estimated results of actual reaction torque, friction torque, correction torque and steering angle on a low-μ road, in the experiment as shown in FIGS. 37A and 37B, according to a further embodiment of the present invention;

FIG. 39A is a diagrams showing variations of grip factor and steering angle on a high-μ road, according to a further embodiment of the present invention;

FIG. 39B is a diagrams showing variations of grip factor and steering angle on a low-μ road, according to a further embodiment of the present invention;

DESCRIPTION OF THE PREFERRED EMBODIMENTS

Figure 1:
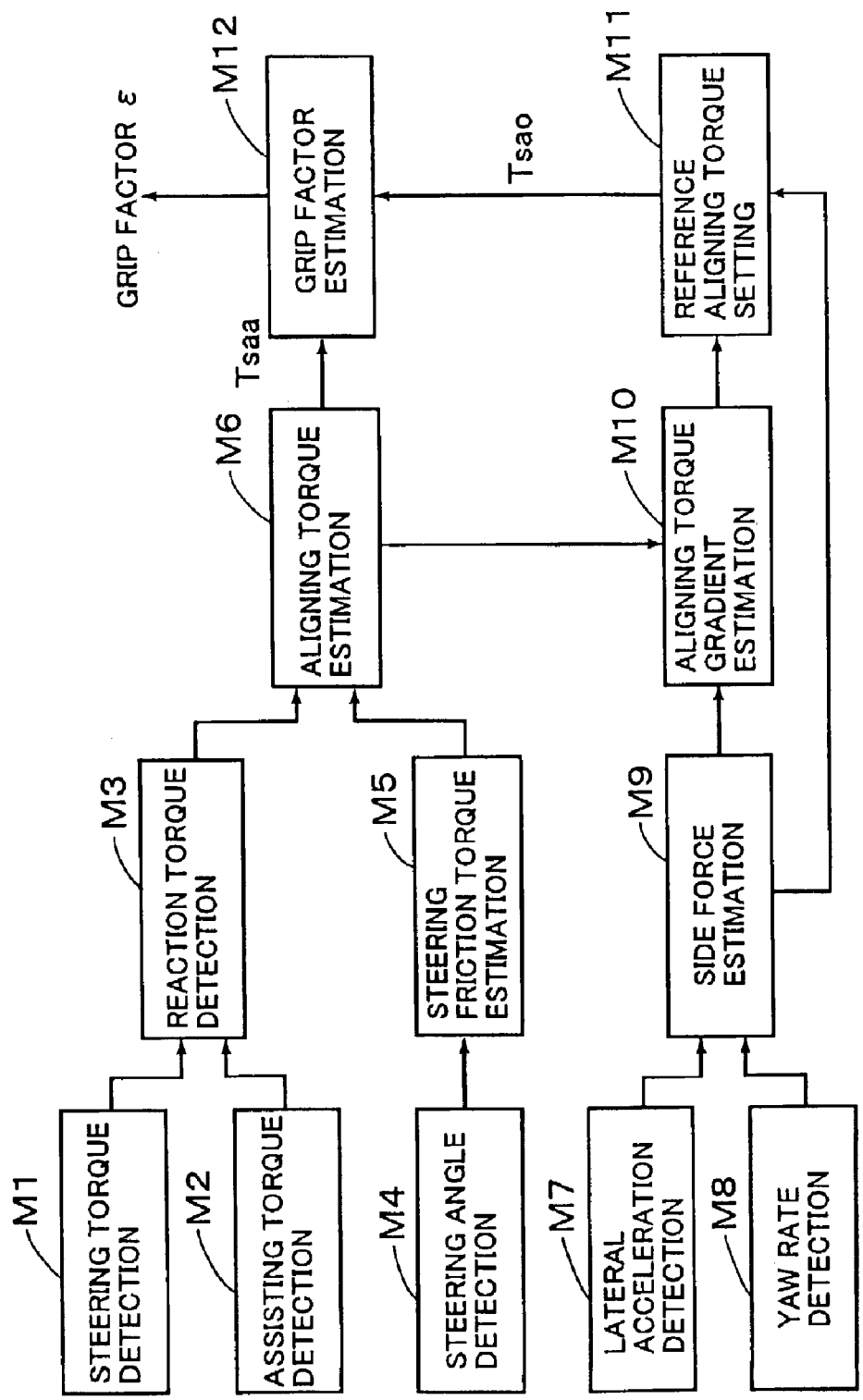
FIG. 1 is a schematic block diagram of a wheel grip factor estimation apparatus according to an embodiment of the present invention.

Referring to FIG. 1, there is schematically illustrated a wheel grip factor estimation apparatus according to an embodiment of the present invention. FIG. 1 illustrates a block diagram of the grip factor estimation apparatus for estimating the grip factor on the basis of the side force and aligning torque. At the outset, an example of estimating the grip factor with reference to FIGS. 2–4.

Figure 2:
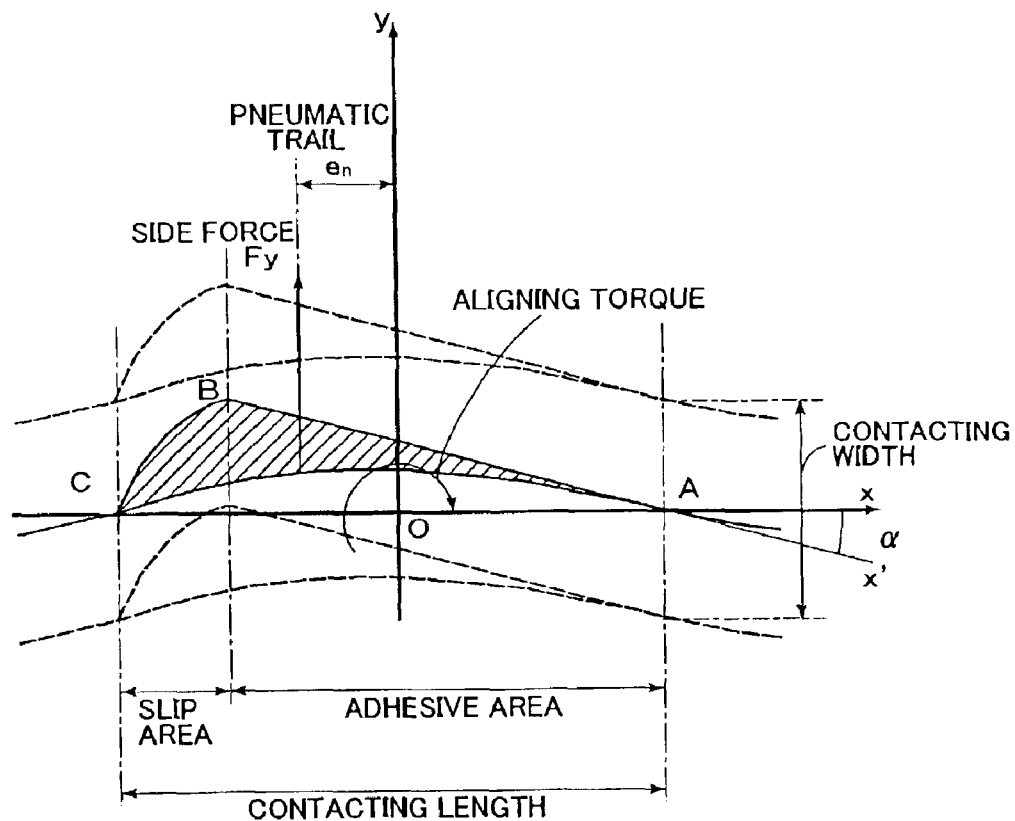
FIG. 2 is a diagram showing a relationship between aligning torque and side force, when a tire is advanced, skidding in a lateral direction.
Figure 3:
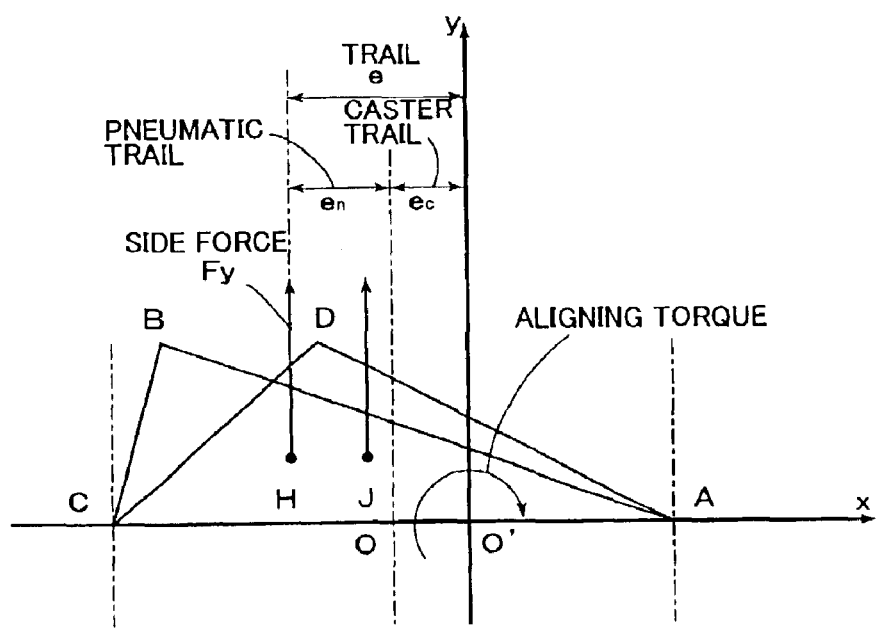
FIG. 3 is a diagram simplifying the relationship between aligning torque and side force as shown in FIG. 2.
Figure 4:
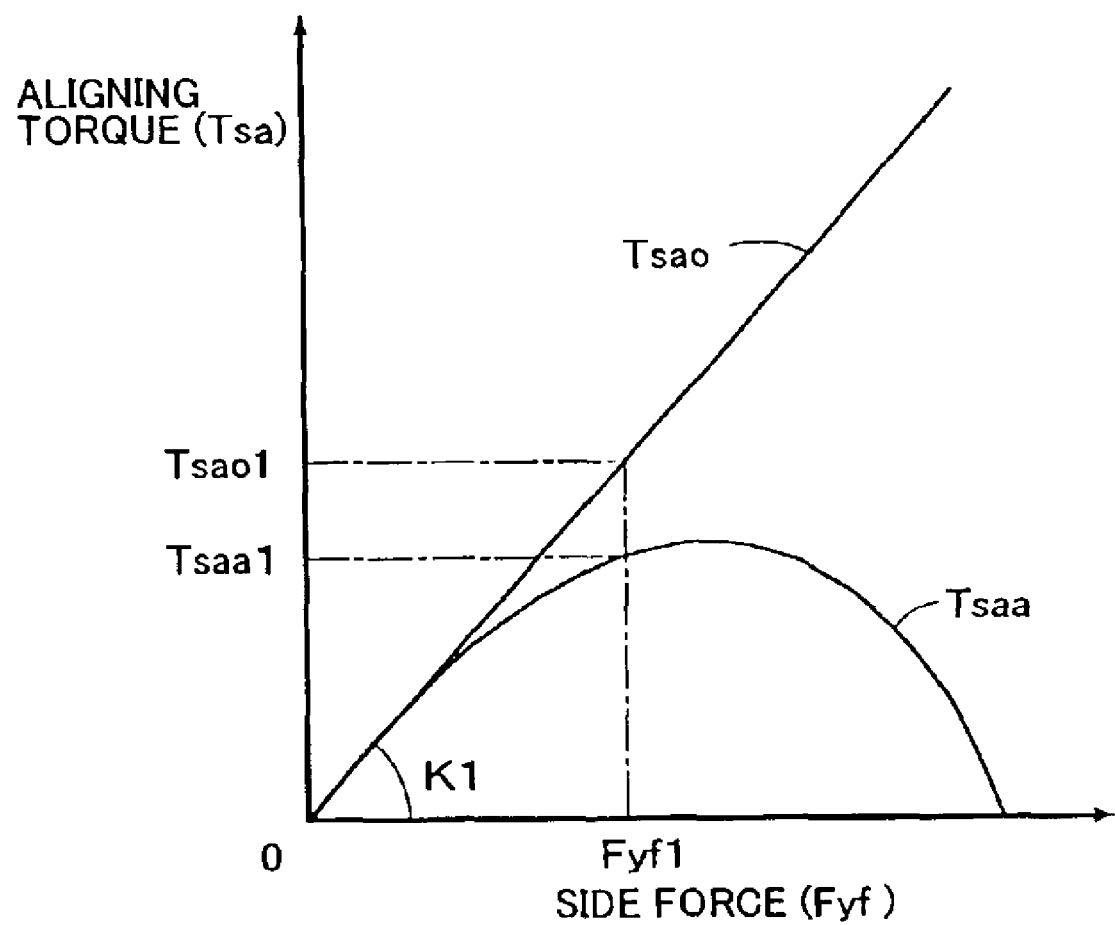
FIG. 4 is a diagram showing a relationship between aligning torque and side force according to an embodiment of the present invention.

As explained heretofore referring to FIGS. 2 and 3, the characteristic of the aligning torque to the side force of the front wheel will be the one as indicated by Tsaa in FIG. 4. In this case, when the actual aligning torque is indicated by Tsaa and the side force of the front wheel is indicated by Fyf, the actual aligning torque Tsaa can be given by Tsaa=Fyf·$(e_n+e_c)$, wherein a nonlinear characteristic of the actual aligning torque Tsaa to the front side force Fyf indicates a linear variation of the pneumatic trail $e_n$. Therefore, a gradient K1 of the actual aligning torque Tsaa to the front side force Fyf is identified in the vicinity of the origin (0), to obtain a characteristic as indicated by the aligning torque characteristic in the state that the tire is completely gripped, i.e., reference aligning torque Tsao. As for the gradient K1, may be employed a predetermined value which is obtained by an experiment as an initial value, and may be identified to be corrected during a normal driving operation of the vehicle, where the grip factor is large. The actual aligning torque Tsaa can be obtained in accordance with a calculation as described later in detail.

Then, the grip factor ε is estimated in accordance with the relationship of the actual aligning torque Tsaa to the reference aligning torque Tsao. For example, on the basis of the value Tsao1 (=K1·Fyf1) of the reference aligning torque Tsao and the value Tsaa1 of the actual aligning torque Tsaa, which are obtained when the side force of the front wheel is Fyf1, the grip factor ε can be obtained by ε=Tsaa1/Tsao1.

Figure 11:
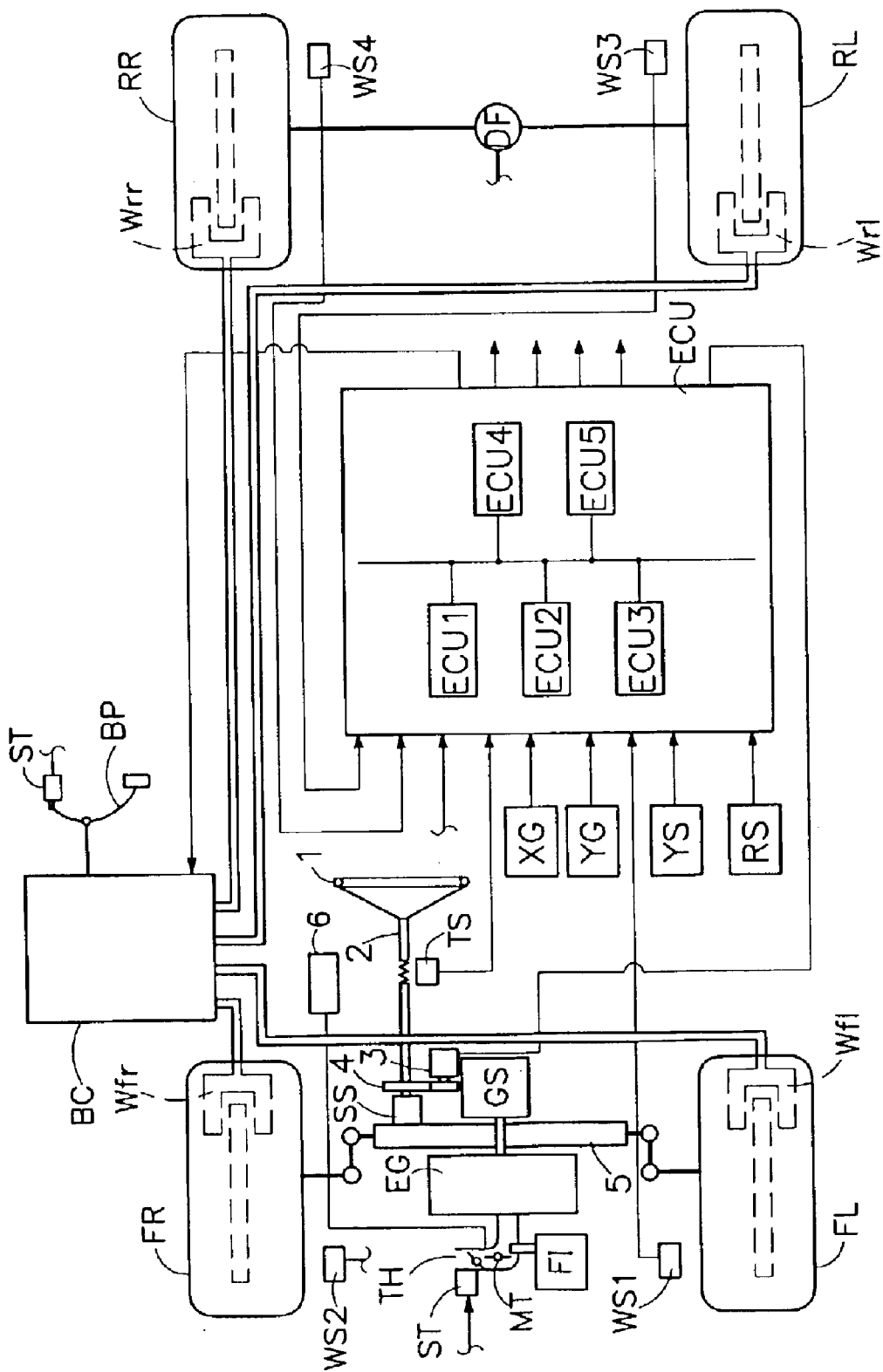
FIG. 11 is a schematic block diagram of a vehicle motion control apparatus according to an embodiment of the present invention.
Figure 12:
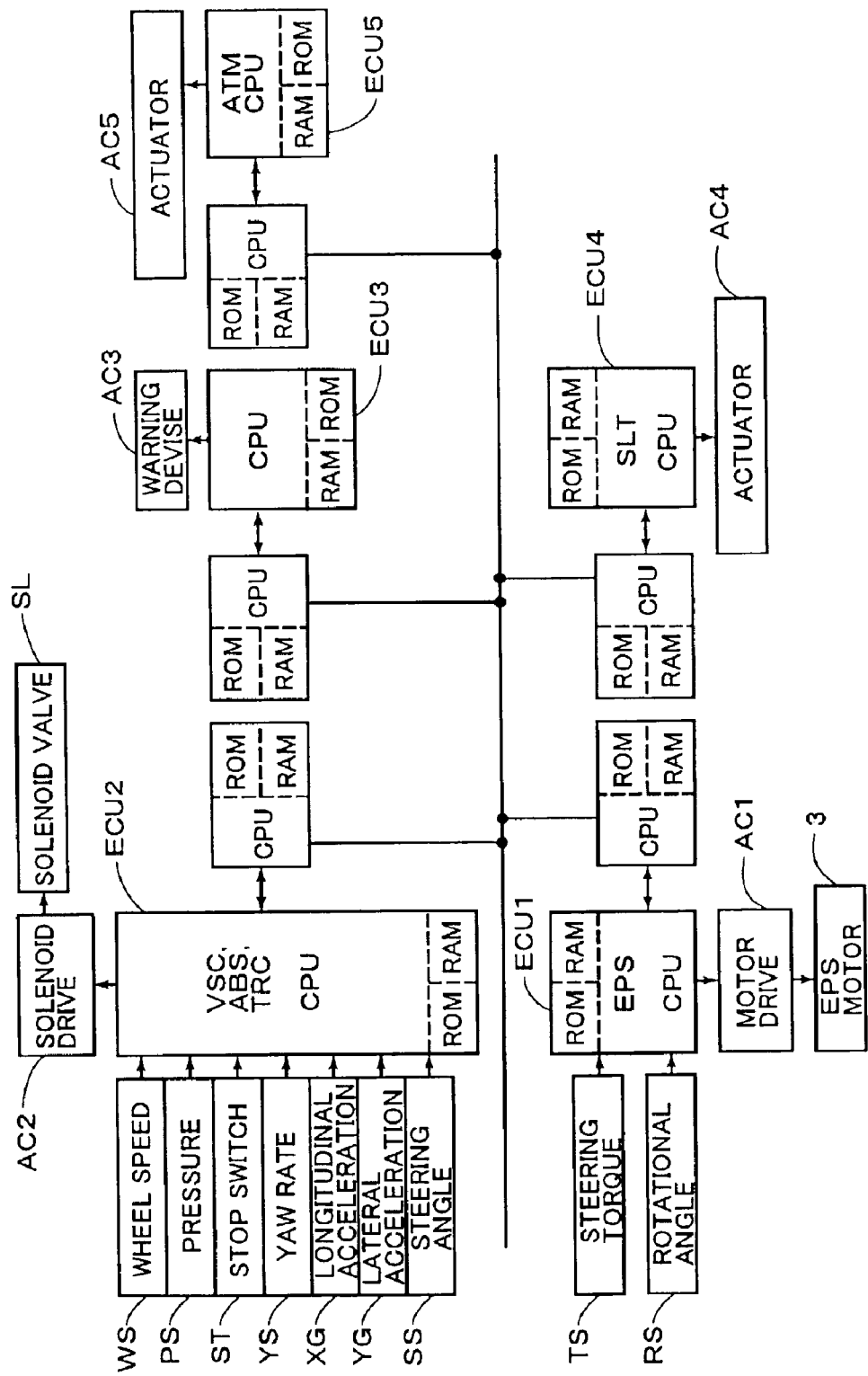
FIG. 12 is a block diagram illustrating systems of a motion control apparatus according to an embodiment of the present invention.

As described above, the wheel grip factor can be estimated by the variation of the aligning torque (actual aligning torque Tsaa) to the side force (front side force Fyf), according to an apparatus as constituted in FIG. 1, which may be constituted practically as shown in FIGS. 11 and 12. Referring to FIG. 1, at the outset, as a steering factor detection unit for detecting at least one of steering factors including a steering torque and steering effort applied to a steering system extending from a steering wheel (not shown) to a suspension (not shown) of the vehicle, there are provided a steering torque detection unit M1 and an assisting torque detection unit M2. On the basis of the results detected by those units M1 and M2, a reaction torque is estimated by the reaction torque estimation unit M3.

In the present embodiment, an electric power steering apparatus EPS is provided, as shown in FIG. 11. According to the electric power steering apparatus EPS of the present embodiment, a steering torque Tstr which is applied to a steering shaft 2 with a steering wheel 1 operated by a vehicle driver, is detected by a steering torque sensor TS, and an electric motor 3 is controlled in response to the detected steering torque Tstr, to steer front wheels FL and FR through a speed reducing gear 4, and rack and pinion 5, so as to assist the steering operation of the vehicle driver. The steering angle is detected by a steering angle sensor SS as shown in FIG. 11 which serves as a steering angle detection unit M4. Then, a steering friction torque is estimated by a friction torque estimation unit M5, as described later in detail.

On the basis of the results of the reaction torque estimation unit M3 and friction torque estimation unit M5, therefore, the actual aligning torque Tsaa produced on the front wheels FL, FR is estimated by an aligning torque estimation unit M6. With respect to the vehicle state variable detection means for detecting a state variable of the vehicle, a lateral acceleration detection unit M7 and a yaw rate detection unit M8 are provided in the present embodiment. On the basis of the signals detected by the units M7 and M8, at least one of the wheel factors including the side force and slip angle applied to the front wheels FL and FR, e.g., the front side force Fyf as shown in FIG. 1, is estimated by a side force estimation unit M9 which serves as the wheel factor estimation means. The front side force Fyf can be estimated on the basis of the results detected by the lateral acceleration detection unit M7 and yaw rate detection unit M8, in accordance with the following equation:

$$Fyf = \frac{Lr \cdot m \cdot Gy + Iz \cdot \frac{d\gamma}{dt}}{L}$$

where "Lr" is a distance from the gravity center to the rear axle, "m" is a vehicle mass, "L" is a wheelbase, "Iz" is a yaw moment of inertia, "Gy" is a lateral acceleration, and "dγ/dt" is a differentiated value of yaw rate.

Furthermore, a reference aligning torque is set by a reference aligning torque setting unit M11, on the basis of the actual aligning torque Tsaa estimated by the aligning torque estimation unit M6 and the front side force Fyf estimated by the side force estimation unit M9. For example, a gradient of the aligning torque in the vicinity of the origin (abbreviated as origin gradient) is estimated by an aligning torque gradient estimation unit M10. On the basis of the origin gradient and front side force, the reference aligning torque is set by the reference aligning torque setting unit M11. Then, on the basis of a comparison result between the reference aligning torque set by the reference aligning torque setting unit M11 and the aligning torque estimated by the aligning torque estimation unit M6, the grip factor ε for the front wheel(s) is estimated by the grip factor estimation unit M12. As shown in FIG. 1, on the basis of the actual aligning torque Tsaa estimated by the aligning torque estimation unit M6 and the front side force Fyf estimated by the side force estimation unit M9, the gradient K1 of the actual aligning torque Tsaa in the vicinity of the origin (0) in FIG. 4 can be obtained. Based on the gradient K1 and the front side force Fyf, the reference aligning torque Tsao can be given by Tsao=K1·Fyf, and compared with the the actual aligning torque Tsaa. Then, based on the result of the comparison, the grip factor ε can be obtained by ε=Tsaa/Tsao.

As described above, the electric power steering apparatus EPS is provided in the present embodiment, and an electric current for driving the apparatus EPS is proportional to the assisting torque. Therefore, the reaction torque can be estimated easily on the basis of the assisting torque and the result detected by the steering torque detection unit M1, as will be explained later in detail. Also, a torque caused by friction in the steering system is to be compensated. According to the friction torque estimation unit M5, therefore, calculated is a difference between the maximal reaction torque obtained when the steering wheel is rotated to increase the steering angle and the reaction torque obtained when the steering wheel is rotated to be placed in its original position, to provide the friction torque, which will be corrected in sequence. Consequently, the aligning torque (actual aligning torque Tsaa) can be estimated appropriately. With respect to detection of the aligning torque, the present invention is not limited to the above-described apparatus. For example, the aligning torque can be measured directly by signals detected by a load cell mounted on a steering shaft (not shown), or a strain gauge mounted on a suspension member (not shown).

Figure 5:
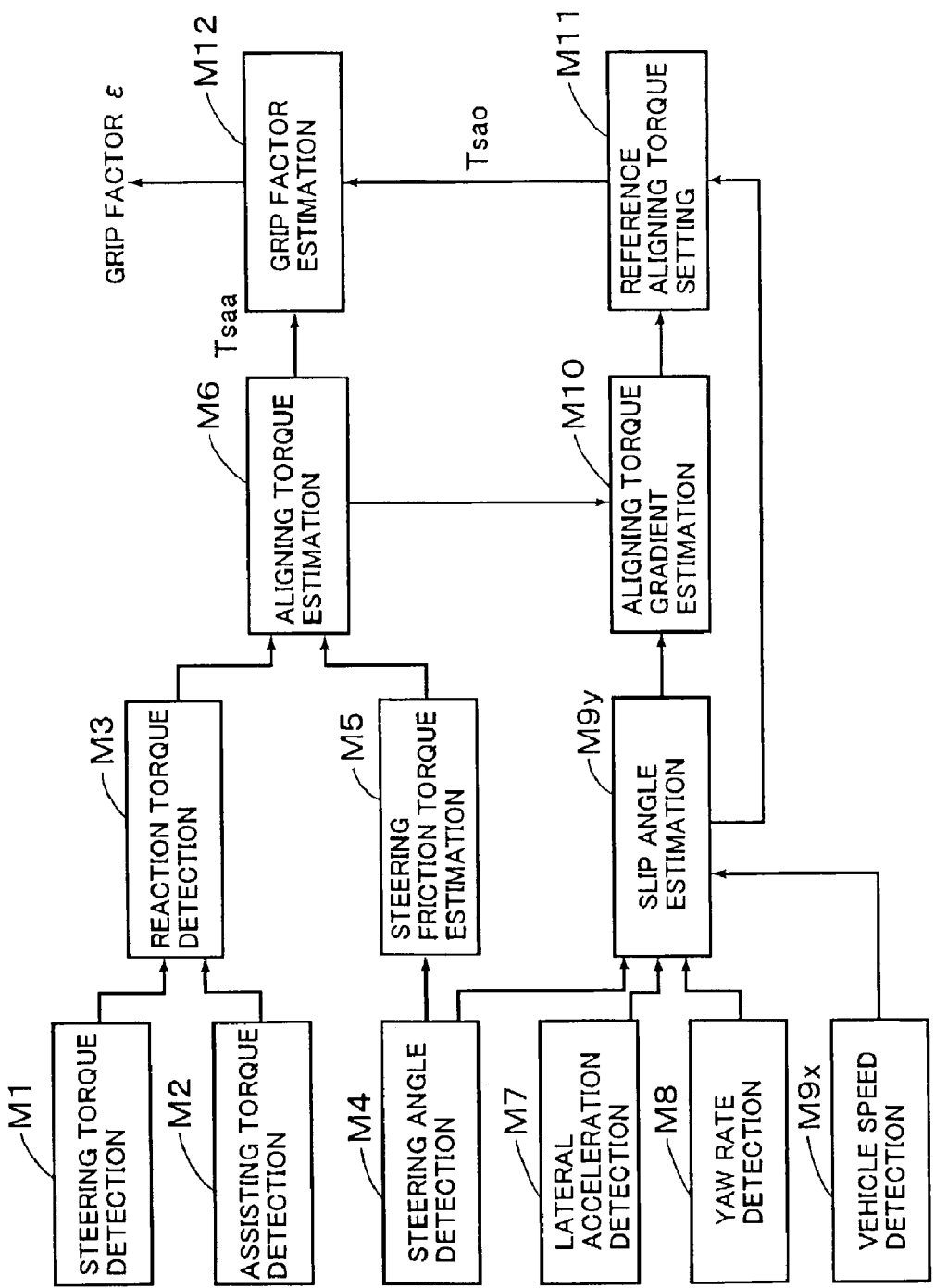
FIG. 5 is a schematic block diagram of a wheel grip factor estimation apparatus according to another embodiment of the present invention.

Next, referring to FIGS. 5–10, will be explained another embodiment of the wheel grip factor estimation apparatus according to the present invention. FIG. 5 shows a block diagram of the wheel grip factor estimation apparatus which is adapted to estimate the grip factor on the basis of the slip angle and aligning torque, wherein the blocks M1–M6 are the same as those shown in FIG. 1, so that the reaction torque and the friction torque in the steering system are calculated to estimate the aligning torque. Whereas, the slip angle can be calculated on the basis of the steering angle, yaw rate, lateral acceleration, and vehicle speed. Therefore, the signals detected by the steering angle detection unit M4, lateral acceleration detection unit M7 and yaw rate detection unit M8 are fed to a slip angle estimation unit M9y, together with a signal detected by a vehicle speed detection unit M9x. According to the slip angle estimation unit M9y, at the outset, a vehicle slip angular velocity dβ/dt is calculated on the basis of the yaw rate, lateral acceleration and vehicle speed, and then integrated to produce a vehicle slip angle β. The slip angle αf is calculated on the basis of the vehicle slip angle β, together with the vehicle speed, steering angle and vehicle specifications. The vehicle slip angle β may be obtained by estimation using a vehicle model, or combination of this estimation and the integration as described above.

Based upon the aligning torque and slip angle αf, the gradient of the aligning torque in the vicinity of the origin is identified by the aligning torque gradient estimation unit M10, then on the basis of the gradient and slip angle, the reference aligning torque is set by the reference aligning torque setting unit M11. Then, on the basis of a comparison result between the reference aligning torque set by the reference aligning torque setting unit M11 and the aligning torque estimated by the aligning torque estimation unit M6, the grip factor ε for the front wheel(s) is estimated by the grip factor estimation unit M12.

Figure 6:
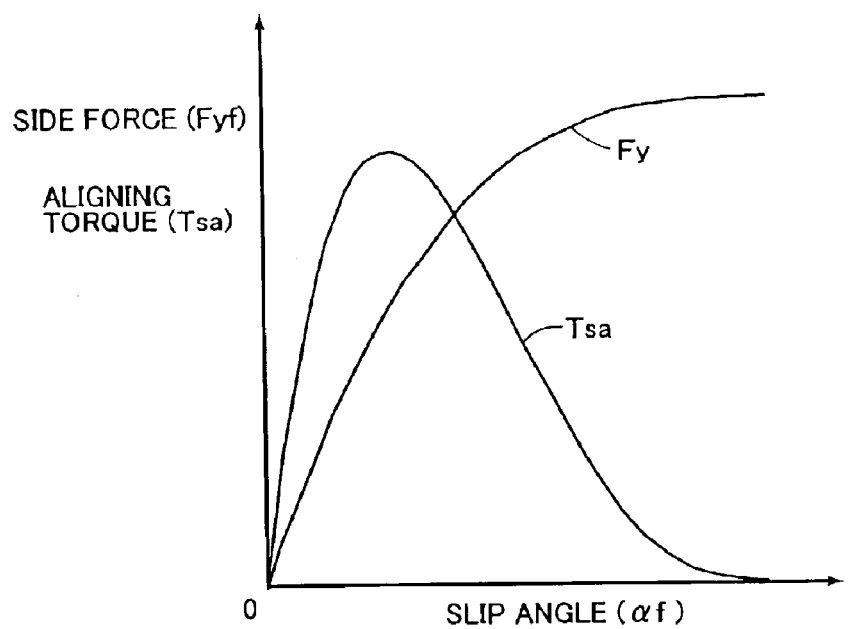
FIG. 6 is a diagram showing a relationship between aligning torque and side force to slip angle according to another embodiment of the present invention.
Figure 7:
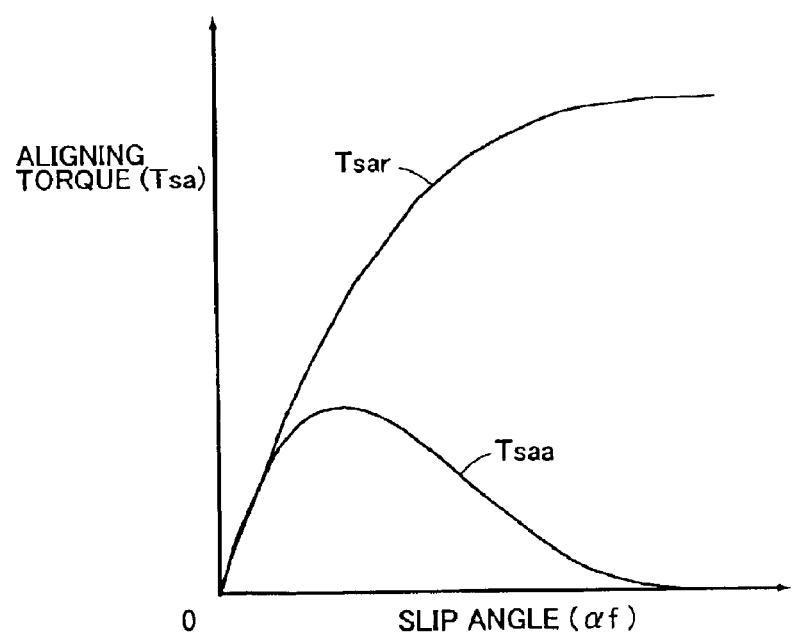
FIG. 7 is a diagram showing a relationship between aligning torque and slip angle according to another embodiment of the present invention.

Referring next to FIGS. 6–10, will be explained the estimation of the grip factor ε according to the embodiment as shown in FIG. 5. The relationship of the side force Fyf and aligning torque Tsa to the wheel slip angle, particularly the slip angle αf for the front wheel, are those as shown in FIG. 6 wherein they have nonlinear characteristics to the slip angle αf, respectively. As the aligning torque Tsa is the product of the front side force Fyf and trail e ($=e_n+e_c$), the characteristic of the aligning torque obtained in the case where the wheel (front wheel) is in the gripped state, i.e., the pneumatic trail $e_n$ is in the completely gripped state, indicates a nonlinear characteristic as indicated by "Tsar" in FIG. 7. According to the present embodiment, however, the characteristic of the aligning torque under the completely gripped state is supposed to be linear, and a gradient K2 of the aligning torque Tsa to the slip angle in the vicinity of the origin is obtained, to set a reference aligning torque (indicated by "Tsas" in FIG. 8). If the slip angle is αf1, for example, the reference aligning torque can be given by Tsasl=K2·αf1. And, the grip factor ε is estimated in accordance with the following equation:

$$\varepsilon = \frac{Tsaa1}{Tsas1} = \frac{Tsaa1}{K2 \cdot \alpha f1}$$

Figure 8:
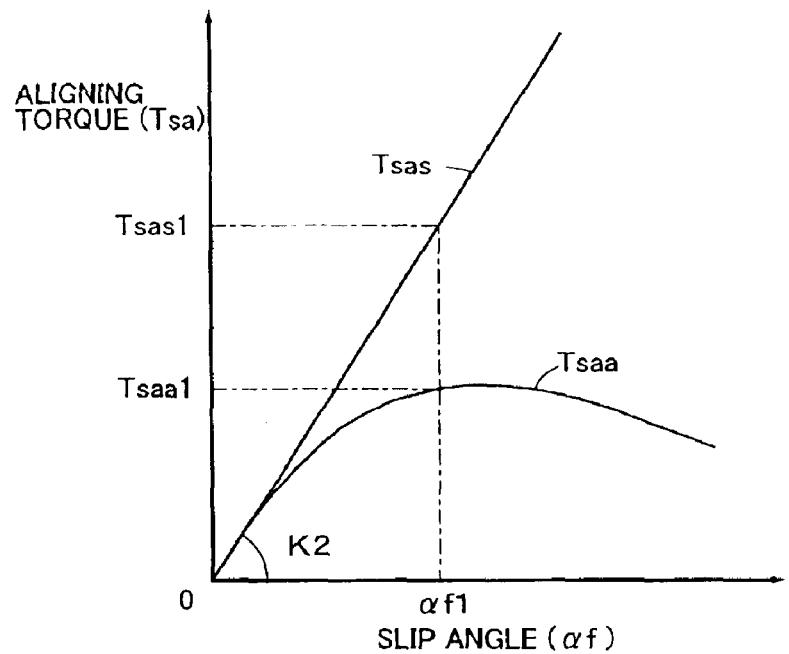
FIG. 8 is a diagram showing a relationship between aligning torque and slip angle according to another embodiment of the present invention.
Figure 9:
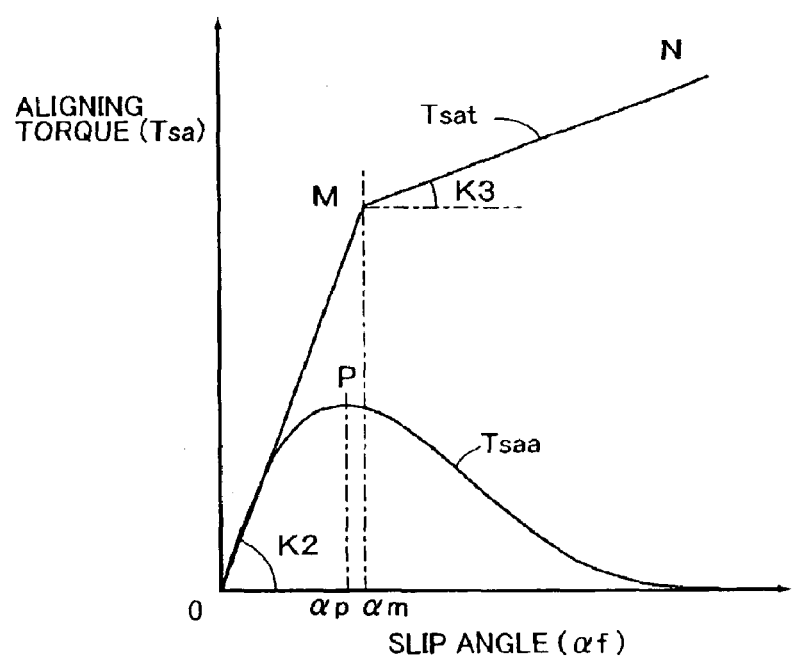
FIG. 9 is a diagram showing a relationship between aligning torque and slip angle according to another embodiment of the present invention.

As the characteristic of the aligning torque has been supposed to be linear, when the reference aligning torque was set in FIG. 8, an error to be caused when the grip factor is estimated will become so large in such an area that the slip angle αf is relatively large, that the accuracy in estimating the grip factor might be lessened. In this case, therefore, the gradient of aligning torque may be set to "K3", when the slip angle exceeds a predetermined slip angle, and the nonlinearity of the reference aligning torque may be approximated to a straight line of "OMN" as shown in FIG. 9. In this case, the gradient of aligning torque K3 may be obtained in advance by an experiment, and may be identified and corrected while the vehicle is running. In FIG. 8, the point (M) may be set on the basis of the inflection point (P) of the actual aligning torque. For example, after the inflection point (P) is obtained, the point (M) may be set by the slip angle αm which is larger than the slip angle αp corresponding to the inflection point (P) by a predetermined value.

Figure 10:
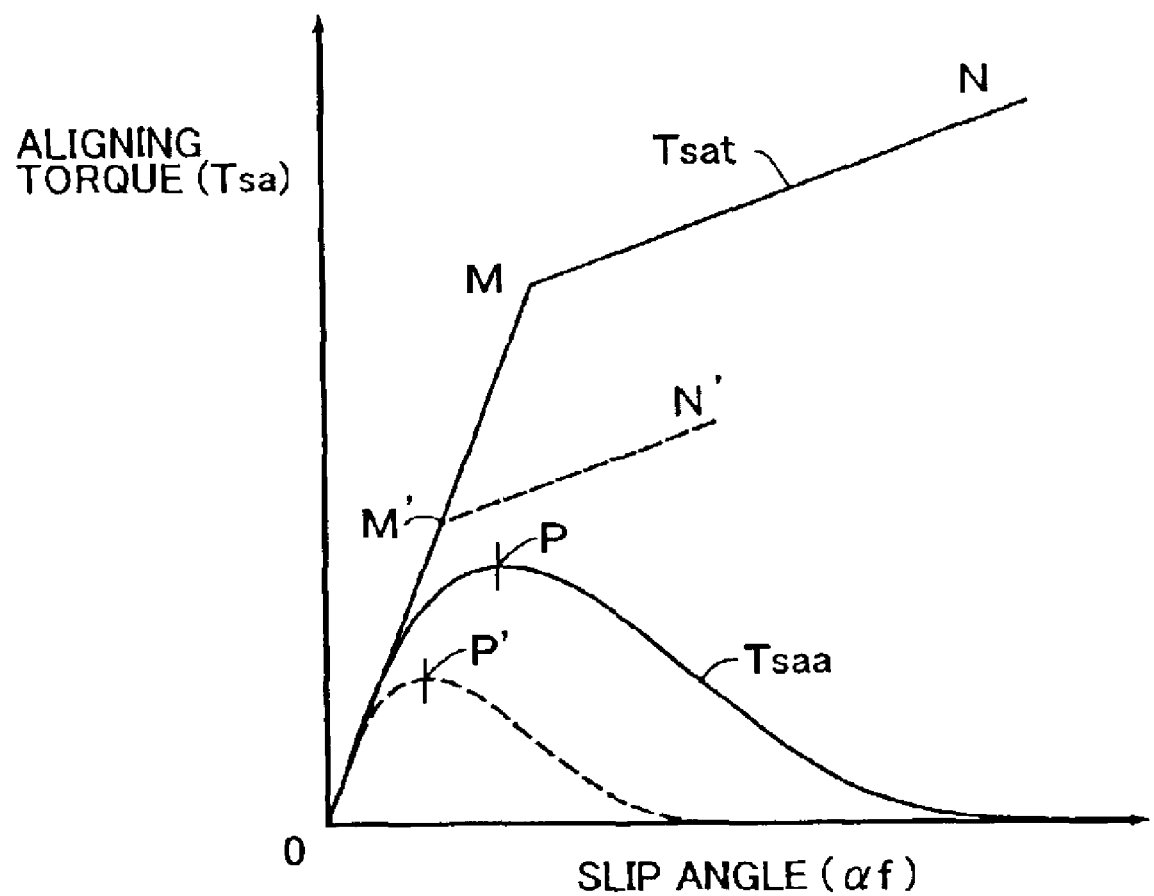
FIG. 10 is a diagram showing a relationship between aligning torque and slip angle according to another embodiment of the present invention.

Furthermore, as the reference aligning torque to the slip angle is affected by the road coefficient of friction μ, the reference aligning torque characteristic may be set at high accuracy by setting the reference aligning torque on the basis of the inflection point (P) of the actual aligning torque Tsaa as shown in FIG. 10. For example, when the road coefficient of friction μ is reduced, the characteristic of the actual aligning torque Tsaa is changed from a rigid line to a broken line as shown in FIG. 10. In other words, if the road coefficient of friction μ is reduced, the inflection point of the actual aligning torque Tsaa is changed from the point (P) to a point (P'). Therefore, the reference aligning torque characteristic (Tsat) is required to change "OMN" to "OM'N'". In this case, the point (M') is set on the basis of the inflection point (P'), even if the road coefficient of friction μ is changed, the reference aligning torque characteristic can be set in accordance with the change of the road coefficient of friction μ.

FIG. 11 illustrates an embodiment of the vehicle motion control apparatus which is provided with the wheel grip factor estimation apparatus as described above, and the electric power steering apparatus EPS. The electric power steering apparatus EPS has been on the market, wherein the steering torque Tstr applied to the steering shaft 2 with the steering wheel 1 operated by the vehicle driver, is detected by the steering torque sensor TS, and the EPS motor (electric motor) 3 is controlled in response to the detected steering torque Tstr, to steer front wheels FL and FR through the speed reducing gear 4 and rack and pinion 5, so as to assist the steering operation of the vehicle driver. According to the present embodiment, an engine EG is an internal combustion engine which is provided with a fuel injection apparatus FI and a throttle control apparatus TH, which is adapted to control a main throttle opening of a main throttle valve MT in response to operation of an accelerator pedal 6. The throttle control apparatus TH has a sub-throttle valve ST which is actuated in response to an output signal of an electronic controller ECU to control a sub-throttle opening. Also, the fuel injection apparatus FI is actuated in response to an output signal of the electronic controller ECU to control the fuel injected into the engine EG. According to the present embodiment, the engine EG is operatively connected with the rear wheels RL, RR through a transmission GS and differential gear DF to provide a so-called rear-drive system, but the present embodiment is not limited to the rear-drive system.

Next, with respect to a braking system according to the present embodiment, wheel brake cylinders Wfl, Wfr, Wrl, Wrr are operatively associated with the wheels FL, FR, RL, RR of the vehicle, respectively, and which is fluidly connected to a hydraulic braking pressure control apparatus BC, which will be described later with reference to FIG. 13. The wheel FL designates the wheel at the front left side as viewed from the position of a driver's seat, the wheel FR designates the wheel at the front right side, the wheel RL designates the wheel at the rear left side, and the wheel RR designates the wheel at the rear right side.

As shown in FIG. 11, at the wheels FL, FR, RL and RR, there are provided wheel speed sensors WS1 to WS4 respectively, which are connected to the electronic controller ECU, and by which a signal having pulses proportional to a rotational speed of each wheel, i.e., a wheel speed signal is fed to the electronic controller ECU. There are also provided a stop switch ST which turns on when the brake pedal BP is depressed, and turns off when the brake pedal BP is released, a steering angle sensor SS for detecting a steering angle θh of the front wheels FL and FR, a longitudinal acceleration sensor XG for detecting a vehicle longitudinal acceleration Gx, a lateral acceleration sensor YG for detecting a vehicle lateral acceleration Gy, a yaw rate sensor YS for detecting a yaw rate γ of the vehicle, steering torque sensor TS, turning angle sensor RS for detecting a turning angle of the EPS motor 3, and so on. These are electrically connected to the electronic controller ECU.

FIG. 12 shows an overall system of the present invention, wherein the steering control system (EPS), brake control system (ABS, TRC, VSC), throttle control system (SLT), shift control system (ATM), and warning system are connected with each other through the communication bus, so that each system may hold each information commonly. The steering control system includes a steering control unit ECU1 which is provided with CPU, ROM and RAM for the electric steering control (EPS), and to which the steering torque sensor TS and turning angle sensor RS are connected, and also the EPS motor 3 is connected through a motor drive circuit AC1. The brake control system is adapted to perform the anti-skid control (ABS), traction control (TRC), and vehicle stability control (VSC), and includes a brake control unit ECU2 which is provided with CPU, ROM and RAM for the brake control, and to which the wheel speed sensors WS, hydraulic pressure sensor PS, stop switch ST, yaw rate sensor YS, longitudinal acceleration sensor XG, lateral acceleration sensor YG and steering angle sensor SS are connected, and also solenoid valves SL are connected through a solenoid drive circuit AC2.

The warning system is adapted to output a warning signal when the estimated grip factor is less than a predetermined value, and includes a warning control unit ECU3 which is provided with CPU, ROM and RAM for the warning control, and to which a warning apparatus AC3 for providing the warning information through an indicator or audio system or the like. The throttle control (SLT) system includes a throttle control unit ECU4 which is provided with CPU, ROM and RAM for the throttle control, and to which a throttle control actuator AC4 is connected. Likewise, the shift control system includes a shift control unit ECU5 which is provided with CPU, ROM and RAM for the shift control of the automatic transmission (ATM), and to which a shift control actuator AC5 is connected. Those control units ECU1-ECU5 are connected to the communication bus through a communication unit provided with CPU, ROM and RAM for the communication, respectively. Accordingly, the information required for each control system can be transmitted by other control systems.

Figure 13:
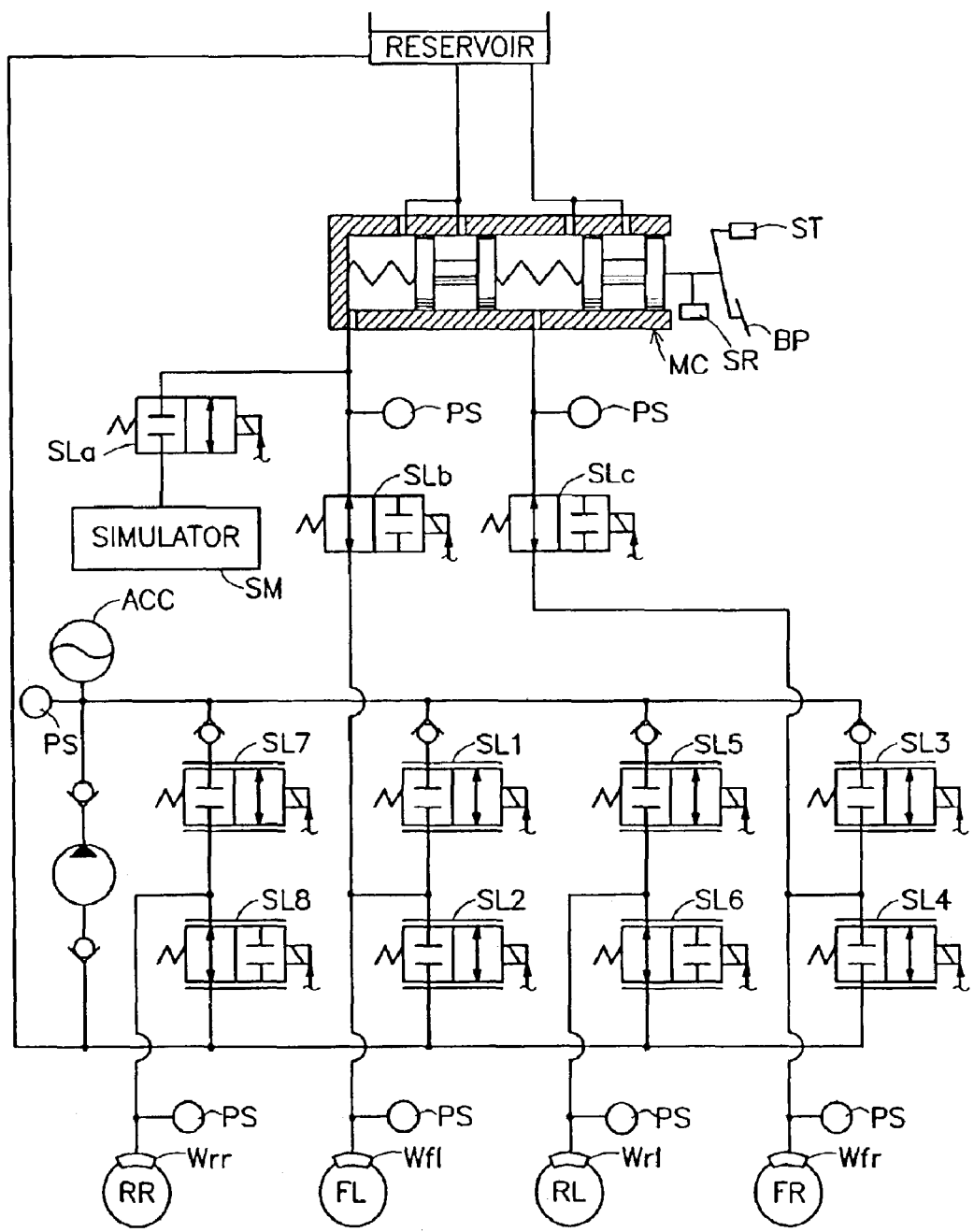
FIG. 13 is a block diagram illustrating a hydraulic braking apparatus according to an embodiment of the present invention.

FIG. 13 shows an example of the hydraulic braking pressure control apparatus BC according to the present embodiment, which is called as brake-by-wire, which is practically described in Japanese Patent Laid-open Publication No.2000-62597, and the operation of which is briefly described hereinafter. In a normal operation, pressure circuits for connecting a master cylinder MC with the wheel brake cylinders Wfl, Wfr, Wrl and Wrr are disconnected. The requirement for braking the vehicle by the driver is detected by the braking amount detection unit including a brake pedal stroke sensor SR, depressing force sensor, master cylinder pressure sensor or the like. And, on the basis of the detected braking amount, a target braking force for each wheel is determined, so that the braking pressure to each wheel is controlled by linear solenoid valves SL1–SL8. In braking operation, solenoid valves SLa, SLb and SLc of ON/OFF type are energized, so that the solenoid valve SLa is placed in its opened position, and the solenoid valves SLb and SLc are placed in their closed positions. Consequently, the master cylinder MC is separated from the wheel brake cylinders Wfl, Wfr, Wrl and Wrr, and communicated with a stroke simulator SM through the solenoid valve SLa. The braking pressure of each wheel is fed with the hydraulic pressure supplied by the high pressure accumulator ACC, and controlled by the linear solenoid valve (e.g., SL1) located at the accumulator side to each wheel and the linear solenoid valve (e.g., SL2) located at the reservoir side to each wheel, so that the braking force is controlled independently of each wheel. The hydraulic pressure circuit as shown in FIG. 13 is merely an example, so that the invention is not limited to it, but any circuit with the automatically pressurizing source may be used.

Figure 14:
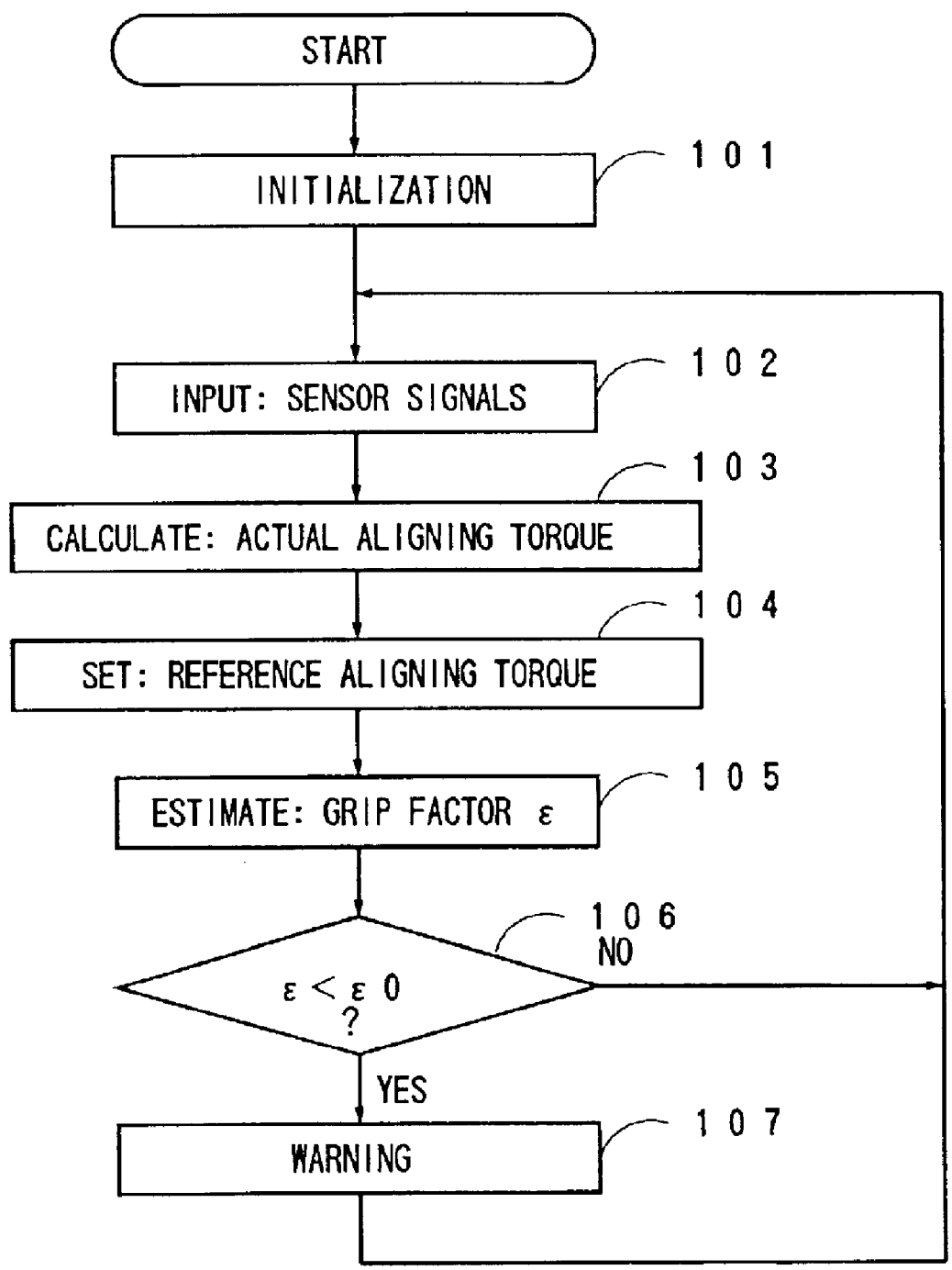
FIG. 14 is a flowchart showing a routine for warning reduction of a grip factor to a vehicle driver, according to an embodiment of the present invention.

According to the vehicle motion control apparatus having the wheel grip estimation apparatus as constituted above, various controls will be performed as follows. FIG. 14 is a flowchart showing a process for warning reduction in the grip factor to the vehicle driver. At the outset, the program provides for initialization of the system at Step 101, and the signals detected by various sensors are read at Step 102. Then the program proceeds to Step 103 where the actual aligning torque Tsaa is estimated on the basis of those signals as explained hereinafter.

In the present embodiment, there is provided the electric power steering apparatus as shown in FIG. 11, wherein the steering torque Tstr applied to the steering shaft 2 according to the steering operation, is detected by the steering torque sensor TS, and the EPS motor 3 is controlled in response to the detected steering torque Tstr, to assist the steering operation of the vehicle driver. In this case, the aligning torque produced on the tire of the front wheel will balance with a torque which is obtained by subtracting a friction component in the steering system from the sum of the steering torque according to the steering operation and the torque output from the electric power steering apparatus. Therefore, the actual aligning torque Tsaa can be obtained in accordance with the following equation:

$$Tsaa = Tstr + Teps - Tfrc$$

where "Tstr" is the torque applied to the steering shaft 2 according to the driver's steering operation, and detected by the steering torque sensor TS. "Teps" is the torque output from the electric power steering apparatus. This can be estimated on the basis of the value of electric current for driving the motor, because the value of electric current for driving the EPS motor 3 and the output torque of the motor are related in a certain relationship, i.e., the motor output torque is approximately proportional to the motor electric current. "Tfrc" is the friction component in the steering system, i.e., the torque component resulted from the friction caused in the steering system.

Figure 24:
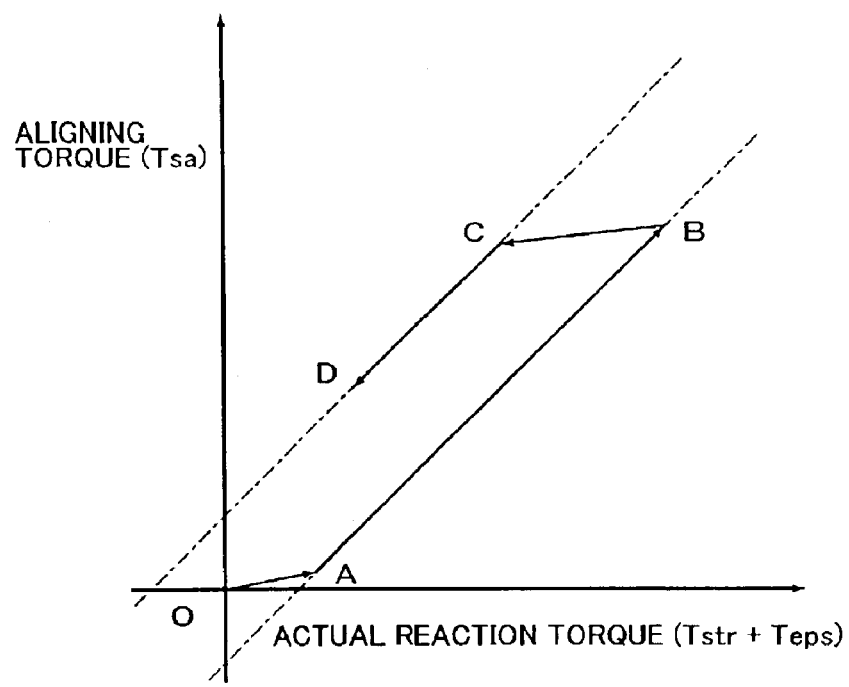
FIG. 24 is a diagram showing a characteristic of friction component of steering system for use in correcting the aligning torque to be estimated, according to an embodiment of the present invention.

According to the present embodiment, therefore, the friction component Tfrc is subtracted from the sum of (Tstr+Teps), to be corrected as will be explained with reference to FIG. 24, so that the actual aligning torque Tsaa is obtained. When the vehicle is running along a straight lane, the actual reaction torque (Tstr+Teps) is zero. When the driver starts the steering operation to begin turning the steering wheel, the actual reaction torque will be produced. First, the torque for compensating the Coulomb's friction will be produced, then the front wheels FL and FR (tires) will be turned to produce the aligning torque. Therefore, in the initial period for changing from the state where the vehicle is running along the straight lane to the state where the steering operation has started, the aligning torque has not been produced yet, with the actual reaction torque increased, as indicated by 0-A in FIG. 24. As a result, the estimated aligning torque will be output as the actual aligning torque Tsaa (this is in fact the estimated value with the correction made, but the word of "estimated" is omitted herein), with a slight gradient to the actual reaction torque. With the steering wheel turned (or rotated) further, if the actual reaction torque exceeds the friction torque area, the actual aligning torque Tsaa will be output along A-B in FIG. 24. If the steering wheel is returned toward its original position, so that the actual reaction torque is reduced, then the actual aligning torque Tsaa will be output along B-C in FIG. 24, with a slight gradient to the actual reaction torque. And, if the actual reaction torque exceeds the friction torque area, the actual aligning torque Tsaa will be output along C-D in FIG. 24, in the same manner as the steering wheel is turned further.

Referring back to FIG. 14, the reference aligning torque (Tsao) is calculated at Step 104, and the grip factor $\epsilon$ is estimated at Step 105, in accordance with the aforementioned process. Then, the program proceeds to Step 106 where the grip factor $\epsilon$ is compared with a predetermined value $\epsilon 0$. If the grip factor $\epsilon$ is determined to be less than the predetermined value $\epsilon 0$, the program proceeds to Step 107 where the fact is informed to the driver, with the indication or voice output to the driver. In addition, it may be so constituted that the voice will be output to reduce the operation of the accelerator, or increase the brake operation.

Figure 15:
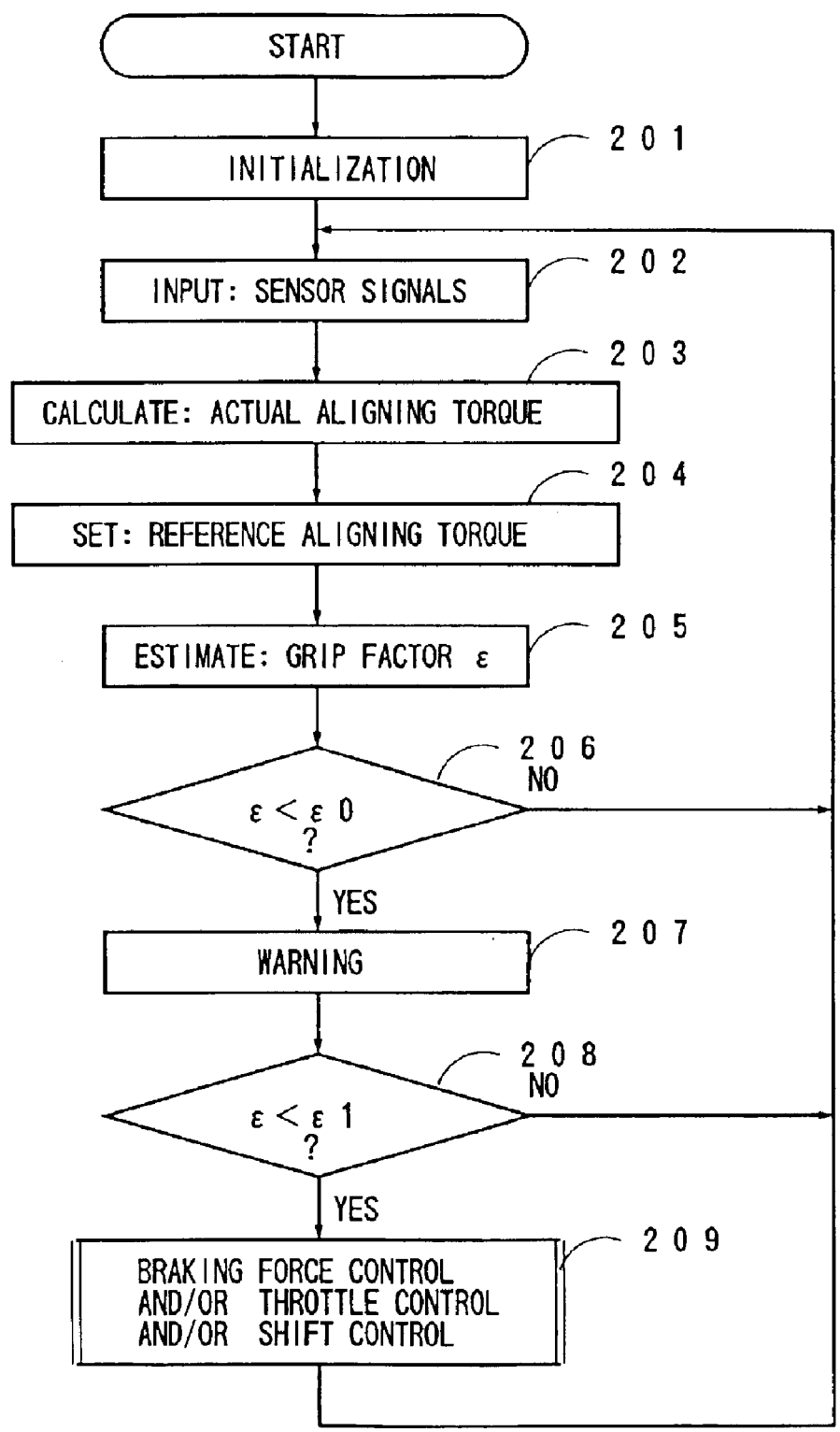
FIG. 15 is a flowchart showing a routine for making a braking force control or the like in addition to a warning when a grip factor is reduced, according to an embodiment of the present invention.

FIG. 15 is a flowchart showing a process including a braking force control for reducing the vehicle speed, and/or the throttle control, and/or the shift control, in addition to the Steps as shown in FIG. 14, wherein Steps 201–207 are the same as Steps 101–107 in FIG. 14, so that the explanation of them are omitted. After the grip factor $\epsilon$ is determined to be less than the predetermined value $\epsilon 0$ at Step 206, the program proceeds to Step 207 where the fact is informed to the driver, and further the grip factor $\epsilon$ is compared with a predetermined value $\epsilon 1$ (<0) at Step 208. If the grip factor $\epsilon$ is determined to be less than the predetermined value $\epsilon 1$ at Step 208, the program proceeds to Step 209, where at least one of the braking force control, throttle control and shift control will be achieved. According to the braking force control, for example, the braking force is applied to at least one of the wheels to reduce the vehicle speed, even if the vehicle driver is not performing the braking operation. According to the throttle control, the throttle is controlled to reduce the vehicle speed. And, according to the shift control, the shift position is changed toward the position for reducing the vehicle speed, to result in a shift down.

Figure 16:
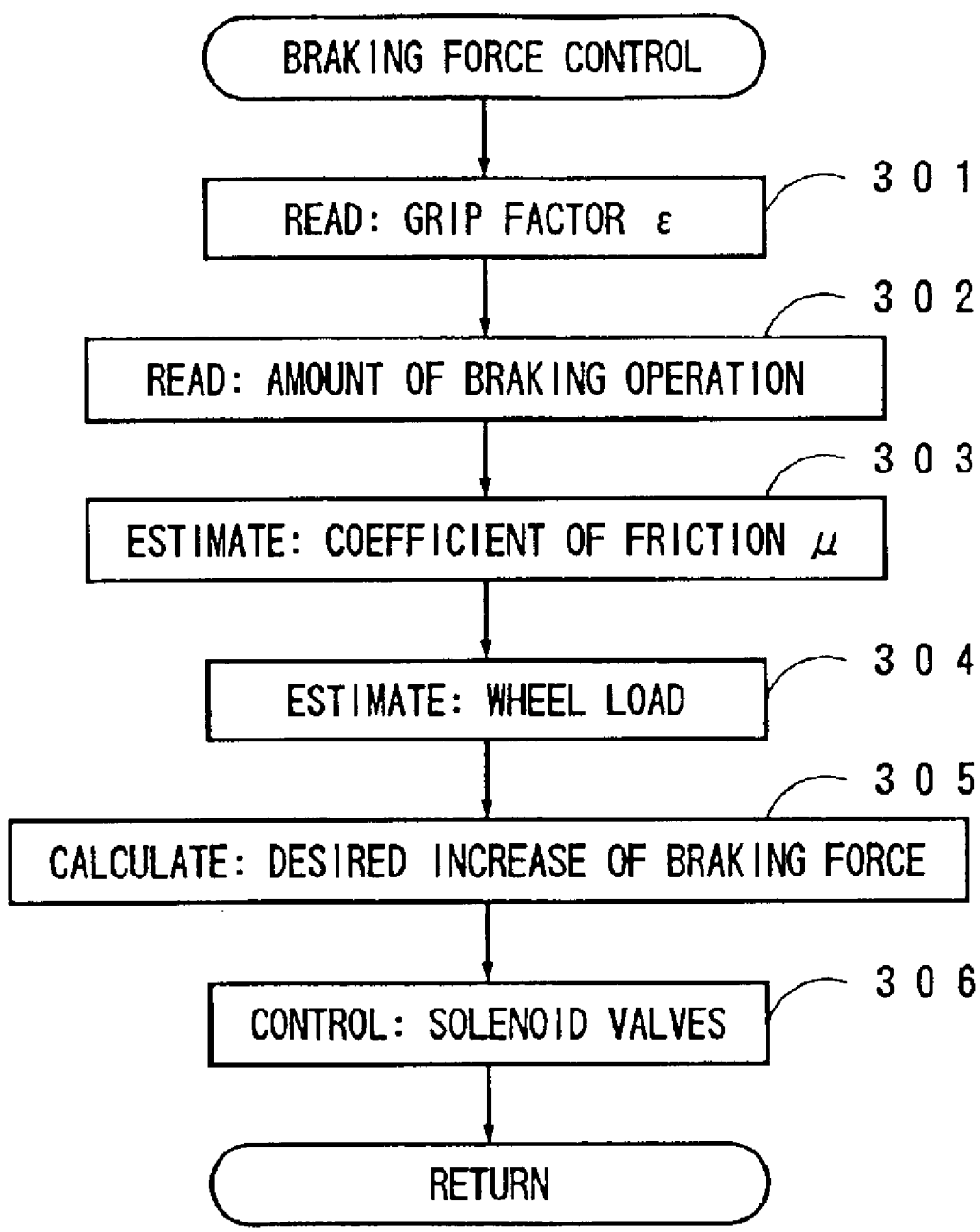
FIG. 16 is a flowchart showing an example of a subroutine for the braking force control as shown in FIG. 15.

FIG. 16 is a flowchart showing an example of the braking force control out of the aforementioned controls. At the outset, the grip factor $\epsilon$ is read at Step 301, and the amount of braking operation of the vehicle driver, i.e., the detected value of the stroke sensor SR in FIG. 13 is read at Step 302. Next, the road coefficient of friction $\mu$ is estimated at Step 303. The braking force control based upon the grip factor is initiated when the grip factor is reduced to a certain level, as in the control in FIG. 15. Therefore, it is possible to estimate the road coefficient of friction $\mu$ by using an inflection point of the actual aligning torque, i.e., the point (P) in FIG. 9. For example, on the basis of at least one of the amounts indicative of the vehicle state, including the aligning torque for creating the inflection point of the actual aligning torque, slip angle of the front wheel(s), side force and lateral acceleration. Next, the program proceeds to Step 304 where a vertical load to each wheel (wheel load) is calculated on the basis of the lateral acceleration (the detected value of the lateral acceleration sensor YG) and longitudinal acceleration (the detected value of the longitudinal acceleration sensor XG). On the basis of the estimated result and calculated result, i.e., the amount of braking operation of the vehicle driver, grip factor $\epsilon$, road coefficient of friction $\mu$, and wheel load, a desired increase of braking force for each wheel is determined at Step 305. Then, each solenoid valve SL in FIG. 13 is controlled at Step 306 on the basis of a desired braking force (or, target braking force) added by the desired increase of braking force, to achieve the following braking controls.

Figure 17:
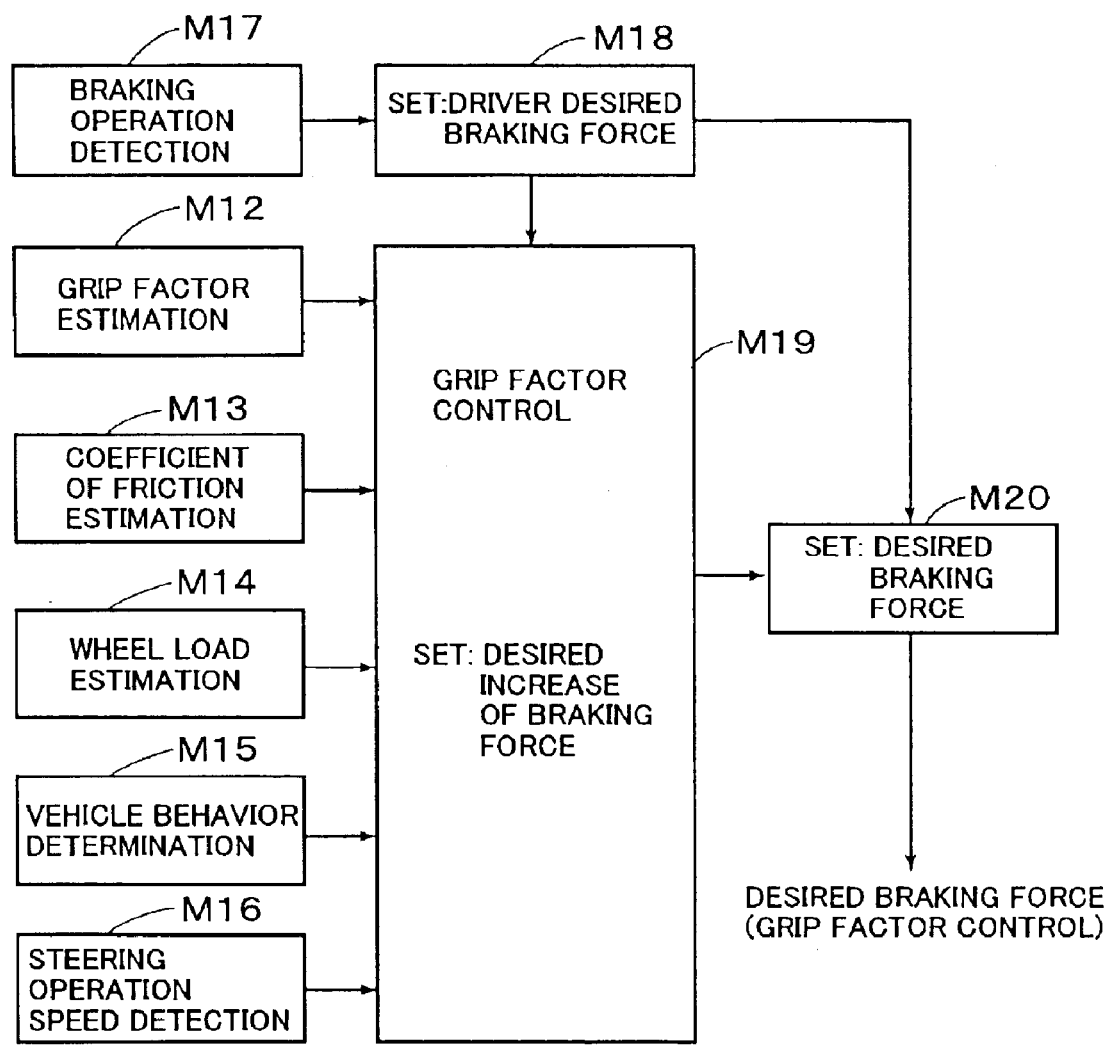
FIG. 17 is a block diagram showing a braking force control on the basis of a grip factor according to an embodiment of the present invention.

FIG. 17 shows a block diagram of the braking force control based upon the grip factor, wherein the increased amount of braking force based upon the grip factor is set on the basis of the amount of braking operation or desired braking force of the vehicle driver, estimated value of the grip factor $\epsilon$, estimated value of the road coefficient of friction, estimated value of the wheel load, result of determination of the vehicle behavior, and steering operation speed of the vehicle driver. The grip factor is estimated by the grip factor estimation unit M12 (the same in FIG. 1), the road coefficient of friction is estimated by a coefficient of friction estimation unit M13, on the basis of the inflection point (point (P) in FIG. 9) of the actual aligning torque. The wheel load is estimated by a wheel load estimation unit M14 as described before (at Step 304), and the vehicle behavior is estimated by a vehicle behavior estimation unit M15, as described later. The steering operation speed of the vehicle driver is detected by a steering operation speed detection unit M16. For example, a varying rate of the steering angle signals detected by the steering angle sensor SS as shown in FIG. 11 is calculated. And, the amount of braking operation by the vehicle driver is detected by a braking operation detection unit M17, e.g., stroke sensor SR in FIG. 13.

Furthermore, on the basis of the signal detected by the braking operation detection unit M17, the desired braking force for the vehicle driver is set by a desired braking force setting unit M18. On the basis of the results detected or set by the units M12–M16 and M18, the desired increase of braking force is set by a desired increase of braking force unit M19. Then, at a desired braking force setting unit M20, a desired value (or, target value) of braking force for each wheel is determined to add the desired increase of braking force to the desired braking force for the vehicle driver as described above. The braking force control based upon the grip factor may be executed, even when the vehicle driver is not making the braking operation. Therefore, even in the case where the vehicle has run into a curved road at a speed exceeding an ordinary limit for a cornering radius to the road, the vehicle can be held on the curved road maintaining the cornering radius, by controlling the braking force on the basis of the grip factor of the front wheel(s).

Figure 18:
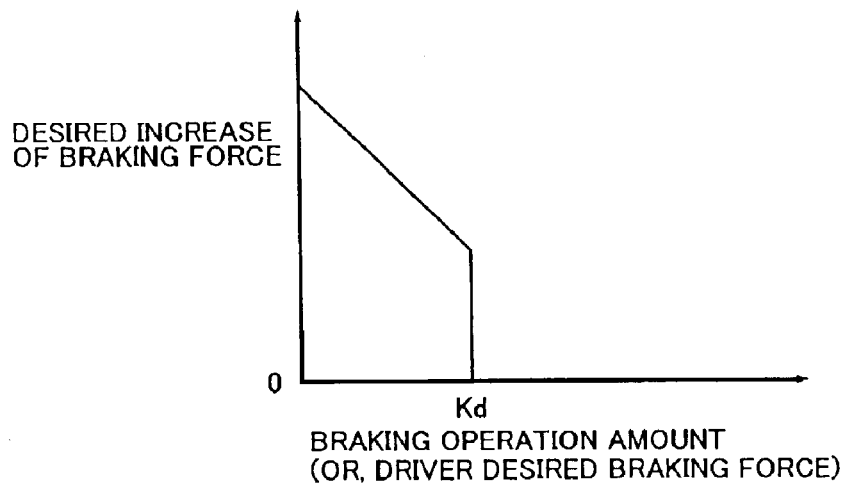
FIG. 18 is a diagram showing a map for a desired increase of braking force to a braking operation of a vehicle driver according to an embodiment of the present invention.
Figure 19:
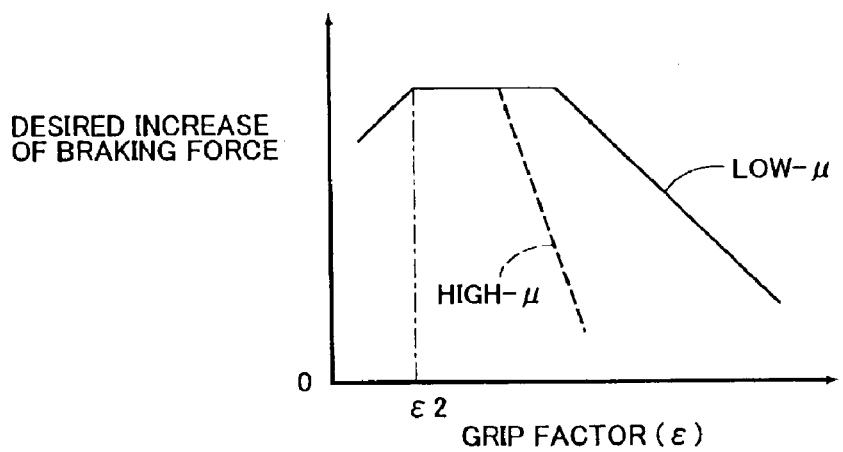
FIG. 19 is a diagram showing a map for a desired increase of braking force to a grip factor according to an embodiment of the present invention.

The desired increase of braking force for use in the braking force control based upon the grip factor is set in accordance with the following conditions. FIG. 18 shows a map of the desired increase of braking force based upon the amount of braking operation or desired braking force of the vehicle driver. When the vehicle driver is making the braking operation more than a predetermined amount (Kd), the braking operation is being made in accordance with a requirement for braking the vehicle, or the grip factor is being reduced by the braking operation. Therefore, the desired increase of braking operation or desired braking force of the vehicle driver is equal to or more than the predetermined amount (Kd), the desired increase of braking force is set to be zero. FIG. 19 shows a map of the desired increase of braking force to the grip factor $\epsilon$, wherein the desired increase of braking force is set to be increased, with the grip factor ε decreased. In this case, if the grip factor ε is decreased too much, the increase of braking force will cause further decrease of the grip factor ε. Therefore, the desired increase of braking force is set to be limited, if the grip factor ε is lower than a predetermined grip factor ε2. Also, a threshold level to the grip factor ε for determining the start of braking force control is set to be higher when the road coefficient of friction μ is relatively low as indicated by a solid line in FIG. 19, than the threshold level which is set when the road coefficient of friction μ is relatively high as indicated by a broken line in FIG. 19, so that the braking force control shall start from the state with the higher grip factor ε. In addition, it is desirable that when the road coefficient of friction μ is relatively low, the varying rate of desired increase of braking force to the grip factor ε is set to be relatively low, to change the vehicle behavior gradually.

Figure 20:
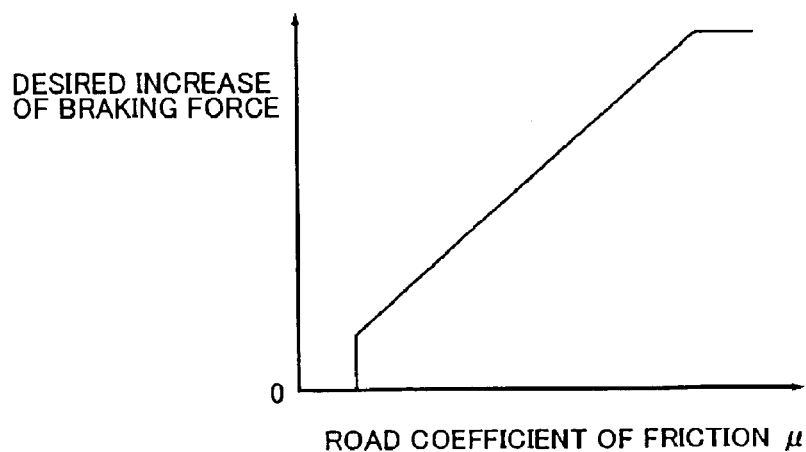
FIG. 20 is a diagram showing a map for a desired increase of braking force to a road coefficient of friction according to an embodiment of the present invention.
Figure 21:
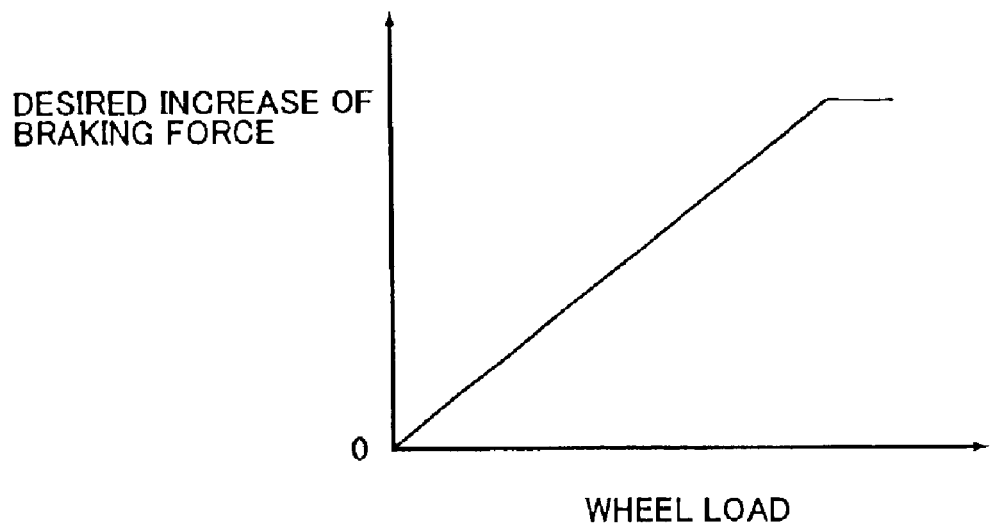
FIG. 21 is a diagram showing a map for a desired increase of braking force to a wheel load according to an embodiment of the present invention.
Figure 22:
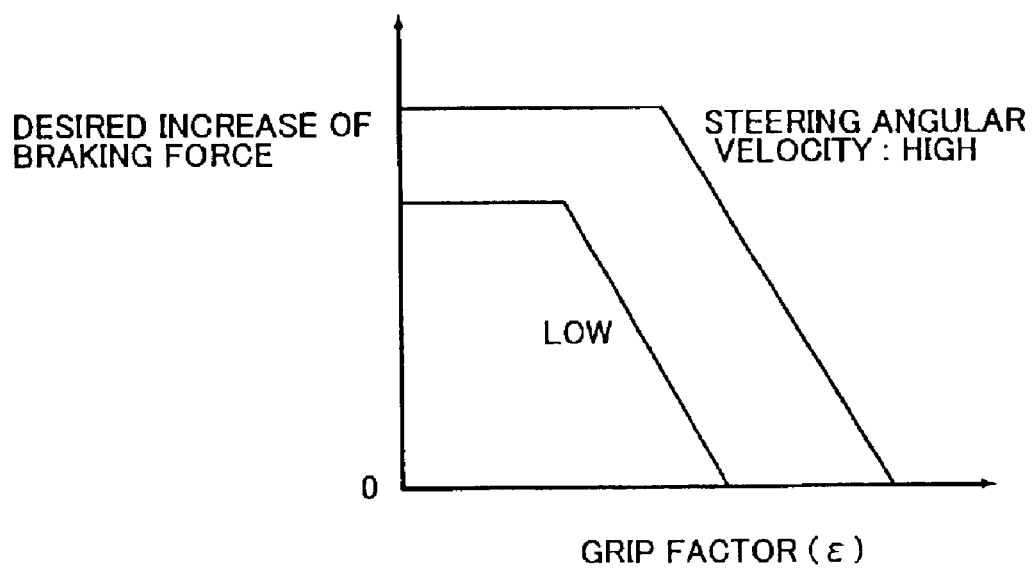
FIG. 22 is a diagram showing a map for a desired increase of braking force to a steering operation speed of a vehicle driver and a grip factor, according to an embodiment of the present invention.

FIG. 20 shows a map of the desired increase of braking force to the road coefficient of friction μ, and FIG. 21 shows a map of the desired increase of braking force to the wheel road. As apparent from FIGS. 20 and 21, it has been set that the larger the road coefficient of friction μ or wheel load is, the larger the desired increase of braking force will be set. Thus, the characteristic of braking force of the wheel depends on the wheel load and road coefficient of friction. In this case, an upper limit has been set for the desired increase of braking force, in order that the braking force control can be made within a predetermined area in the adhesive area, without excessively enlarging the slip area as shown in FIG. 2. Furthermore, FIG. 22 shows a map of the desired increase of braking force set on the basis of the steering operation speed of the vehicle driver and the grip factor. As described before, the steering operation speed of the vehicle driver is detected by calculating the varying rate of the steering angle signals detected by the steering angle sensor SS. In the case where the steering operation speed is high, it is predicted that there should be an emergency such as presence of obstacles ahead of the vehicle. In this case, therefore, the desired increase of braking force is set so that the braking force control shall start from the state with the higher grip factor ε, with a relatively large value of the desired increase of braking force itself, to reduce the vehicle speed sufficiently.

With respect to an ordinary vehicle, it has been so designed to provide a characteristic with a slightly under steering, so that the front wheels tend to reach their limits at first. Therefore, when the braking force control is to be made, it is preferable that the braking force control for at least one wheel shall be made to reduce the vehicle speed, with a total side force applied to the wheel for maintaining a yaw moment acting it inward of the cornering curve, and a cornering radius. As an example of the braking force control, the wheel to be braked in accordance with the grip factor may be selected in sequence from the rear wheel located on the inside of the curve, the rear wheel located on the outside of the curve, and the front wheel located on the outside of the curve, and braked together in sequence. Or, all of the rear wheel located on the inside of the curve, the rear wheel located on the outside of the curve, and the front wheel located on the outside of the curve may be controlled simultaneously. If the road surface is of a relatively high coefficient of friction, the braking force control may be applied only to the rear wheels, because the vehicle can be braked effectively to reduce the vehicle speed sufficiently. On the contrary, if the road surface is of extremely low coefficient of friction, it is preferable that the braking force control shall not be applied to the rear wheels, i.e., increase of the braking force shall be prohibited, because the vehicle state may be changed suddenly into such a state that the vehicle tends to provide the over steering characteristic.

Figure 23:
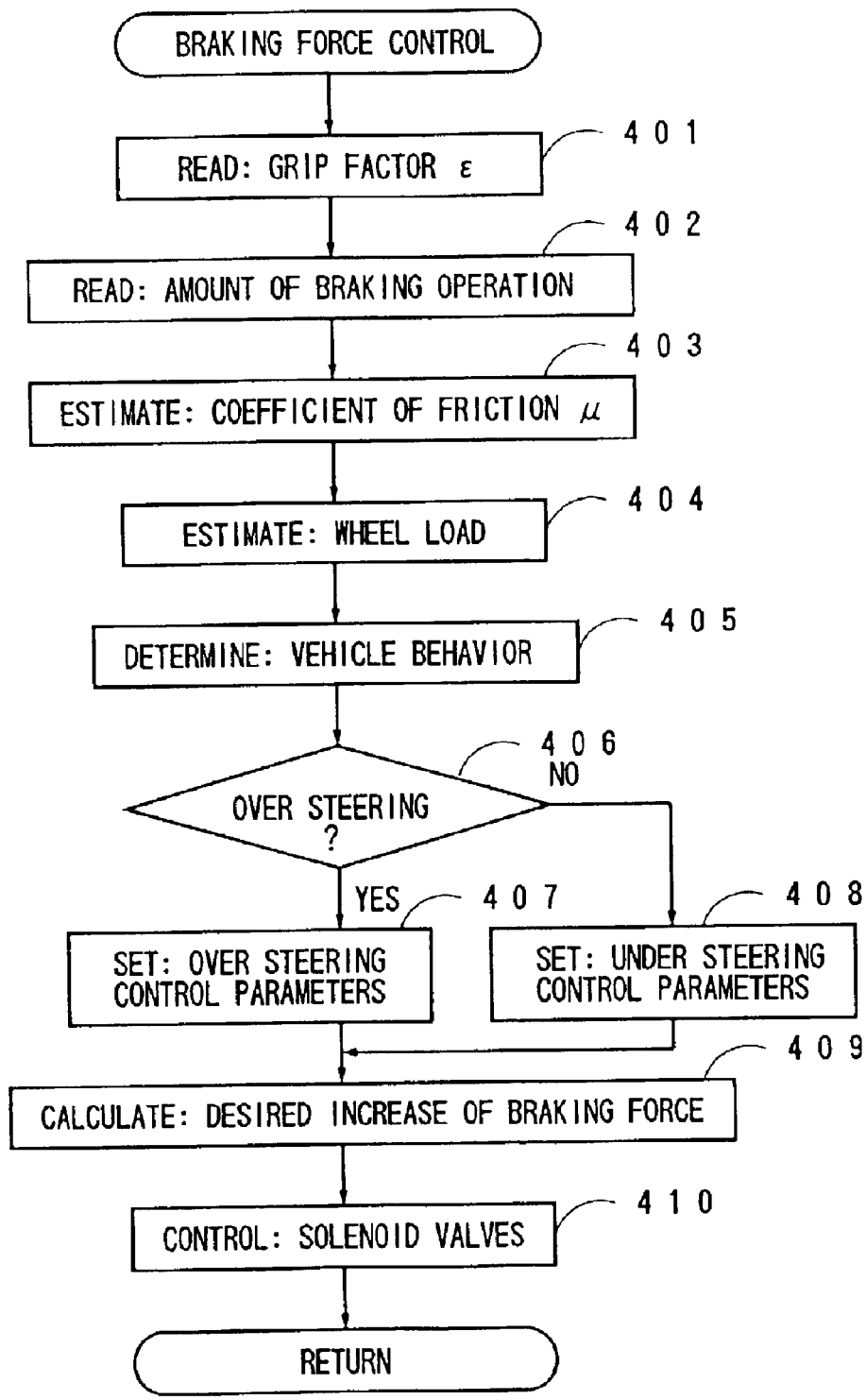
FIG. 23 is a flowchart showing another example of the routine for making the braking force control according to an embodiment of the present invention.

Although the ordinary vehicle provides the under steering characteristic in its normal state, the vehicle tends to provide the over steering characteristic in case of a transient steering state for slaloming or changing lanes, or change in the coefficient of friction. In this case, the following control will be made, as shown in FIG. 23, wherein Steps 401–404 are the same as Steps 301–304 in FIG. 16, so that the explanation of them are omitted. At Step 405, a vehicle behavior determination is made to determine whether the vehicle tends to provide the under steering or over steering. In accordance with a result of the determination, if it is determined at Step 406 that the vehicle is in the over steering state, the program proceeds to Step 407, where over steering control parameters are set for increasing the braking force to produce the yaw moment directed outside of the curve, thereby to reduce the vehicle speed. If it is determined at Step 406 that the vehicle is not in the over steering state, the program proceeds to Step 408, where under steering control parameters are set for maintaining the yaw moment directed inside of the curve and capable of tracing the curve, to reduce the vehicle speed. Accordingly, the desired increase of braking force for each wheel is determined at Step 409 on the basis of those parameters. Then, each solenoid valve SL in FIG. 13 is controlled at Step 410 on the basis of the desired braking force added by the desired increase of braking force, to achieve the braking force control.

In the embodiments as described above, the grip factor ε was obtained on the basis of the aligning torque, in view of variation of the pneumatic trail of tire. Whereas, on the basis of a margin of side force for road friction, a grip factor indicative of a grip level of the tire in its lateral direction can be estimated (in this case "εm" is used herein), as described hereinafter.

According to a theoretical model of a tire, so-called brush model, which is used for analyzing the force produced on the tire, the relationship between the (actual) aligning torque Tsaa to the (front) side force Fyf can be obtained in accordance with the following equations: Provided that $$\xi = 1 - \left(\frac{Ks}{3 \cdot \mu \cdot Fz}\right) \cdot \lambda,$$

If $\xi > 0$, $Fyf = \mu \cdot Fz \cdot (1 - \xi^3)$     (1)

If $\xi \leq 0$, $Fyf = \mu \cdot Fz$     (2)

And,

If $\xi > 0$, $$Tsaa = \left(\frac{1 \cdot Ks}{6}\right) \cdot \lambda \cdot \xi^3 \quad (3)$$

If $\xi \leq 0$, $Tsaa = 0$     (4)

where "Fz" is the vertical load, "l" is the length of the tire surface contacting the road, "Ks" is a constant corresponding to the tread hardness, "λ" is the side slip (λ=tan(αf)), and "αf" is the slip angle for front wheel(s).

In general, the slip angle αf is small in the area of $\xi > 0$, the equation of λ=αf may be applied. As apparent from the equation (1), the maximal value of the side force is μ·Fz. Therefore, if a portion of side force according to the road coefficient of friction μ to the maximal value of side force is indicated by a coefficient of friction utilization ratio η, then the ratio η can be given by η=1−ξ³. Therefore, εm=1−η means a margin for (road) coefficient of friction, so that the grip factor εm can be given by εm=ξ³.

As a result, the equation (3) can be rewritten by the following equation:

$$Tsaa = \left(\frac{1 \cdot Ks}{6}\right) \cdot \alpha f \cdot \varepsilon m \quad (5)$$

The equation (5) indicates that the aligning torque Tsaa is proportional to the slip angle αf and the grip factor εm. Then, if the characteristic obtained when εm=1 (the utilization ratio of coefficient of friction is zero, and the margin for coefficient of friction is 1) is used for the reference aligning torque characteristic, the reference aligning torque Tsau is given by the following equation:

$$Tsau = \left(\frac{1 \cdot Ks}{6}\right) \cdot \alpha f \quad (6)$$

Then, the grip factor εm can be obtained by the equations (5) and (6) as follows:

$$\varepsilon m = \frac{Tsaa}{Tsau} \quad (7)$$

In the equation (7), the road coefficient of friction μ is not included as the parameter. Thus, the grip factor εm can be calculated without using the road coefficient of friction μ. In this case, the gradient K4 (=1·Ks/6) of the reference aligning torque Tsau can be set in advance by means of the brush model, or can be obtained through experiments. Furthermore, if the initial value is set at first, then the gradient of the aligning torque is identified in the vicinity of the origin of the slip angle when the vehicle is running, to correct the initial value, the accuracy of the grip factor will be improved.

Figure 25:
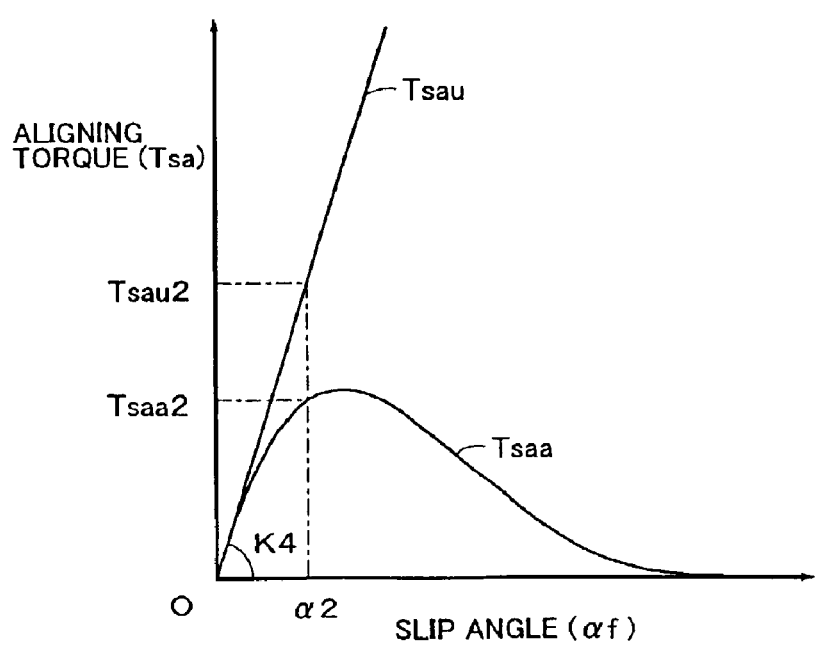
FIG. 25 is a diagram showing a relationship between aligning torque and slip angle according to a further embodiment of the present invention.

As shown in FIG. 25, for example, if the slip angle is αf2, the reference aligning torque Tsau2 is given by the following equation:

$$Tsau2 = K4 \cdot \alpha f2$$

And, the grip factor εm can be obtained by the following equation:

$$\varepsilon m = \frac{Tsaa2}{Tsau2} = \frac{Tsaa2}{K4 \cdot \alpha f2}$$

Figure 26:
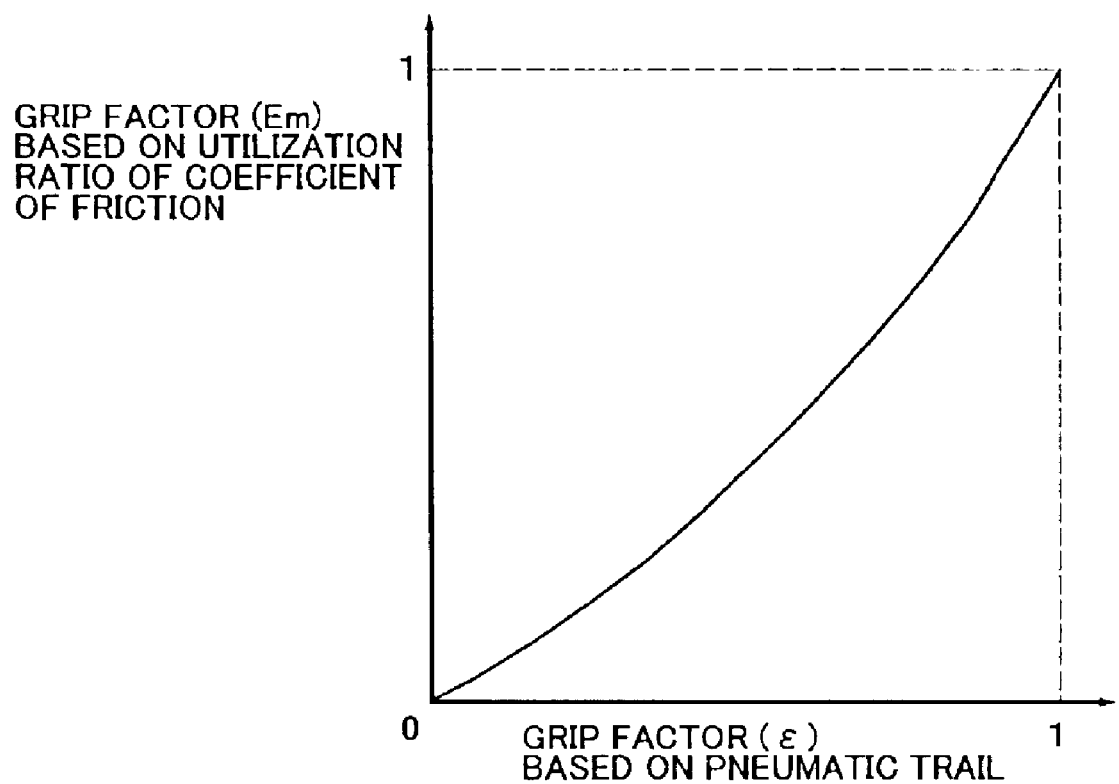
FIG. 26 is a diagram showing a relationship between a grip factor ε based on a pneumatic trail and a grip factor εm based on a margin of side force for road friction, according to the present invention.

Accordingly, in lieu of the grip factor ε based on the pneumatic trail as described in FIGS. 14–23, the grip factor εm based on the margin of side force for road friction can be employed. The relationship between those grip factors ε and εm will be the one as shown in FIG. 26. Therefore, after the grip factor ε was obtained, then it may be converted into the grip factor εm. On the contrary, after the grip factor εm was obtained, then it may be converted into the grip factor ε.

Next, referring to FIG. 27, will be explained a further embodiment of the wheel grip factor estimation apparatus for use in the vehicle with the electric power steering apparatus. The wheel grip factor estimation apparatus includes a steering angle sensor 11 for detecting a steering wheel angle, a vehicle speed sensor 12 for detecting a vehicle speed, a steering torque sensor 13 for detecting a steering torque, an assisting torque sensor 14 for detecting an assisting torque, and an electric control unit (hereinafter, abbreviated as ECU) 20 which is adapted to estimate the aligning torque on the basis of the outputs fed from the sensors, and further estimate the grip factor based thereon.

The steering angle sensor 11 is adapted to detect a steering wheel angle $\theta_p$ indicative of a handle angle, and feed the detected steering wheel angle $\theta_p$ to the ECU 20. The steering torque sensor 13 is mounted on the same axis as that of a steering shaft (not shown), and adapted to detect a steering torque $T_p$ acting on a steering axis, and feed the detected steering torque $T_p$ to the ECU 20. The assisting torque sensor 14 is adapted to detect an electric current $I_m$ fed to the electric motor for use in the electric power steering apparatus, and calculate an assisting torque $T_a$ in accordance with the following equation:

$$T_a = \frac{g_p}{g_b} k_m I_m \quad (8)$$

where $g_p$ is a pinion lead, $g_b$ is a ball screw lead, and $k_m$ is a coefficient of assisting motor torque. The assisting torque sensor 14 is adapted to feed the calculated assisting torque $T_a$ to the ECU 20. With respect to the electric current $I_m$, the electric current used in the electric motor may be detected directly, or a target electric current output to the electric motor may be used.

Figure 27:
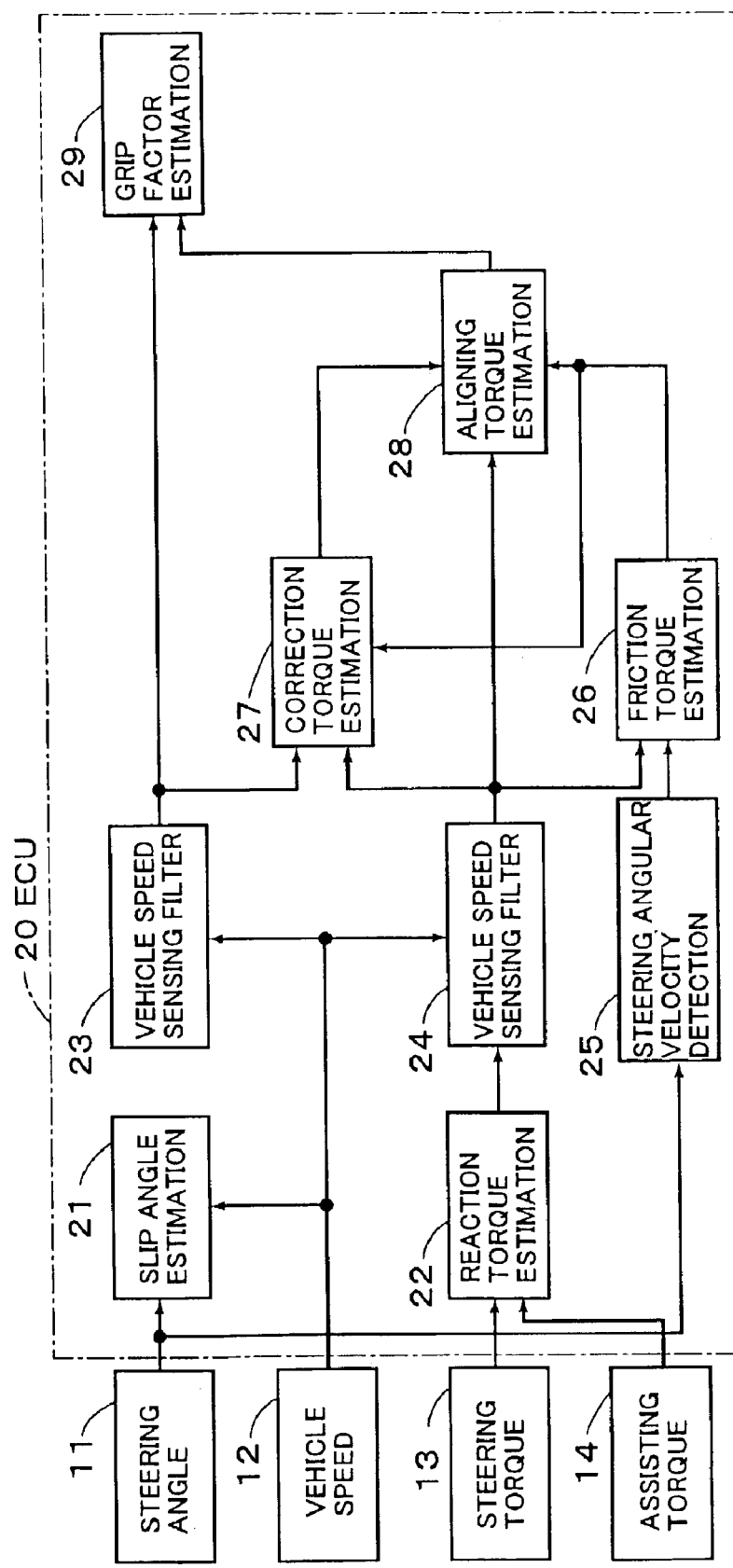
FIG. 27 is a schematic block diagram of a wheel grip factor estimation apparatus according to a further embodiment of the present invention.

As shown in FIG. 27, the ECU 20 includes a slip angle estimation unit 21 for estimating a slip angle, a reaction torque estimation unit 22 for estimating an actual reaction torque, vehicle speed sensing filters 23 and 24, steering angular velocity detection unit 25 for detecting a steering angular velocity, friction torque estimation means for estimating a friction torque caused by internal friction of the steering system, a friction torque estimation unit 26 for estimating a friction torque caused by the steering system, a correction torque estimation unit 27 for estimating a correction torque, an aligning torque estimation unit 28 for estimating an aligning torque, and a grip factor estimation unit 29 for estimating a grip factor on the basis of the slip angle and the aligning torque.

The slip angle estimation unit 21 is adapted to estimate a slip angle $\alpha_f$ (rad) for a front wheel on the basis of the steering angle $\theta_p$ (rad) detected by the steering angle sensor 11 and the vehicle speed u (m/s). Using dynamic characteristics of vehicle motion, the slip angle $\alpha_f$ is represented by the following equations of state (9) and (10):

$$\frac{d}{dt}\begin{bmatrix} v \\ \gamma \end{bmatrix} = \left(\begin{bmatrix} 0 & -1 \\ 0 & 0 \end{bmatrix} u + \begin{bmatrix} -\frac{c_f + c_r}{M} & -\frac{L_f c_f - L_r c_r}{M} \\ -\frac{L_f c_f - L_r c_r}{I_z} & -\frac{L_f^2 c_f + L_r^2 c_r}{I_z} \end{bmatrix}/u\right)\begin{bmatrix} v \\ \gamma \end{bmatrix} + \begin{bmatrix} \frac{c_f}{M g_h} \\ \frac{L_f c_f}{I_z g_h} \end{bmatrix}\theta_p \quad (9)$$

$$\hat{\alpha}_f = [1 \; L_f]/u \begin{bmatrix} v \\ r \end{bmatrix} - \frac{\theta_p}{g_h} \quad (10)$$

where v (m/s) is a lateral vehicle speed, γ (rad/s) is a yaw rate, u (m/s) is the vehicle speed, $c_f$ (N/rad) is a cornering power for a front wheel, $c_r$ (N/rad) is a cornering power for a rear wheel, $L_f$ (m) is a length between gravity centers of a front axle, $L_r$ (m) is a length between gravity centers of a rear axle, M (kg) is a mass of the vehicle, $I_z$ (kgm$^2$) is a yaw inertia, and $g_h$ is a steering gear ratio. The mark (^) indicates the estimated value.

Discretizing the equations (9) and (10) by sampling time $\tau$, and forming a function of the vehicle speed u, the following equations (11) and (12) are obtained:

$$x(k+1) = \left( \begin{bmatrix} 1 & 0 \\ 0 & 1 \end{bmatrix} + \begin{bmatrix} 0 & -\tau \\ 0 & 0 \end{bmatrix} u(k) + \tau A_s / u(k) \right) x(k) + \tau B_s \theta_p(k) \quad (11)$$

$$\alpha_f(k) = [1 L_f] x(k)/u(k) - \theta_p(k)/g_h \quad (12)$$

where k is a sampling number, and $A_s$ and $B_s$ in the equation (11) are given by the following equations (13):

$$A_s = \begin{bmatrix} -\dfrac{c_f + c_r}{M} & -\dfrac{L_f c_f - L_r c_r}{M} \\ -\dfrac{L_f c_f - L_r c_r}{I_z} & -\dfrac{L_f^2 c_f + L_r^2 c_r}{I_z} \end{bmatrix}, \quad B_s = \begin{bmatrix} \dfrac{c_f}{M g_h} \\ \dfrac{L_f c_f}{I_z g_h} \end{bmatrix} \quad (13)$$

Accordingly, the slip angle estimation unit 21 is adapted to detect the slip angle $\alpha_f$ which is calculated every sampling time $\tau$ in accordance with the equation (12), and adapted to feed the slip angle $\alpha_f$ to the vehicle speed sensing filter 23.

The reaction torque estimation unit 22 is adapted to add the steering torque $T_p$ detected by the steering torque sensor 13 and the assisting torque $T_a$ detected by the assisting torque sensor 14, to estimate the actual reaction torque $T_r$. Thus, the actual reaction torque $T_r$ is obtained by the following equation (14):

$$T_r = T_p + T_a = T_p + \frac{g_p}{g_b} k_m I_m \quad (14)$$

According to the reaction torque estimation unit 22, the actual reaction torque $T_r$ can be estimated more accurately by taking into consideration a viscous friction in the electric power steering apparatus, and using a steering angular velocity, practically by calculating the following equation (15):

$$T_r = T_p + \frac{g_p}{g_b} k_m I_m - c \dot{\theta}_p \quad (15)$$

where "c" is a value indicative of the viscous of a pinion axis (steering wheel axis) converted equivalently by the viscous of each element of the electric power steering apparatus, such as the electric motor, pinion shaft, rack and so on.

Furthermore, according to the reaction torque estimation unit 22, the actual reaction torque $T_r$ can be estimated by taking into consideration inertia of the electric power steering apparatus, and using a disturbance observer. In this respect, the dynamic characteristics of the electric power steering apparatus is represented by the following differential equation (16):

$$\left\{ \left( \frac{g_p}{2\pi} \right)^2 M_r + \left( \frac{g_p}{g_b} \right)^2 J_m \right\} \ddot{\theta}_p + c \dot{\theta}_p = T_p + \frac{g_p}{g_b} k_m I_m - T_r \quad (16)$$

where $M_r$ is mass of the rack, and $J_m$ is a motor inertia.

Supposing that the right side of the equation (16) is the disturbance estimated by the disturbance observer, may be obtained the disturbance observer represented by the following equation (17):

$$\frac{d}{dt} \begin{bmatrix} \hat{\dot{\theta}}_p \\ \hat{\theta}_p \\ \hat{d} \end{bmatrix} = \left( \begin{bmatrix} -c/J_e & 0 & 1/J_e \\ 1 & 0 & 0 \\ 0 & 0 & 0 \end{bmatrix} - G \begin{bmatrix} 1 & 0 & 0 \\ 0 & 1 & 0 \end{bmatrix} \right) \begin{bmatrix} \hat{\dot{\theta}}_p \\ \hat{\theta}_p \\ \hat{d} \end{bmatrix} + G \begin{bmatrix} \dot{\theta}_p \\ \theta_p \end{bmatrix} \quad (17)$$

where $J_e$ is given by the following equation (18), and d is given by the following equation (19).

$$J_e = \left( \frac{g_p}{2\pi} \right)^2 M_r + \left( \frac{g_p}{g_b} \right)^2 J_m \quad (18)$$

$$d = T_p + \frac{g_p}{g_b} k_m I_m - T_r \quad (19)$$

where G is a gain of the observer, and the mark (^) indicates the estimated value.

The equation (17) is the one for estimating the disturbance (d) on the basis of the steering angular velocity ($d\theta_p/dt$) and steering angle $\theta_p$. Then, by discretizing the equation (17), recurrence formulas (20) and (21) are obtained as follows:

$$x(k+1) = Ax(k) + B \begin{bmatrix} \dot{\theta}_p(k) \\ \theta_p(k) \end{bmatrix} \quad (20)$$

$$\hat{d}(k) = Cx(k) + D \begin{bmatrix} \dot{\theta}_p(k) \\ \theta_p(k) \end{bmatrix} \quad (21)$$

where each of A, B, C and D is a system matrix resulted from discretizing the equation (17). According to the reaction torque estimation unit 22, therefore, the actual reaction torque $T_r$ can be estimated in accordance with the following equation (22):

$$T_r(k) = T_p(k) + \frac{g_p}{g_b} T_m(k) - \hat{d}(k) \quad (22)$$

The vehicle speed sensing filter 23 is a low pass filter for setting a cut-off frequency to be increased in accordance with increase of the vehicle speed u detected by the vehicle speed sensor 12. According to the present embodiment, the vehicle speed sensing filter 23 is constituted by a linear low pass filter, wherein the time constant is set in inverse proportion to the vehicle speed u. The vehicle speed sensing filter 23 is not limited to the linear low pass filter, but may be constituted by other means.

A continuous-time linear low pass filter is represented by the following transfer function (23):

$$G(s) = \frac{1}{1 + \dfrac{su}{a}} \quad (23)$$

where "a" is a proportional constant. By transforming the equation (23) by means of Tustin transform for example, a discrete-time low pass filter can be formed. According to Tustin transform, if a time-advance operator is indicated by "z", then "s" is represented by the following equation (24):

$$s = \frac{2(z-1)}{\tau(z+1)} \tag{24}$$

On the basis of the equations (23) and (24), therefore, discrete-time low pass filter is represented by the following equation (25):

$$G(z) = \frac{\tau a k(z+1)}{(\tau a + 2u)z + \tau a - 2u} \tag{25}$$

According to the vehicle speed sensing filter 23, wherein the cut-off frequency is set depending on the vehicle speed u, the slip angle estimated by the slip angle estimation unit 21 is filtered by the low pass filter, so that the filtered slip angle is fed to the correction torque estimation unit 27 and grip factor estimation unit 29. The input frequency of disturbance by the road is increased, with the vehicle speed increased. And, in the case where the grip factor is used in the vehicle motion control, the higher responsibility is required for ensuring a vehicle stability, with the vehicle speed increased. In those cases, the vehicle speed sensing filter 23 is effective when the vehicle speed is relatively low, as the low frequency disturbance by the road can be treated by setting the cut-off frequency to be relatively low. And, it is also effective when the vehicle speed is relatively high, as the responsibility in estimating the gripped state can be ensured by setting the cut-off frequency to be relatively high. The vehicle speed sensing filter 24 is constituted in the same fashion as the vehicle speed sensing filter 23. That is, according to the vehicle speed sensing filter 24, wherein the cut-off frequency is set on the basis of the vehicle speed u detected by the vehicle speed sensor 12, the actual reaction torque estimated by the reaction torque estimation unit 22 is filtered by the low pass filter, so that the filtered actual reaction torque is fed to the friction torque estimation unit 26, correction torque estimation unit 27 and aligning torque estimation unit 28.

In FIG. 27, a steering angular velocity detection unit 25 is adapted to differentiate the steering angle Op detected by the steering angle sensor 11, to produce the steering angular velocity ($d\theta_p/dt$), and feed it to the friction torque estimation unit 26.

The friction torque estimation unit 26 is adapted to estimate a friction torque $T_{fric}$ which result in a hysteresis characteristic produced on the actual reaction torque. According to the friction torque estimation unit 26, calculated is a difference between the actual reaction torque with a maximal absolute value obtained when the steering wheel is rotated to increase the steering angle and the actual reaction torque obtained when the steering wheel is rotated to be placed in its original position, to provide the difference as the friction torque $T_{fric}$, which is caused by an internal Coulomb's friction in the steering system.

Figure 28:
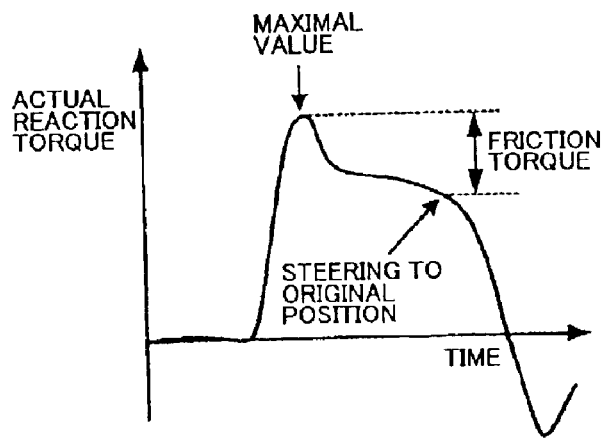
FIG. 28 is a diagram showing a variation of actual reaction torque estimated by a reaction torque estimation unit according to a further embodiment of the present invention.

FIG. 28 is a diagram showing a change (with the passing time) of the actual reaction torque $T_r$ estimated by the reaction torque estimation unit 22. In FIG. 28, the actual reaction torque $T_r$ produced when the steering wheel is turned to the left is indicated by a positive value, whereas the actual reaction torque $T_r$ produced when the steering wheel is turned to the right is indicated by a negative value. According to the friction torque estimation unit 26, when it is detected that the sign of steering angular velocity fed from the steering angular velocity detection unit 25 has been reversed, the maximal value of the actual reaction torque $T_r$ obtained thereafter is calculated as follows. That is, in the case where the steering angular velocity is changed from the negative value to the positive value, i.e., the steering wheel is turned to the left (positive direction), the positive actual reaction torque $T_r$ will be produced. Then, in the friction torque estimation unit 26, the maximal value $T_{max}$ of the actual reaction torque $T_r$ is calculated in accordance with the following equation (26):

$$T_{max}(k) = \begin{cases} T_{max}(k-1) & (T_r(k) \le T_{max}(k-1)) \\ T_r(k) & (T_r(k) > T_{max}(k-1)) \end{cases} \tag{26}$$

Next, when it is detected by the friction torque estimation unit 26 that the sign of steering angular velocity has been reversed from the positive value to the negative value, with the steering wheel turned toward its original position, on the basis of the detected actual reaction torque $T_r$ and the maximal value $T_{max}$, the friction torque $T_{fric}$ is calculated in accordance with the following equation (27):

$$T_{fric}(k) = T_{max}(k) - T_r(k) \tag{27}$$

On the contrary, when the sign of steering angular velocity has been reversed from the positive value to the negative value, with the steering wheel turned to the right, the negative actual reaction torque $T_r$ is produced. Then, according to the friction torque estimation unit 26, a minimal value $T_{min}$ of the actual reaction torque $T_r$ is calculated in accordance with the following equation (28):

$$T_{min}(k) = \begin{cases} T_{min}(k-1) & (T_r(k) \ge T_{min}(k-1)) \\ T_r(k) & (T_r(k) < T_{min}(k-1)) \end{cases} \tag{28}$$

When it is detected by the friction torque estimation unit 26 that the sign of steering angular velocity has been reversed from the negative value to the positive value, with the steering wheel turned toward its original position, on the basis of the detected actual reaction torque $T_r$ and the minimal value $T_{min}$, the friction torque $T_{fric}$ is calculated in accordance with the following equation (29):

$$T_{fric}(k) = T_r(k) - T_{min}(k) \tag{29}$$

Then, the friction torque $T_{fric}$ obtained by the friction torque estimation unit 26 is fed to the correction torque estimation unit 27 and aligning torque estimation unit 28. Except for the steering operation toward its original position, the friction torque $T_{fric}$ as calculated at the previous cycle is held in the friction torque estimation unit 26, and the friction torque $T_{fric}$ held therein is fed to the correction torque estimation unit 27 and aligning torque estimation unit 28.

As a result, according to the friction torque estimation unit 26, the friction torque $T_{fric}$ is estimated at every cycle when the steering wheel is turned toward its original position, against the hysteresis which is caused at every cycle when the steering wheel is turned toward its original position, so that the hysteresis characteristics can be always estimated accurately. Particularly, when the vehicle is running on a rough road, the disturbance by the road surface acts on the Coulomb's friction in the steering system to cause a dither effect, the Coulomb's friction part will be reduced to alter the Coulomb's friction. As the friction torque $T_{fric}$ is estimated at every cycle when the steering wheel is turned toward its original position, according to the friction torque estimation unit 26, the hysteresis characteristics can be compensated timely, even in the case where the Coulomb's friction is largely changed in magnitude.

The correction torque estimation unit 27 is adapted to detect a change in the actual reaction torque which is caused by a change of a neutral point of the steering system when the vehicle is running on a bank, to estimate the correction torque. When the vehicle is running on the bank, neutral point of the steering system is changed. In the case where the grip factor is estimated in accordance with the relationship between the slip angle and the estimated aligning torque, it might be caused that the estimated aligning torque comes to be a small value in the vicinity of zero area, while the slip angle is relatively large, so that the grip factor will be lowered, even if the grip factor is high in fact. According to the correction torque estimation unit 27, therefore, is detected the change of the neutral point of the steering system when the vehicle is running on a bank, on the basis of the slip angle which is obtained when the steering operation begins so that the actual reaction torque exceeds the friction torque, as the change of the actual reaction torque, which is estimated as the correction torque.

Figure 29:
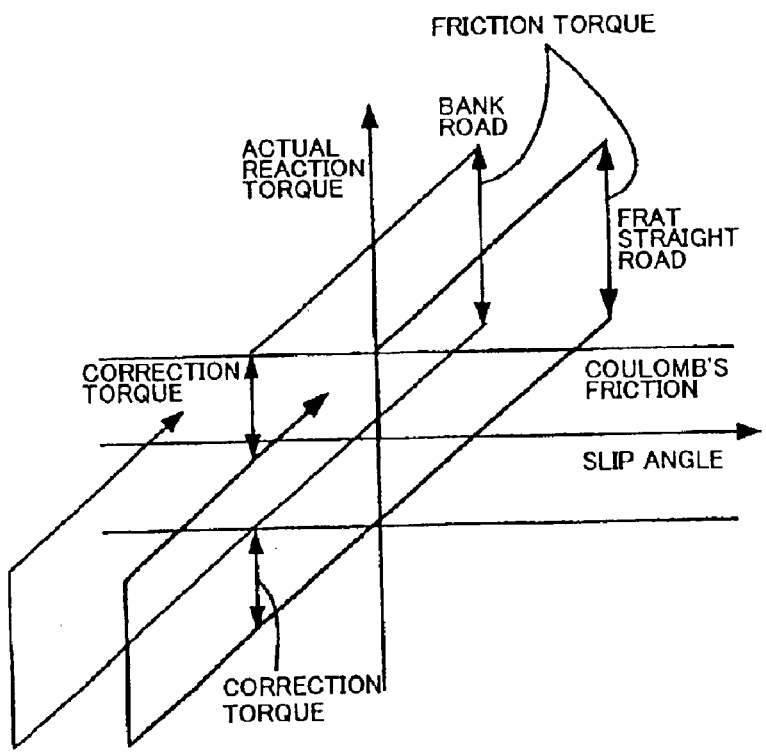
FIG. 29 is a diagram showing a relationship of actual reaction torque to slip angle, when a vehicle is running on a flat straight road and a bank road, according to a further embodiment of the present invention.

FIG. 29 shows a relationship of the actual reaction torque to the slip angle, when the vehicle is running on a flat straight road and the bank road. In FIG. 29, the actual reaction torque and slip angle produced when the steering wheel is turned to the left are indicated by the positive sign. The actual reaction torque, which is produced in the case where the actual reaction torque obtained when the steering operation begins, overcomes the Coulomb's friction, is not so small as to be absorbed in the Coulomb's friction, whereas it is not so large as to be affected by reduction of grip according to the road coefficient of friction $\mu$. The relationship between the actual reaction torque and the slip angle only reflects the change of neutral point in the steering system.

In this embodiment, a difference between the actual reaction torque, which is estimated in the case where the flat straight road is estimated from the slip angle at the time when the actual reaction torque obtained when the steering operation begins overcomes the Coulomb's friction, and the actual reaction torque at the present time, is deemed as a torque caused by means of the bank, which torque is used as the correction torque. In practice, according to the correction torque estimation unit 27, in the case where the steering wheel is turned to the left, it is determined whether the following formulas (30), which serve as the conditions for beginning the steering operation, are fulfilled or not:

$$T_r(k) \geq \frac{T_{fric}(k)}{2} \text{ and } T_r(k-1) < \frac{T_{fric}(k-1)}{2} \tag{30}$$

If the conditions for beginning the steering operation of the formulas (30) are fulfilled, the correction torque $T_{correct}$ is calculated in the correction torque estimation unit 27 in accordance with the following equation (31):

$$T_{correct}(k) = T_r(k) - K_0\alpha(k) - \frac{T_{fric}(k)}{2} \tag{31}$$

where $K_0$ is a gradient of the estimated aligning torque to the slip angle, including the origin, and the same as $K_0$ in the equation (41) as described later.

In the case where the steering wheel is turned to the right, it is determined by the correction torque estimation unit 27 whether the conditions for beginning the steering operation of the formulas (32) are fulfilled or not.

$$T_r(k) \leq -\frac{T_{fric}(k)}{2} \text{ and } T_r(k-1) > -\frac{T_{fric}(k-1)}{2} \tag{32}$$

If the conditions for beginning the steering operation of the formulas (32) are fulfilled, the correction torque $T_{correct}$ is calculated in the correction torque estimation unit 27 in accordance with the following equation (33):

$$T_{correct}(k) = T_r(k) - K_0\alpha(k) + \frac{T_{fric}(k)}{2} \tag{33}$$

The correction torque estimation unit 27 is adapted to hold the correction torque $T_{correct}$ friction torque as estimated at the previous cycle, if the conditions for beginning the steering operation of the formulas (30) or (32) have not been fulfilled. Then, the estimated correction torque $T_{correct}$ is fed from the correction estimation unit 27 to the aligning torque estimation unit 28.

The aligning torque estimation unit 28 is adapted to remove the hysteresis characteristic caused by the Coulomb's friction in the electric power steering apparatus, from the actual reaction torque, then correct the change of the neutral point of the steering system when the vehicle is running on the bank, and calculate the estimated aligning torque. That is, according to the aligning torque estimation unit 28, the estimated aligning torque is calculated on the basis of the actual reaction torque filtered by the vehicle speed sensing filter 24, the friction torque estimated by the friction torque estimation unit 26, and the correction torque estimated by the correction torque estimation unit 27.

The calculation for removing the hysteresis characteristic is made in accordance with the following logic. At first, when it is determined that the actual reaction torque has exceeded a half of the friction torque in the previous cycle, and the steering operation toward the positive direction has begun (i.e., the actual reaction torque is of the positive value), and that the correction torque caused by the bank running has been calculated for renewal, the estimated aligning torque $T_{SAT}$ is calculated by the aligning torque estimation unit 28 in accordance with the following equation (34):

$$T_{SAT}(k) = T_r(k) - T_{correct}(k) + \frac{T_{fric}(k)}{2} \tag{34}$$

And, in case of the steering operation toward the negative direction, the estimated aligning torque $T_{SAT}$ is calculated by the aligning torque estimation unit 28 in accordance with the following equation (35):

$$T_{SAT}(k) = T_r(k) - T_{correct}(k) - \frac{T_{fric}(k)}{2} \tag{35}$$

Next, in a steering holding state where the friction torque and correction torque are not renewed, the aligning torque estimation unit 28 operates at a random sampling time, in accordance with the following steps. At first, a friction state variable $x_{SAT}$ is calculated in accordance with the following equation (36):

$$x_{SAT}(k) = T_{SAT}(k-1) + K_1 \cdot (T_r(k) - T_r(k-1)) \tag{36}$$

where the gradient $K_1$ is set to be smaller than 1, so that variation of the friction state variable $x_{SAT}$ is small even if the actual reaction torque is varied by the Coulomb's friction or the like.

In the case where the friction state variable renewed by the equation (36) exceeds a zone with a width of the friction torque being apart from the corrected actual reaction torque by subtracting the correction torque from the actual reaction torque, toward the opposite sides thereof, the friction state variable is limited to bounds of the zone, and set as the estimated aligning torque. That is, the estimated aligning torque $T_{SAT}$ is calculated by the aligning torque estimation unit 28 in accordance with the following equation (37):

$$T_{sat} = \begin{cases} T_r(k) - T_{correct}(k) + \dfrac{T_{fric}(k)}{2} & \left(x_{SAT}(k) > T_r(k) - T_{correct}(k) + \dfrac{T_{fric}(k)}{2}\right) \\ x_{SAT}(k) & \left(\left|x_{SAT}(k) - T_r(k) + T_{correct}(k)\right| \leq \dfrac{T_{fric}(k)}{2}\right) \\ T_r(k) - T_{correct}(k) - \dfrac{T_{fric}(k)}{2} & \left(x_{SAT}(k) < T_r(k) - T_{correct}(k) - \dfrac{T_{fric}(k)}{2}\right) \end{cases} \quad (37)$$

In the case where the steering wheel is turned toward its original position, sometimes the estimated value of the friction torque will change. This is caused in such a case where an error was included in estimating the correction torque, because the friction torque estimated in FIG. 29 (i.e., the width of hysteresis for the flat straight road model) was wrong. According to the aligning torque estimation unit 28, therefore, the correction torque is adjusted to absorb the varied part of the friction torque, in the case where the estimated value of the friction torque was changed, when the steering wheel was turned toward its original position. In this case, the sum of the correction torque and the friction torque is held so as not to be changed when the steering wheel is turned toward its original position.

In practice, when the steering wheel is turned from the right to the left so as to be placed in the original position, the correction torque $T_{correct}$ is calculated by the aligning torque estimation unit 28 in accordance with the following equation (38):

$$T_{correct}(k) = T_{correct}(k-1) - \dfrac{T_{fric}(k) - T_{fric}(k-1)}{2} \quad (38)$$

When the steering wheel is turned from the left to the right so as to be placed in the original position, the correction torque $T_{correct}$ is calculated by the aligning torque estimation unit 28 in accordance with the following equation (39):

$$T_{correct}(k) = T_{correct}(k-1) + \dfrac{T_{fric}(k) - T_{fric}(k-1)}{2} \quad (39)$$

As a result, the aligning torque estimation unit 28 can prevent the estimated aligning torque from being discontinuous when the steering wheel is turned toward the original position, and calculate the estimated aligning torque which is always proportional to the slip angle especially in case of a largely gripped state.

Figure 30A:
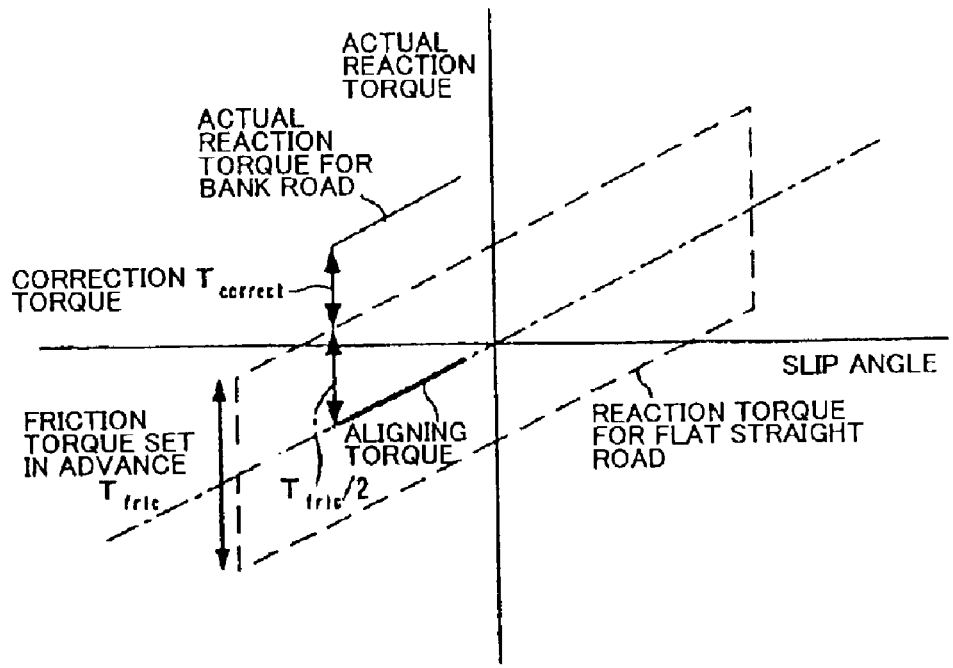
FIG. 30A is a diagram showing a relationship of actual reaction torque to slip angle with a steering wheel being turned in a direction for increasing a steering angle, according to a further embodiment of the present invention.
Figure 30B:
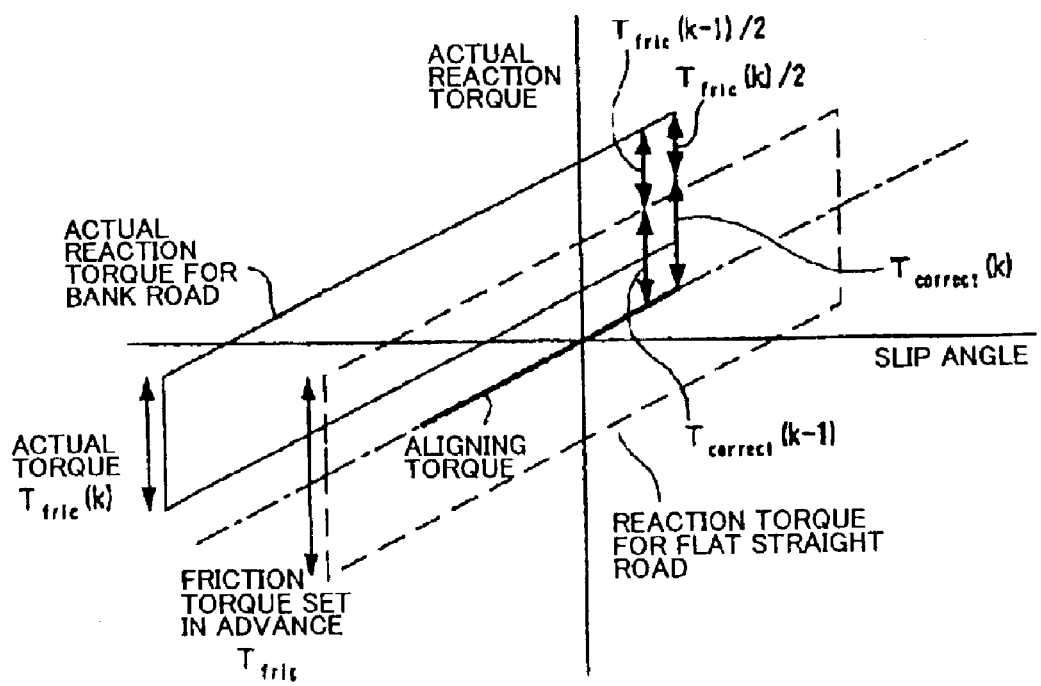
FIG. 30B is a diagram in a state just after a steering wheel has been turned toward its original position, according to a further embodiment of the present invention.

FIGS. 30A and 30B are diagrams showing the relationship of the actual reaction torque to the slip angle. FIG. 30A is the diagram in such a state that the steering wheel is being turned in a direction for increasing the steering angle, and FIG. 30B is the diagram in a state just after the steering wheel has been turned toward the original position. In this case, is provided such a state that the initial friction torque is larger than the actual friction torque which was estimated when the steering wheel was turned toward the original position. In FIG. 30A, according to the aligning torque estimation unit 28, the estimated aligning torque is calculated on the basis of the actual reaction torque, the initial friction torque, and the correction torque. In FIG. 30B, according to the aligning torque estimation unit 28, the correction torque is adjusted when the friction torque has become lower than the value obtained in the previous cycle, immediately after the steering wheel was turned toward the original position. That is, the correction torque has been increased by the amount of the decreased friction torque.

Therefore, this case is represented by the following equation (40):

$$T_{correct}(k) + \dfrac{T_{fric}(k)}{2} = T_{correct}(k-1) + \dfrac{T_{fric}(k-1)}{2} \quad (40)$$

As a result, the aligning torque estimation unit 28 can prevent the estimated aligning torque from being discontinuous immediately after the steering wheel was turned toward the original position, and calculate the estimated aligning torque which is always proportional to the slip angle especially in case of a largely gripped state.

Figure 31A:
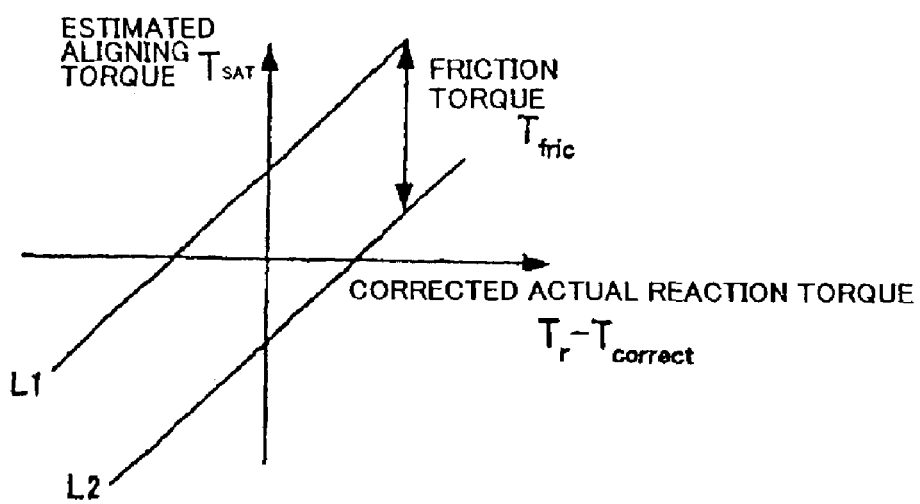
FIG. 31A is a diagram showing a relationship of estimated aligning torque to corrected actual reaction torque according to a further embodiment of the present invention.
Figure 31B:
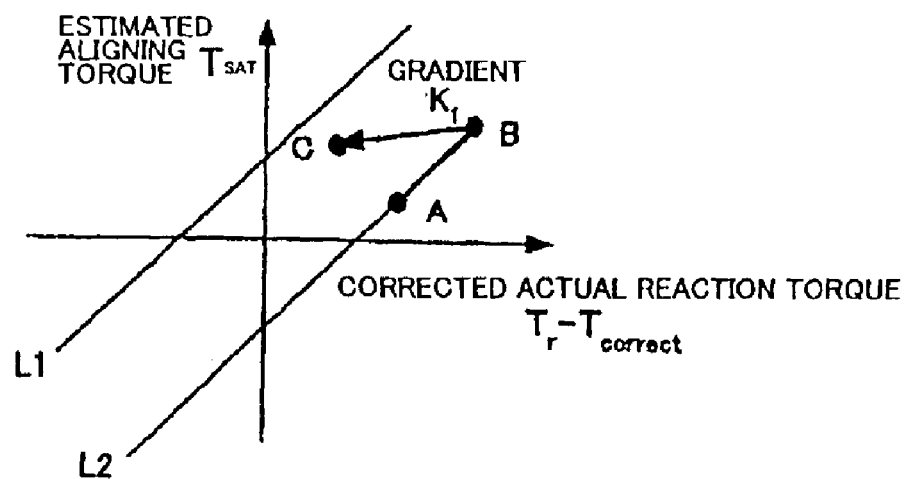
FIG. 31B is a diagram explaining a concept of subtracting calculation of hysteresis, according to a further embodiment of the present invention.

FIGS. 31A and 31B are diagrams showing the relationship of the estimated aligning torque $T_{SAT}$ to the corrected actual reaction torque $(T_r - T_{correct})$. FIG. 31A is the diagram showing the magnitude of friction torque. FIG. 31B is the diagram explaining a concept of the subtracting calculation of the hysteresis. When the estimation of the aligning torque is initiated, the estimated aligning torque is either on a straight line L1 indicative of the equation (34), or on a straight line L2 indicative of the equation (35), at a point (A). Next, if the actual reaction torque is increased, the estimated aligning torque is increased along either of the lines L (line L2 in FIG. 31B), at a point (B). If the actual reaction torque is decreased at this point, the estimated aligning torque is reduced by the gradient K1, at the point (C).

In the zone between the line L1 and line L2, it is provided so that the variation of the estimated aligning torque is made smaller than the variation of the actual reaction torque. This means that when the steering wheel is held during a cornering operation, even if the vehicle driver changes the steering force a little, the estimated aligning torque will not be affected much because of the Coulomb's friction or the like produced in the electric power steering apparatus. When the actual reaction torque is increased again from the point (C), the estimated aligning torque is increased at the gradient $K_1$ toward the point (B). In the case where the actual reaction torque is decreased further from the point (C) by steering toward the original position, so that the estimated aligning torque has reached the upper limit (line L1), the estimated aligning torque will be decreased along the line L1. With these two kinds of gradients set as in the above, the hysteresis will be removed.

Figure 32A:
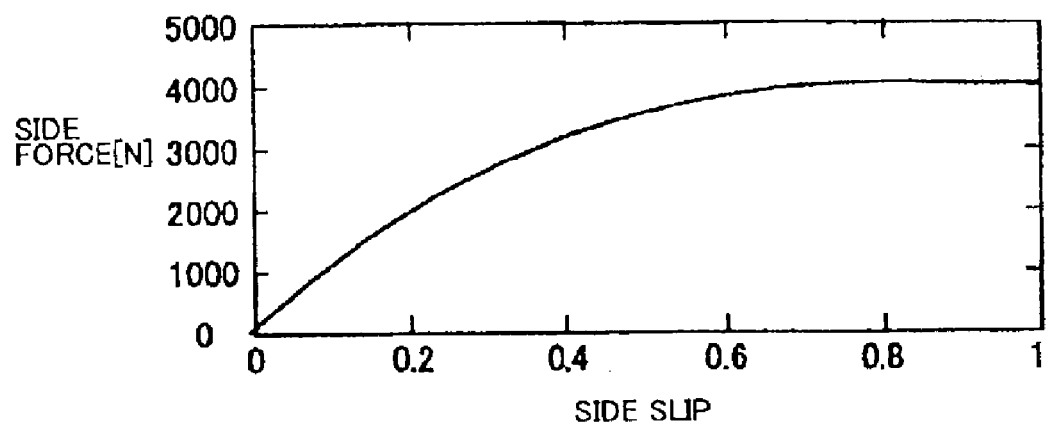
FIG. 32A is a diagram relating to a brush model and showing a relationship of side force to side slip, according to a further embodiment of the present invention.
Figure 32B:
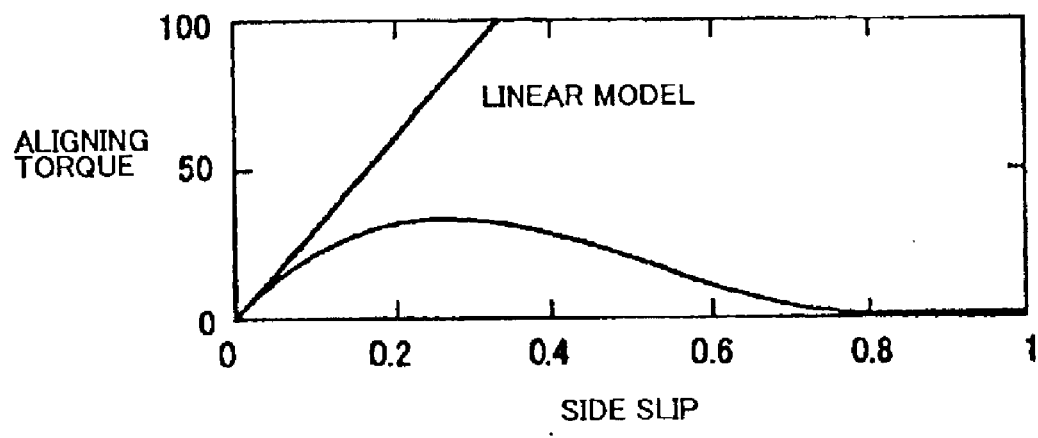
FIG. 32B is a diagram relating to a brush model and showing a relationship of aligning torque to side slip, according to a further embodiment of the present invention.

The grip factor estimation unit 29 is adapted to estimate a grip factor on the basis of the estimated aligning torque calculated by the aligning torque estimation unit 28, and the aligning torque of the brush model, which is calculated by using the slip angle filtered by the vehicle speed sensing filter 23. FIGS. 32A and 32B show diagrams relating to the brush model which was modeled according to the theoretical analysis of the characteristic of the force produced on the tire. FIG. 32A is a diagram showing a relationship of the side force to the side slip, and FIG. 32B is a diagram showing a relationship of the aligning torque to the side slip. In FIG. 32B, the linear model indicates the origin gradient of the aligning torque. Although the relationship between the side slip $\lambda y$ and the slip angle $\alpha$ is given by the equation of $\lambda y = \tan \alpha$, the equation of $\lambda y = \alpha$ may be used, because the slip angle $\alpha$ discussed herein is small enough.

Figure 33:
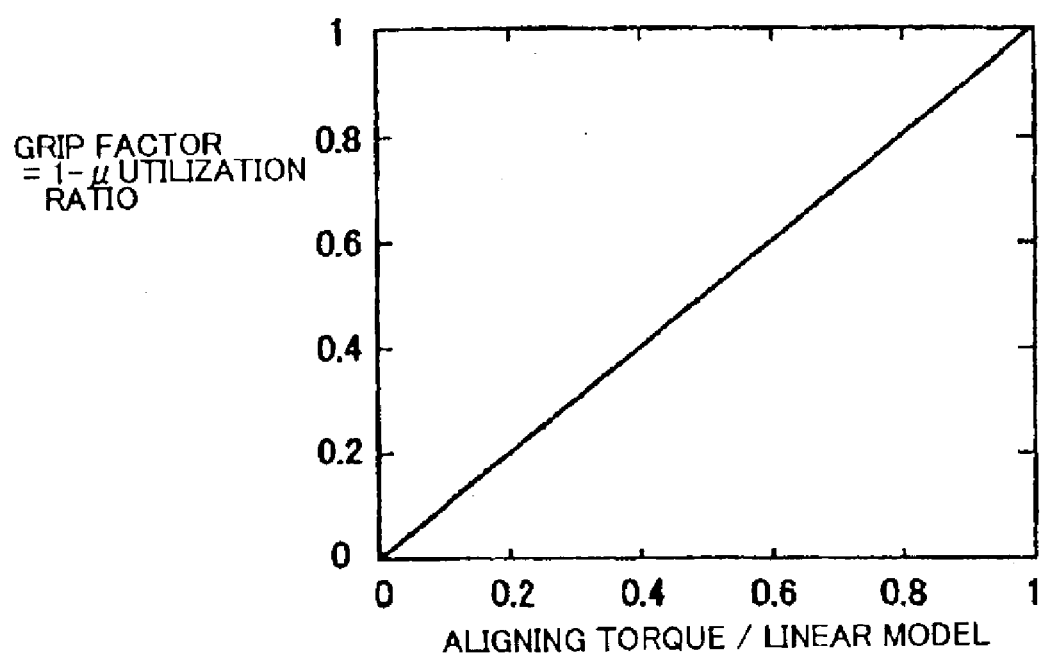
FIG. 33 is a diagram showing a relationship of grip factor to [aligning torque/linear model], according to a further embodiment of the present invention.

FIG. 33 is a diagram showing a relationship of the grip factor to [aligning torque/linear model], which is a result of the aligning torque divided by the linear model at a random side slip as shown in FIG. 32B. As shown in FIG. 33, [aligning torque/linear model] corresponds to the grip factor. Therefore, the grip factor can be estimated directly by the estimated aligning torque. As the grip factor is indicated by [$1-\mu$ utilization ratio] (=1−lateral acceleration (gravitational acceleration)/$\mu$max), the road coefficient of friction $\mu$ can be estimated in accordance with the brush model. In practice, the grip factor estimation unit 29 is adapted to estimate a grip factor g(k) in accordance with the following equation (41):

$$g(k) = \frac{T_{SAT}(k)}{K_0 \alpha_f(k)} \quad (41)$$

where $T_{SAT}(k)$ is the estimated aligning torque calculated by the aligning torque estimation unit 28, and $\alpha_f(k)$ is the slip angle filtered by the vehicle speed sensing filter 23. $K_0$ is the origin gradient of the aligning torque to the slip angle, to be indicated by the slip angle corresponding to the gradient of the linear model as shown in FIG. 32B. Therefore, $K_0 \cdot \alpha_f(k)$ indicates the aligning torque of the brush model with the slip angle $\alpha_f(k)$.

Figure 34A:
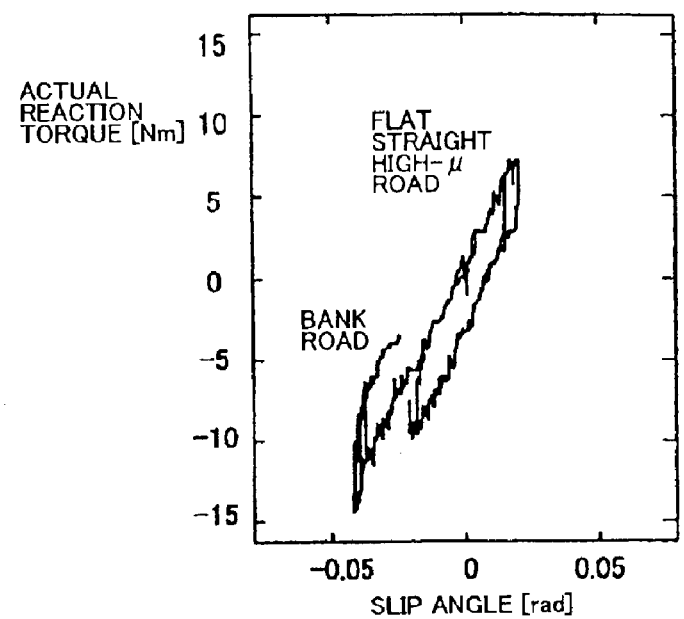
FIG. 34A is a diagram showing a relationship of actual reaction torque to slip angle on a flat straight high-μ road and bank road, according to a further embodiment of the present invention.
Figure 34B:
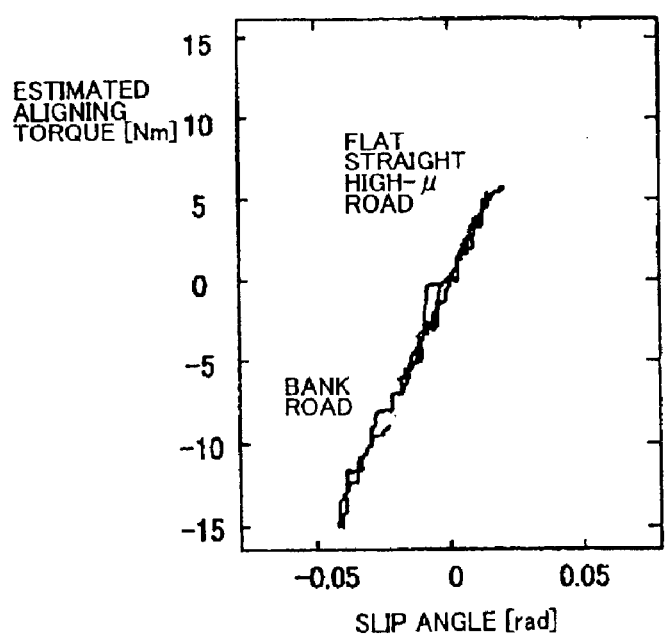
FIG. 34B is a diagram showing a relationship of estimated aligning torque to slip angle on a flat straight high-μ road and bank road, according to a further embodiment of the present invention.

FIG. 34A is a diagram showing a relationship of the actual reaction torque to the slip angle, which is obtained when the vehicle is running on the flat straight high-$\mu$ road and bank road, and FIG. 34B is a diagram showing a relationship of the estimated aligning torque to the slip angle, which is obtained when the vehicle is running on the flat straight high-$\mu$ road and bank road. As shown in FIG. 34B, the estimated aligning torque which was corrected for the bank road running vehicle is a straight line proportional to the slip angle, i.e., the straight line including the origin.

Figure 35A:
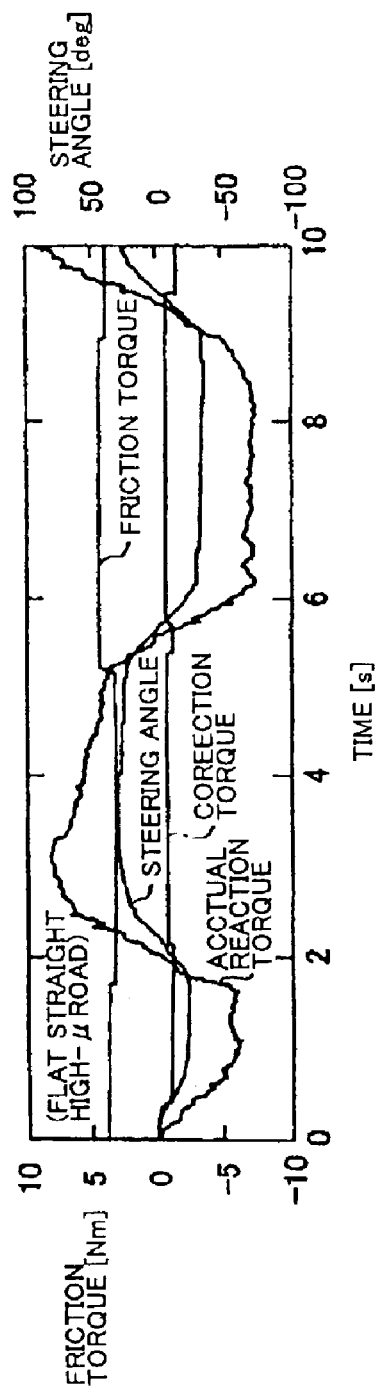
FIG. 35A is a diagram showing variations of friction torque, actual reaction torque, correction torque and steering angle on a flat straight high-μ road, according to a further embodiment of the present invention.
Figure 35B:
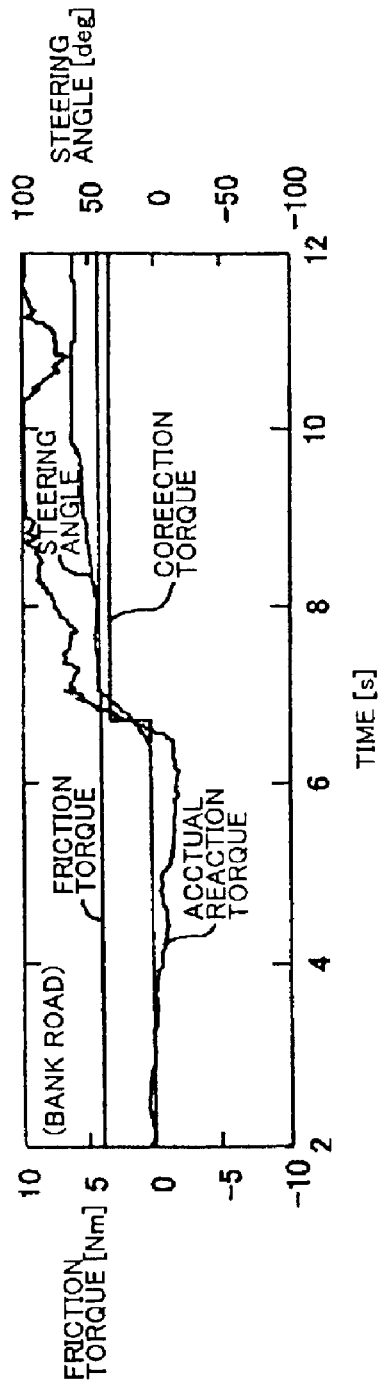
FIG. 35B is a diagram showing variations of friction torque, actual reaction torque, correction torque and steering angle on a bank road, according to a further embodiment of the present invention.

FIG. 35A is a diagram showing changes (with the passing time) of the friction torque, actual reaction torque, correction torque and steering angle, which are obtained when the vehicle is running on the flat straight highs-$\mu$ road, and FIG. 35B is a diagram showing changes (with the passing time) of the friction torque, actual reaction torque, correction torque and steering angle, which are obtained when the vehicle is running on the bank road. In FIGS. 35A and 35B, the actual reaction torque produced when the steering wheel is turned to the left is indicated by the positive value. The bank as shown in FIG. 35B is curved to the left. In the case where the steering of the vehicle was held when the vehicle was entered into the bank road (in the vicinity of 5–6 (s)), the actual reaction torque in the negative direction was produced for steering the vehicle to the left along the curve. The change of the actual reaction torque when the steering is being held is indicated by the change of the actual reaction torque (change in the longitudinal direction) at the slip angle of (0). The friction torque is estimated every steering operation toward the original position. The friction torque is of a constant value around 4 [Nm], because the vehicle is running on the smooth road surface. The correction value is approximately zero (0) on the flat straight high-$\mu$ road, whereas it is around 3 [Nm] when steering on the bank road.

Figure 36A:
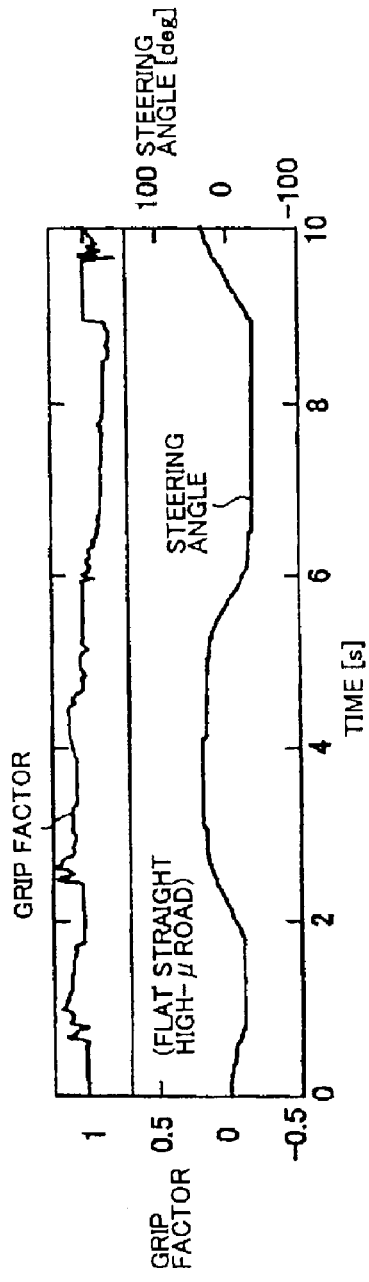
FIGS. 36A is a diagram showing variations of grip factor and steering angle on a flat straight high-μ road, according to a further embodiment of the present invention.
Figure 36B:
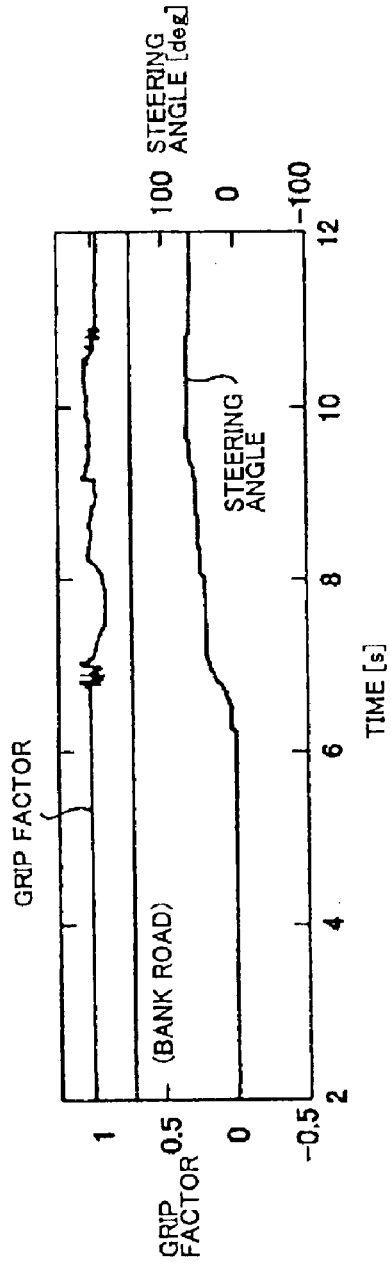
FIG. 36B is a diagram showing variations of grip factor and steering angle on a bank road, according to a further embodiment of the present invention.

FIGS. 36A and 36B are diagrams showing changes (with the passing time) of the grip factor and steering angle. FIG. 36A shows those changes obtained when the vehicle is running on the flat straight high-$\mu$ road, whereas FIG. 36B shows those changes obtained when the vehicle is running on the bank road. The grip factor is the one calculated on the basis of the corrected aligning torque. According to FIGS. 36A and 36B, a largely gripped state can be always estimated, without being determined erroneously, even when the vehicle is running on the bank road.

Figure 37A:
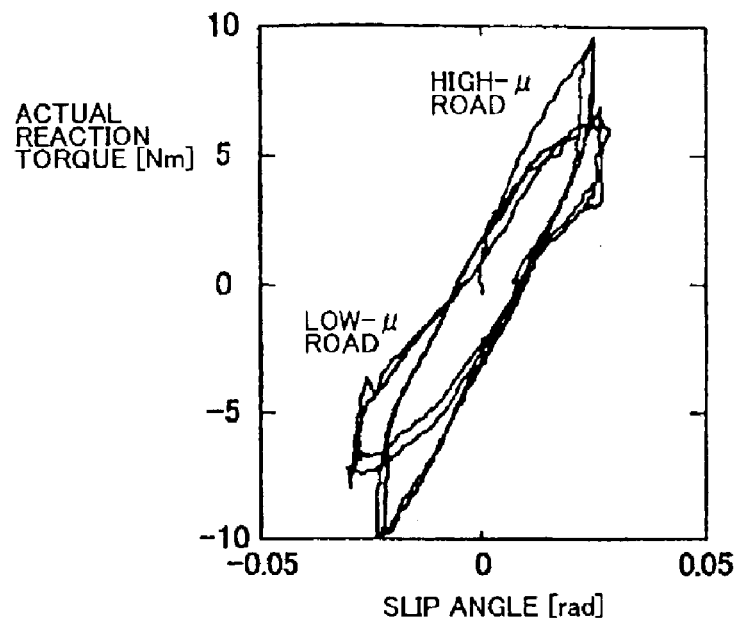
FIG. 37A is a diagram showing a relationship of actual reaction torque to slip angle, running at the speed of 30 [km/h] on high-μ and low-μ roads, according to a further embodiment of the present invention.
Figure 37B:
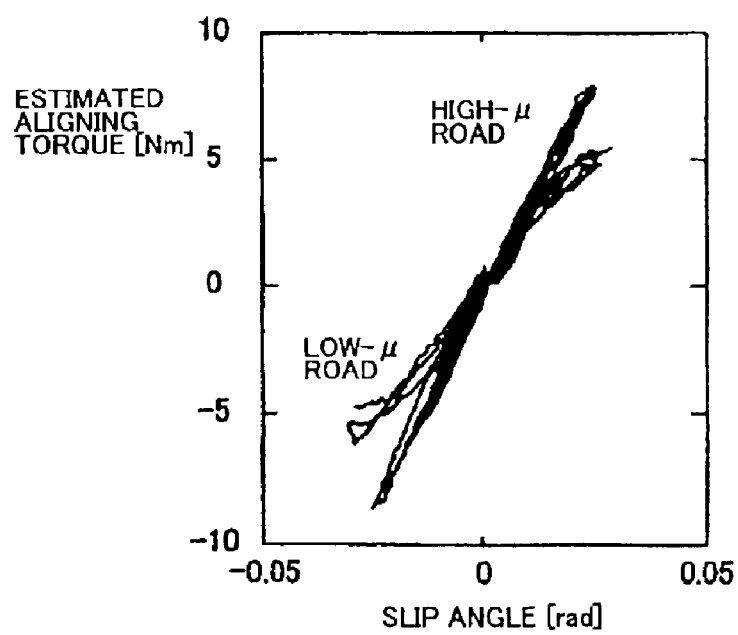
FIG. 37B is a diagram showing a relationship of estimated aligning torque to slip angle, running at the speed of 30 [km/h] on high-μ and low-μ roads, according to a further embodiment of the present invention.

FIG. 37A is a diagram showing a relationship of the actual reaction torque to the slip angle, when the vehicle is running at the speed of 30 [km/h] on the highs road and low-$\mu$ road. And, FIG. 37B is a diagram showing a relationship of the estimated aligning torque to the slip angle, when the vehicle is running at the speed of 30 [km/h] on the high-$\mu$ road and low-$\mu$ road. The experiment herein was performed on the smooth flat straight road surface. According to FIGS. 37A and 37B, it can be confirmed that the corrections (friction torque and correction torque) made in accordance with the rough road and bank road will not badly affect on the fundamental function for estimating the grip factor.

FIGS. 38A and 38B are diagrams showing the estimated results of the actual reaction torque, friction torque, correction torque and steering angle obtained in the experiment according to FIGS. 37A and 37B. FIG. 38A shows those obtained when the vehicle is running on the high-$\mu$ road, and FIG. 38B shows those obtained when the vehicle is running on the low-$\mu$ road. According to FIGS. 38A and 38B, the friction torque is of a constant value around 4 [Nm], and the correction value is approximately zero (0) which corresponds to the value obtained on the flat straight road. Consequently, the friction torque and correction torque can be estimated accurately, not only on the high-$\mu$ road provided with a sufficient margin to the grip, but also on the low-$\mu$ road with the grip reduced.

FIGS. 39A and 39B are diagrams showing changes (with the passing time) of the grip factor and steering angle. FIG. 39A shows those obtained when the vehicle is running on the high-$\mu$ road, and FIG. 39B shows those obtained when the vehicle is running on the low-$\mu$ road. Particularly, in the case where the vehicle is running on the low-$\mu$ road, the reduction of the grip factor obtained when the steering angle has become large, can be estimated appropriately. Furthermore, the grip factor can be calculated accurately, not only when the steering is turned in the direction for increasing the steering angle, but also when the steering is turned toward the original position, or held in the same steering state.

According to the wheel grip factor estimation apparatus of the further embodiment as described above, the estimated aligning torque is calculated on the basis of the actual reaction torque acting on the steering axis, and the friction torque caused by the internal Coulomb's friction or the like in the steering system. Accordingly, even if the magnitude of the Coulomb's friction is varied by the disturbance of the road surface, the friction torque is estimated in accordance with the disturbance, so that the aligning torque can be estimated accurately, without being affected by the disturbance of the road surface. And, as the grip factor is calculated on the basis of the estimated aligning torque, the grip factor can be estimated accurately, without being affected by the disturbance of the road surface.

Also, the wheel grip factor estimation apparatus is provided with the vehicle speed sensing filters 23 and 24 whose cut-off frequencies are set to be increased, with the vehicle speed increased. Therefore, when the vehicle speed is low, the low frequency disturbance given by the road surface can be compensated, and when the vehicle speed is high, the responsibility to the estimation can be ensured. Furthermore, the wheel grip factor estimation apparatus is adapted to calculate the correction torque for the change of the actual reaction torque caused by the change of the neutral point of the steering system, when the vehicle is running on the bank road, whereby the estimated aligning torque can be calculated accurately.

Figure 40:
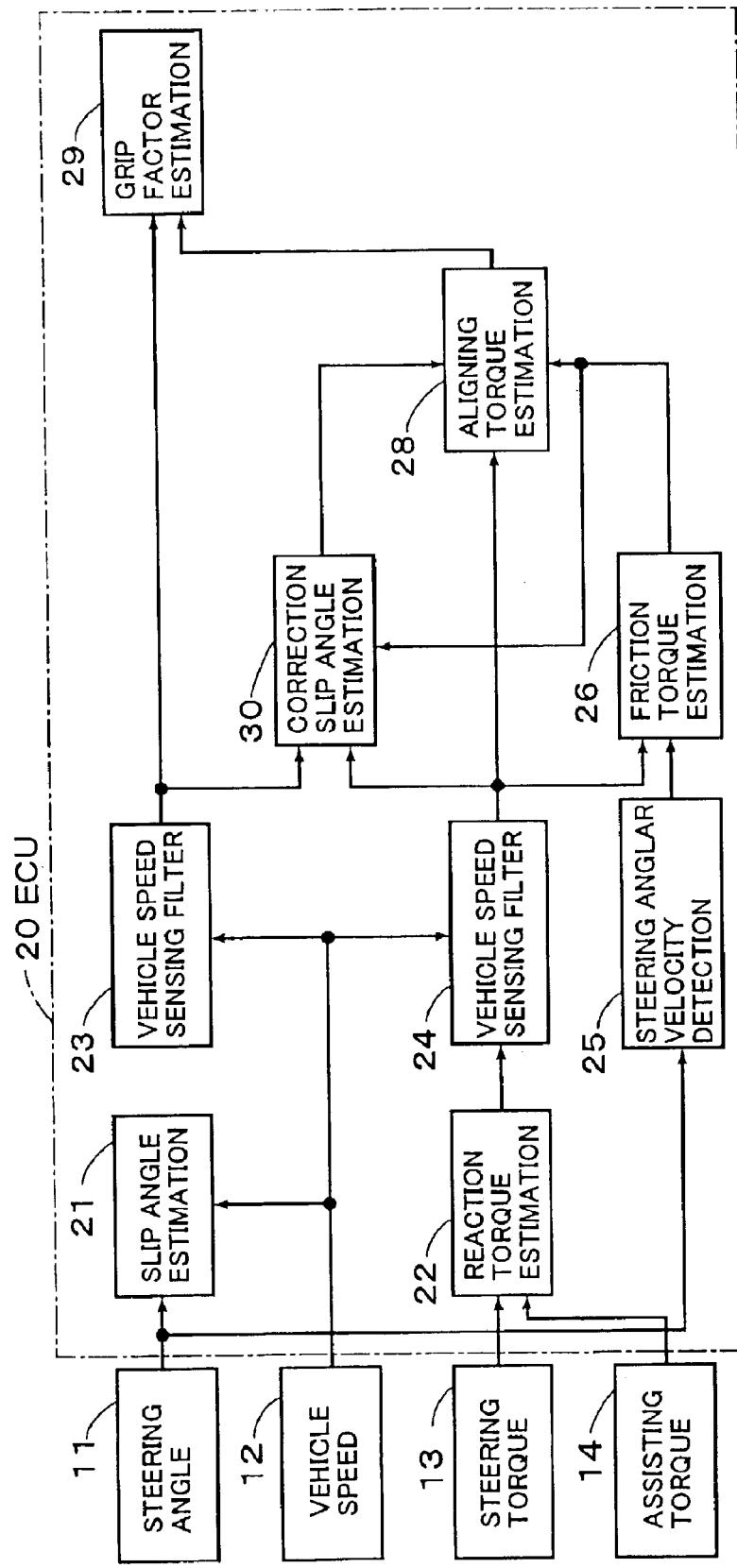
FIG. 40 is a schematic block diagram of a wheel grip factor estimation apparatus according to a yet further embodiment of the present invention.

Next will be explained a yet further embodiment of the wheel grip factor estimation apparatus according to the present invention, with reference to FIG. 40, wherein the elements indicated by the same reference numerals as indicated in FIG. 27 denote the same elements, whose explanation will be omitted herein. In FIG. 40, the ECU 20 includes a correction slip angle estimation unit 30, instead of the correction torque estimation unit 27 as shown in FIG. 27.

The correction slip angle estimation unit 30 is adapted to detect a change in the slip angle which is caused by the change of the neutral point of the steering system when the vehicle is running on the bank, to estimate the correction slip angle for a bank correction. In the case where the grip factor is estimated in accordance with the relationship between the slip angle and the estimated aligning torque, it might be caused that the estimated aligning torque comes to be of a small value in the vicinity of zero area, while the slip angle is relatively large, so that the grip factor will be lowered, even if the grip factor is high in fact. According to the correction slip angle estimation unit 30, therefore, is detected the change of the neutral point of the steering system when the vehicle is running on the bank, on the basis of the slip angle which is obtained when the steering operation begins so that the actual reaction torque exceeds the friction torque, as the change of the slip angle, which is estimated as the correction slip angle.

Figure 41:
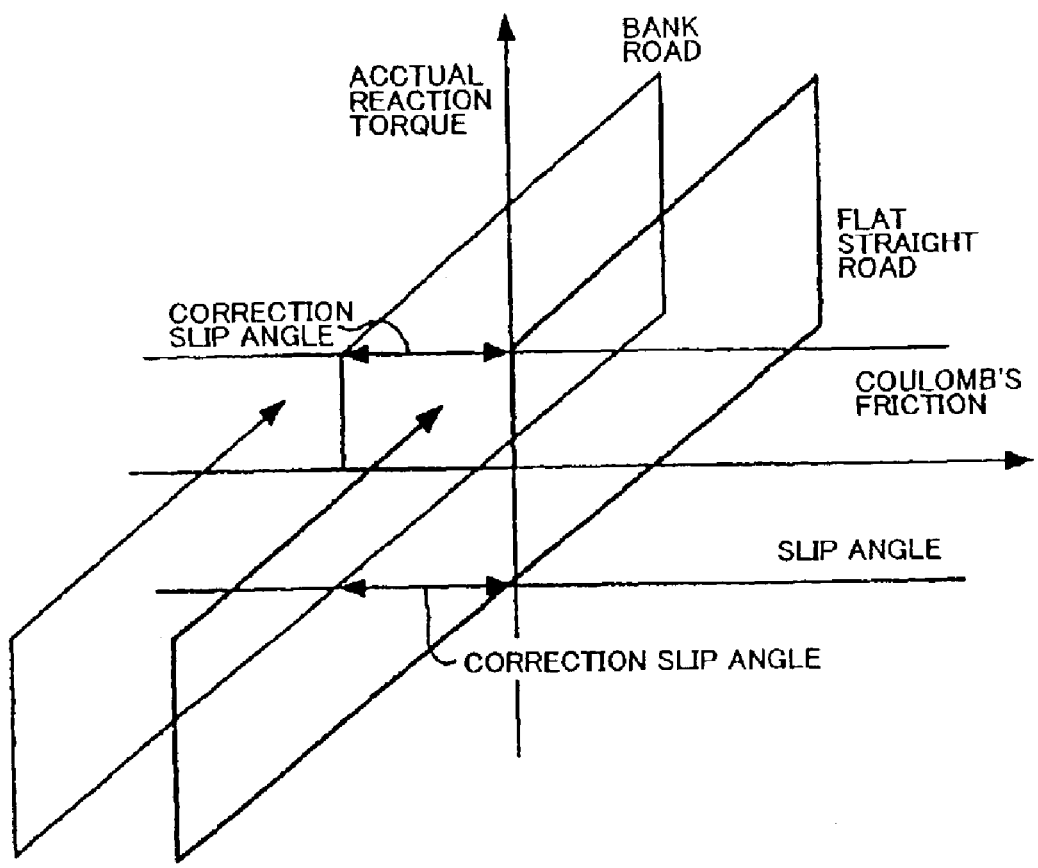
FIG. 41 is a diagrams showing a relationship of actual reaction torque to slip angle on a flat straight road and bank road, according to a yet further embodiment of the present invention.

FIG. 41 shows a relationship of the actual reaction torque to the slip angle, when the vehicle is running on a flat straight road and the bank road. In FIG. 41, the actual reaction torque and slip angle produced when the steering wheel is turned to the left are indicated by the positive sign. The actual reaction torque, which is produced in the case where the actual reaction torque obtained when the steering operation begins, overcomes the Coulomb's friction, is not so small as to be absorbed in the Coulomb's friction, whereas it is not so large as to be affected by reduction of grip according to the road coefficient of friction $\mu$. The relationship between the actual reaction torque and the slip angle only reflects the change of neutral point in the steering system.

In this embodiment, a difference between the slip angle which is estimated in the case where the flat straight road is estimated from the slip angle at the time when the actual reaction torque obtained when the steering operation begins overcomes the Coulomb's friction, and the actual slip angle at the present time, is deemed as a slip angle caused by means of the bank, which slip angle is used as the correction slip angle. In practice, according to the correction slip angle estimation unit 30, on the basis of the slip angle $\alpha_f$ filtered by the vehicle speed sensing filter 23 and the estimated aligning torque $T_{SAT}$, the correction slip angle $\alpha_1$ is calculated in accordance with the following equation (42):

$$\alpha_1(k) = \frac{T_{SAT}(k)}{K_0} - \alpha_f \quad (42)$$

The aligning torque estimation unit 28 is adapted to calculate the estimated aligning torque $T_{SAT}$, in the same manner as the embodiment as shown in FIG. 27. In the equations (34), (35) and (37), however, the correction torque $T_{correct}=0$ is provided, to calculate the estimated aligning torque $T_{SAT}$.

The grip factor estimation unit 29 is adapted to estimate a grip factor which corresponds to a margin of friction force in a lateral direction, on the basis of the estimated aligning torque calculated by the aligning torque estimation unit 28, and the correction slip angle estimated by the correction slip angle estimation unit 30. In practice, the grip factor estimation unit 29 is adapted to estimate the grip factor g(k) in accordance with the following equation (43):

$$g(k) = \frac{T_{SAT}(k)}{K_0\{\alpha(k) + \alpha_1(k)\}} \quad (43)$$

Figure 42A:
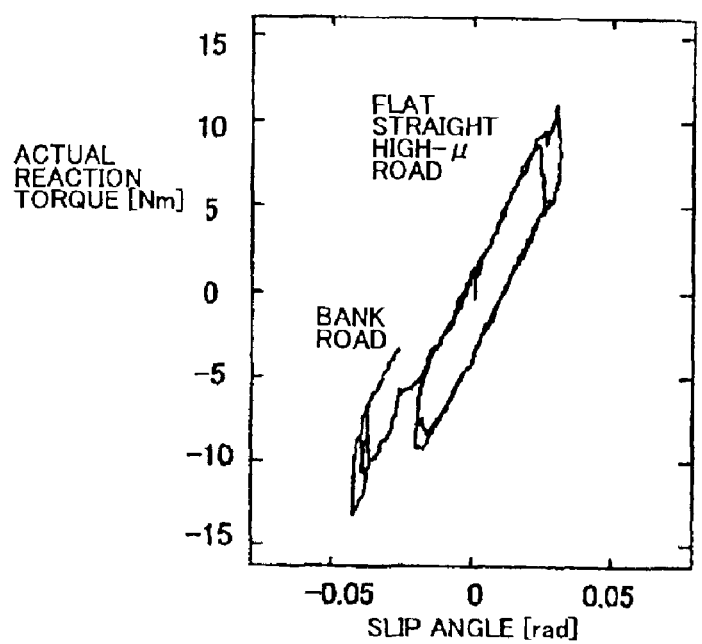
FIG. 42A is a diagram showing a relationship of actual reaction torque to slip angle on a flat straight high-μ road and bank road, according to a yet further embodiment of the present invention.
Figure 42B:
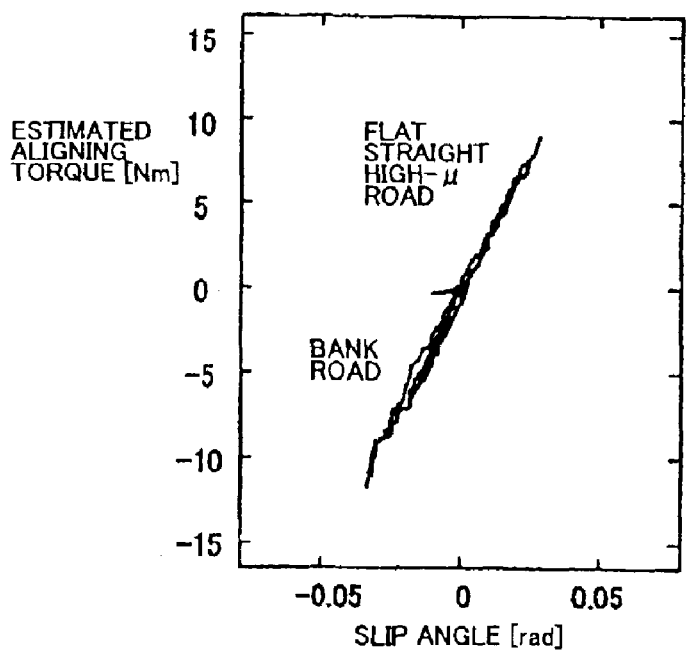
FIG. 42B is a diagram showing a relationship of estimated aligning torque to slip angle on a flat straight high-μ road and bank road, according to a yet further embodiment of the present invention.
Figure 43:
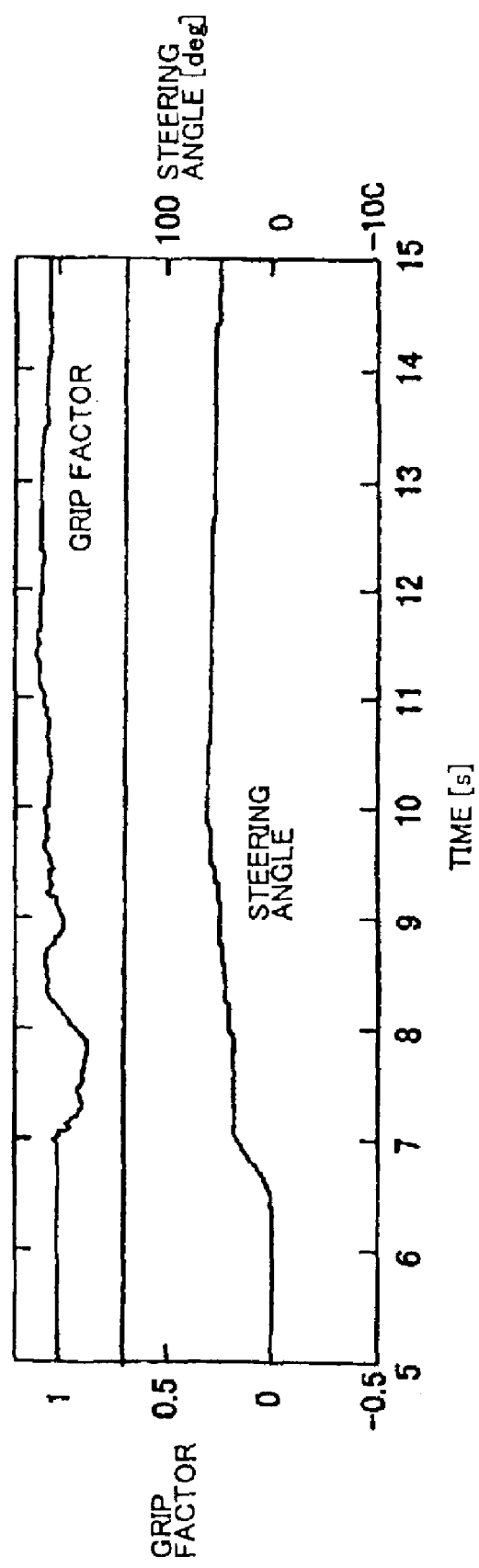
FIG. 43 is a diagram showing variations of grip factor and steering angle on a bank road, according to a yet further embodiment of the present invention.

FIG. 42A is a diagram showing a relationship of the actual reaction torque to the slip angle, which is obtained when the vehicle is running on the flat straight high-$\mu$ road and bank road, and FIG. 42B is a diagram showing a relationship of the estimated aligning torque to the slip angle, which is obtained when the vehicle is running on the flat straight high-$\mu$ road and bank road. As shown in FIG. 42B, the slip angle for the bank road running vehicle was corrected in the positive direction by the bank correction (corrected slip angle). Therefore, the estimated aligning torque is a straight line proportional to the slip angle, i.e., the straight line including the origin, as in the embodiment as shown in FIG. 27. FIG. 43 shows those changes (with the time passing) of the grip factor and steering angle obtained when the vehicle is running on the bank road. According to FIG. 43, a largely gripped state can be estimated appropriately, even when the vehicle is running on the bank road, as in the embodiment as shown in FIG. 27.

As described above, according to the embodiment as shown in FIG. 40, the wheel grip factor estimation apparatus is adapted to calculate the correction slip angle for the change of the slip angle caused by the change of the neutral point of the steering system, when the vehicle is running on the bank road, whereby the estimated aligning torque can be calculated accurately. In the embodiments as described above, the electric power steering apparatus was used for calculating the grip factor, whereas a hydraulic pressure power steering apparatus may be employed in stead. In the latter case, the grip factor may be estimated as in the same manner as described above, by detecting the hydraulic pressure in the power steering apparatus, and calculating the torque corresponding to the steering torque and assisting torque on the basis of the detected pressure.

It should be apparent to one skilled in the art that the above-described embodiment are merely illustrative of but a few of the many possible specific embodiments of the present invention. Numerous and various other arrangements can be readily devised by those skilled in the art without departing from the spirit and scope of the invention as defined in the following claims.

What is claimed is:

1. An apparatus for estimating a grip factor of a vehicle wheel comprising:

steering factor detection means for detecting at least one of steering factors including a steering torque and steering effort applied to a steering system extending from a steering wheel to a suspension of a vehicle;

aligning torque estimation means for estimating an aligning torque produced on at least a wheel of said vehicle on the basis of the steering factor detected by said steering factor detection means;

vehicle state variable detection means for detecting a state variable of said vehicle;

wheel factor estimation means for estimating at least one of wheel factors including a side force and slip angle applied to said wheel on the basis of the state variable detected by said vehicle state variable detection means; and grip factor estimation means for estimating a grip factor of at least a tire of said wheel, which grip factor indicates a grip level of the tire in a lateral direction of the wheel, in accordance with a relationship between the aligning torque estimated by said aligning torque estimation means and the wheel factor estimated by said wheel factor estimation means.

2. An apparatus for estimating a grip factor of a vehicle wheel as set forth in claim 1, further comprising;

reference aligning torque selling means for setting a reference aligning torque on the basis of the wheel factor estimated by said wheel factor estimation means and the aligning torque estimated by said aligning torque estimation means, wherein said grip factor estimation means is adapted to estimate the grip factor of said tire on the basis of a result of comparison between the aligning torque estimated by said aligning torque estimation means and the reference aligning torque set by said reference aligning torque selling means.

3. An apparatus for estimating a grip factor of a vehicle wheel as set forth in claim 2, wherein said reference aligning torque setting means is adapted to set the reference aligning torque by approximating a characteristic of the aligning torque estimated by said aligning torque estimation means against the wheel factor estimated by said wheel factor estimation means to a linear characteristic of the reference aligning torque including at least the origin, and adapted to set the reference aligning torque on the basis of the linear characteristic of the reference aligning torque.

4. An apparatus for estimating a grip factor of a vehicle wheel as set forth in claim 2, wherein said reference aligning torque setting means is adapted to set a linear characteristic of the reference aligning torque with a gradient which is provided by a brush model of said wheel for estimating the grip factor on the basis of a margin of side force for road friction, and adapted to set the reference aligning torque on the basis of the linear characteristic of the reference aligning torque.

5. An apparatus for estimating a grip factor of a vehicle wheel as set forth in claim 1, said steering factor detection means comprising:

steering torque detection means for detecting the steering torque applied to said steering system;

assisting torque detection means for detecting an assisting torque applied to said steering system;

reaction torque estimation means for estimating a reaction torque applied to a steering axis of said steering system on the basis of the steering torque detected by said steering torque detection means and the reaction torque estimated by said reaction torque estimation means; and friction torque estimation means for estimating a friction torque caused by internal friction of said steering system, wherein said aligning torque estimation means is adapted to estimate the aligning torque on the basis of the reaction torque estimated by said reaction torque estimation means and the friction torque estimated by said friction torque estimation means.

6. An apparatus for estimating a grip factor of a vehicle wheel as set forth in claim 5, wherein said friction torque estimation means is adapted to estimate the friction torque on the basis of a difference between the reaction torque with a maximal absolute value thereof estimated by said reaction torque estimation means and the reaction torque produced when said steering system is activated in a direction toward the original position of said steering system.

7. An apparatus for estimating a grip factor of a vehicle wheel as set forth in claim 5, further comprising:

vehicle speed detection means for detecting a vehicle speed of said vehicle; and filter means for setting a cut-off frequency in accordance with the vehicle speed detected by said vehicle speed detection means, and applying a low pass filtering process with the cut-off frequency to the reaction torque estimated by said reaction torque estimation means, wherein said friction torque estimation means is adapted to estimate the friction torque on the basis of the reaction torque filtered by said filter means, and wherein said aligning torque estimation means is adapted to estimate the aligning torque on the basis of the reaction torque filtered by said filter means.

8. An apparatus for estimating a grip factor of a vehicle wheel as set forth in claim 5, further comprising;

correction torque estimation means for estimating a correction torque in accordance with a variation of a neutral point of said suspension system, wherein said aligning torque estimation means is adapted to estimate the aligning torque on the basis of the reaction torque estimated by said reaction torque estimation means, the friction torque estimated by said friction torque estimation means, and the correction torque estimated by said correction torque estimation means.

9. An apparatus for estimating a grip factor of a vehicle wheel as set forth in claim 8, wherein said aligning torque estimation means is adapted to adjust the correction torque in accordance with a variation of the friction torque before and after said steering system is activated in the direction toward the original position, and wherein said aligning torque estimation means is adapted to estimate the aligning torque on the basis of the friction torque after said steering system was activated in the direction toward the original position, and the adjusted correction torque.

10. An apparatus for estimating a grip factor of a vehicle wheel as set forth in claim 1, further comprising warning means for comparing the grip factor estimated by said grip factor estimation means with a predetermined value, to provide a warning signal when the estimated grip factor becomes less than the predetermined value.

11. A vehicle motion control apparatus having an apparatus for estimating a grip factor of a vehicle wheel comprising:

steering factor detection means for detecting at least one of steering factors including a steering torque and steering effort applied to a steering system from a steering wheel to a suspension of said vehicle;

aligning torque estimation means for estimating an aligning torque produced on at least a wheel of said vehicle on the basis of the steering factor detected by said steering factor detection means;

vehicle state variable detection means for detecting a state variable of said vehicle;

wheel factor estimation means for estimating at least one of wheel factors including a side force and slip angle applied to said wheel on the basis of the state variable detected by said vehicle state variable detection means; and grip factor estimation means for estimating a grip factor of at least a tire of said wheel, in accordance with a relationship between the aligning torque estimated by said aligning torque estimation means and the wheel factor estimated by said wheel factor estimation means, and said vehicle motion control apparatus further comprising;

control means for controlling at least one of braking force, engine output and shift position of said vehicle at least in response to the state variable detected by said vehicle state variable detection means, said control means controlling at least one of the braking force, engine output and shift position of said vehicle when the grip factor estimated by said grip factor estimation means becomes less than a predetermined value, to reduce a speed of said vehicle.

12. A vehicle motion control apparatus as set forth in claim 11, further comprising;

reference aligning torque setting means for setting a reference aligning torque on the basis of the wheel factor estimated by said wheel factor estimation means and the aligning torque estimated by said aligning torque estimation means, wherein said grip factor estimation means is adapted to estimate the grip factor of said tire on the basis of a result of comparison between the aligning torque estimated by said aligning torque estimation means and the reference aligning torque set by said reference aligning torque setting means.

13. A vehicle motion control apparatus as set forth in claim 12, wherein said reference aligning torque setting means is adapted to set the reference aligning torque by approximating a characteristic of the aligning torque estimated by said aligning torque estimation means against the wheel factor estimated by said wheel factor estimation means to a linear characteristic of the reference aligning torque including at least the origin, and adapted to set the reference aligning torque on the basis of the linear characteristic of the reference aligning torque.

14. A vehicle motion control apparatus as set forth in claim 12, wherein said reference aligning torque setting means is adapted to set a linear characteristic of the reference aligning torque with a gradient which is provided by a brush model of said wheel for estimating the grip factor on the basis of a margin of side force for road friction, and adapted to set the reference aligning torque on the basis of the linear characteristic of the reference aligning torque.

15. A vehicle motion control apparatus as set forth in claim 11, said steering factor detection means comprising:

steering torque detection means for detecting the steering torque applied to said steering system;

assisting torque detection means for detecting an assisting torque applied to said steering system;

reaction torque estimation means for estimating a reaction torque applied to a steering axis of said steering system on the basis of the steering torque detected by said steering torque detection means and the reaction torque estimated by said reaction torque estimation means; and friction torque estimation means for estimating a friction torque caused by internal friction of said steering system, wherein said aligning torque estimation means is adapted to estimate the aligning torque on the basis of the reaction torque estimated by said reaction torque estimation means and the friction torque estimated by said friction torque estimation means.

16. A vehicle motion control apparatus as set forth in claim 15, further comprising;

correction torque estimation means for estimating a correction torque in accordance with a variation of a neutral point of said suspension system, wherein said aligning torque estimation means is adapted to estimate the aligning torque on the basis of the reaction torque estimated by said reaction torque estimation means, the friction torque estimated by said friction torque estimation means, and the correction torque estimated by said correction torque estimation means.

17. A vehicle motion control apparatus as set forth in claim 16, wherein said correction estimation means is adapted to estimate the correction torque correction torque in accordance with the variation of the neutral point of said suspension system, on the basis of the friction torque estimated by said friction torque estimation means.

18. A vehicle motion control apparatus as set forth in claim 11, wherein said control means is adapted to control the braking force applied to at least one wheel of said vehicle, when the grip factor estimated by said grip factor estimation means becomes less than the predetermined value during a braking operation of a vehicle driver, to exceed a predetermined braking force irrespective of the braking operation of said vehicle driver.

19. A vehicle motion control apparatus as set forth in claim 18, wherein the predetermined braking force is set on the basis of at least one of the grip factor, amount of braking operation of said vehicle driver, road coefficient of friction to said wheel, and load to said wheel.

20. A vehicle motion control apparatus as set forth in claim 19, wherein said control means is adapted to control the braking force applied to rear wheels of said vehicle, when the road coefficient of friction is less than a predetermined value, to prohibit the braking force from being increased.

21. A vehicle motion control apparatus as set forth in claim 18, wherein said control means is adapted to determine whether said vehicle has a tendency of under steering or over steering on the basis of the state variable detected by said vehicle state variable detection means, and adapted to control the braking force applied to said vehicle, to produce a different yaw moment between when said vehicle has the tendency of under steering and when said vehicle has the tendency of over steering.

* * * * *